US012646423B2

(12) United States Patent
Marin et al.

(10) Patent No.:  US 12,646,423 B2
(45) Date of Patent:       Jun. 2, 2026

(54) SURGICAL SIMULATION SCOPE SYSTEM

(71) Applicant: Applied Medical Resources Corporation, Rancho Santa Margarita, CA (US)

(72) Inventors: Zachary Marin, Rancho Santa Margarita, CA (US); Jimmy Ho, Rancho Santa Margarita, CA (US); Brannon Smudz, Rancho Santa Margarita, CA (US); Sean Kenneday, Rancho Santa Margarita, CA (US); Lindsey Chase, Rancho Santa Margarita, CA (US); Anay Pandit, Lake Elsinore, CA (US); Cory Hague, Aliso Viejo, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 20 days.

(21) Appl. No.: 18/750,877

(22) Filed: Jun. 21, 2024

(65) Prior Publication Data

US 2024/0346953 A1     Oct. 17, 2024

Related U.S. Application Data

(63) Continuation     of     application     No. PCT/US2023/018377, filed on Apr. 12, 2023.

(Continued)

(51) Int. Cl.
*G09B 23/28*          (2006.01)
*G09B 5/02*           (2006.01)

(52) U.S. Cl.
CPC ............. *G09B 23/285* (2013.01); *G09B 5/02* (2013.01)

(58) Field of Classification Search
None
See application file for complete search history.

(56) References Cited

U.S. PATENT DOCUMENTS 4,491,865 A     1/1985  Danna et al.
4,600,938 A     7/1986  Sluyter et al.
(Continued)

FOREIGN PATENT DOCUMENTS

DE     102004023866 B3     2/2006
EP       2 428 155 A1      3/2012
(Continued)

OTHER PUBLICATIONS

European Patent Office, The International Search Report and Writ-tenOpinion for International Application No. PCT/US2018/067310, entitled "Surgical Simulation Camera Scope," mailed Mar. 15, 2019, 49 pgs.
(Continued)

*Primary Examiner* — Bruk A Gebremichael
(74) *Attorney, Agent, or Firm* — Patrick Ikehara

(57)                   ABSTRACT

A surgical simulation scope system is provided as effective as a surgical scope without the added expense and com-plexities. The surgical simulation scope comprises an optics housing, a lens and an image sensor placed in such a way to ensure the location of the sensor is within the depth of focus of the lens is maintained while not damaging the sensor and, in some cases, to provide angled and/or rotational viewing.

19 Claims, 64 Drawing Sheets

Related U.S. Application Data

(60) Provisional application No. 63/412,225, filed on Sep. 30, 2022, provisional application No. 63/331,723, filed on Apr. 15, 2022.

(56) References Cited

U.S. PATENT DOCUMENTS

| | | | |
|---|---|---|---|
| 4,600,939 A | 7/1986 | Sluyter et al. | |
| 4,600,940 A | 7/1986 | Sluyter | |
| 4,639,772 A | 1/1987 | Sluyter et al. | |
| 4,677,471 A | 6/1987 | Takamura et al. | |
| 4,734,778 A | 3/1988 | Kobayashi | |
| 4,918,521 A | 4/1990 | Yabe et al. | |
| 4,947,245 A | 8/1990 | Ogawa et al. | |
| 5,050,584 A | 9/1991 | Matsuura | |
| 5,228,430 A | 7/1993 | Sakamoto | |
| 5,325,847 A | 7/1994 | Matsuno | |
| 5,379,756 A | 1/1995 | Pileski et al. | |
| 5,594,497 A | 1/1997 | Ahern et al. | |
| 5,711,756 A | 1/1998 | Chikama | |
| 5,961,445 A | 10/1999 | Chikama | |
| 5,966,168 A | 10/1999 | Miyazaki | |
| 5,989,185 A | 11/1999 | Miyazaki | |
| 6,117,071 A | 9/2000 | Ito et al. | |
| 6,184,923 B1 | 2/2001 | Miyazaki | |
| 6,471,637 B1 | 10/2002 | Green et al. | |
| 6,478,730 B1 | 11/2002 | Bala et al. | |
| 6,540,670 B1 | 4/2003 | Hirata et al. | |
| 6,554,767 B2 | 4/2003 | Tanaka | |
| 6,692,431 B2 | 2/2004 | Kazakevich | |
| 6,796,939 B1 | 9/2004 | Hirata et al. | |
| 6,916,286 B2 | 7/2005 | Kazakevich | |
| 7,063,663 B2 | 6/2006 | Kazakevich | |
| 7,201,717 B2 | 4/2007 | Matsuura | |
| 7,384,308 B2 | 6/2008 | Boehnlein et al. | |
| 7,431,619 B2 | 10/2008 | Boehnlein et al. | |
| 7,435,218 B2 | 10/2008 | Krattiger et al. | |
| 7,581,988 B2 | 9/2009 | Boehnlein et al. | |
| 7,584,534 B2 | 9/2009 | Pease et al. | |
| 7,621,867 B2 | 11/2009 | Kura et al. | |
| 7,749,160 B2 | 7/2010 | Hirata | |
| 7,878,972 B2 | 2/2011 | D'Amelio et al. | |
| 7,896,801 B2 | 3/2011 | Uchimura et al. | |
| 7,976,459 B2 | 7/2011 | Laser | |
| 8,154,810 B2 | 4/2012 | Barnes et al. | |
| 8,218,074 B2 | 7/2012 | Pease et al. | |
| 8,269,828 B2 | 9/2012 | Miller et al. | |
| 8,308,637 B2 | 11/2012 | Ishigami et al. | |
| 8,423,110 B2 | 4/2013 | Barbato et al. | |
| 9,033,871 B2 | 5/2015 | Schara et al. | |
| 9,164,271 B2 | 10/2015 | Ebata et al. | |
| 9,380,928 B2 | 7/2016 | Hu et al. | |
| 9,565,993 B2 | 2/2017 | Okuda et al. | |
| 9,585,813 B2 | 3/2017 | Dorsey et al. | |
| 9,629,524 B2 | 4/2017 | Kaneko | |
| 9,681,797 B2 | 6/2017 | Scherr et al. | |
| 9,795,279 B2 | 10/2017 | Hogrefe et al. | |
| 9,808,148 B2 | 11/2017 | Miller et al. | |
| 9,907,457 B2 | 3/2018 | Grant et al. | |
| 10,362,240 B2 | 7/2019 | Richardson et al. | |
| 10,362,927 B2 | 7/2019 | Grant et al. | |
| 10,616,491 B2 | 4/2020 | Haggerty et al. | |
| 10,863,888 B2 | 12/2020 | Grant et al. | |
| 2006/0004258 A1 | 1/2006 | Sun et al. | |
| 2007/0162095 A1 | 7/2007 | Kimmel et al. | |
| 2008/0027276 A1 | 1/2008 | Rovegno | |
| 2008/0055403 A1 | 3/2008 | Salman et al. | |
| 2009/0118580 A1 | 5/2009 | Sun et al. | |
| 2010/0286476 A1 | 11/2010 | Jiang et al. | |
| 2011/0034769 A1 | 2/2011 | Adair et al. | |
| 2011/0134234 A1 | 6/2011 | Kim | |
| 2016/0000301 A1 | 1/2016 | Langell et al. | |
| 2016/0007833 A1 | 1/2016 | Huang et al. | |
| 2016/0106303 A1 | 4/2016 | Birnkrant et al. | |
| 2017/0059850 A1 | 3/2017 | Yashiro et al. | |
| 2017/0319054 A1 | 11/2017 | Miller et al. | |
| 2019/0206281 A1 | 7/2019 | Dantes et al. | |
| 2021/0015346 A1* | 1/2021 | Kuroda | G02B 23/2484 |
| 2022/0369896 A1* | 11/2022 | Hirayama | A61B 1/00119 |

FOREIGN PATENT DOCUMENTS

| | | | |
|---|---|---|---|
| EP | 2 811 478 A1 | 12/2014 | |
| EP | 2 465 431 B1 | 3/2016 | |
| JP | 2002291693 A | 10/2002 | |

OTHER PUBLICATIONS

European Patent Office, The International Search Report and WrittenOpinion for International Application No. PCTUS2023018377, entitled "Surgical Simulation Scope System," mailed Jul. 3, 2023, 13 pgs.

The International Bureau of WIPO, International Preliminary Report onPatentability for International Application No. PCT/US2018/067310, entitled "Surgical Simulation Camera Scope," dated Jul. 16, 2020, 9 pgs.

* cited by examiner

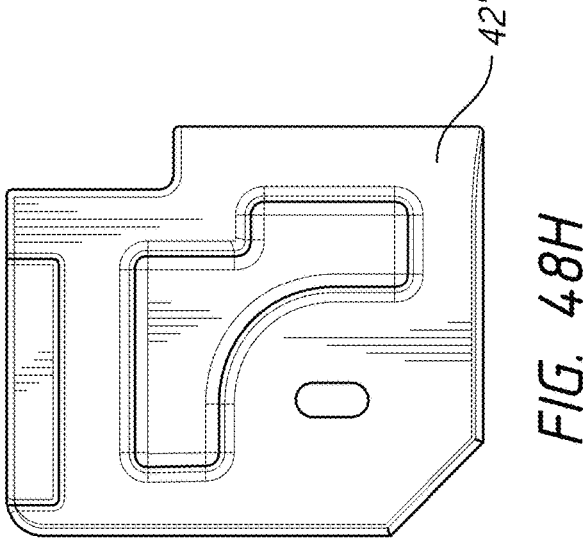
*FIG. 48H*
42'
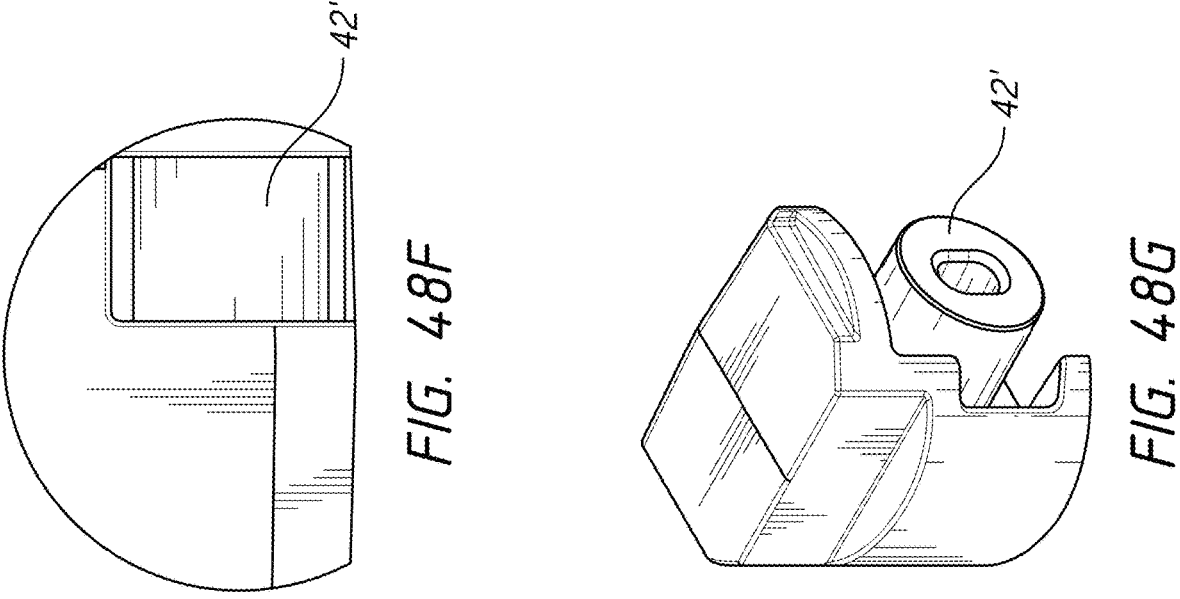
*FIG. 48F*
42'
*FIG. 48G*
42'

SURGICAL SIMULATION SCOPE SYSTEM

CROSS-REFERENCE TO RELATED APPLICATIONS

This application is a continuation of PCT/US2023/018377, filed Apr. 12, 2023 which claims the benefit of U.S. Provisional Application No. 63/331,723, filed on Apr. 15, 2022 and U.S. Provisional Application No. 63/412,225, filed on Sep. 30, 2022, the entire disclosures of which are hereby incorporated by reference as if set forth in full herein.

BACKGROUND

The present application relates generally to surgical simulation systems and methods and more particularly to surgical simulation angled scopes, scopes, systems, and methods thereof.

Surgical scopes are used in endoscopic and laparoscopic procedures in which small incisions are employed to pass scopes and instruments, such as scissors, dissectors and graspers, into a cavity of the body at the surgical site. Surgery is performed while observing an obscured surgical site captured by a scope and displaying a live image feed on a video monitor for observation by the surgeon. As such, learning laparoscopic surgery is very difficult, as the surgeon does not observe the organs and tissues directly with the naked eye. Visual information is also obtained indirectly via a monitor displaying a two-dimensional image. The loss of information when presenting a three-dimensional environment via a two-dimensional image is significant. In particular, depth perception is reduced when viewing a two-dimensional image as a guide for manipulating instruments in three dimensions. Furthermore, instruments/scopes are often inserted through trocars that are inserted through small incisions and rest against the abdominal wall. As a result, the manipulation of instruments/scopes is restricted by the abdominal wall, which has a fulcrum effect on the instrument/scope. Hence, hand-eye coordination skills are necessary and must be practiced in order to correlate hand motion with tool tip motion. The surgeon must also develop a set of core haptic skills because tactile sensation is diminished, as the surgeon cannot palpate the tissue directly by hand. The acquisition of all of these skills and more is a challenge in laparoscopic training and there is a need for scopes that are suitable for use in a training environment.

SUMMARY

Generally, surgical simulation scope systems are provided. In various embodiments, a surgical simulation angled scope or scope comprises a handle and an elongate shaft connected thereto. The elongate shaft, in various embodiments, at its distal end comprises optics housing with a lens and an image sensor mounted thereto. The handle, in various embodiments, comprises a simulated camera head and a simulated scope housing. In various embodiments, a surgical simulation scope system comprises one or more surgical simulation scopes and one or more surgical trainers.

In various embodiments, a surgical simulation scope comprises a handle and an elongate shaft. In various embodiments, a handle comprises a scope housing and a camera head. In various embodiments, a camera head has a different shape than a scope housing. In various embodiments, an elongate shaft has a proximal end, a distal end and a longitudinal axis extending between the proximal end and the distal end. In various embodiments, the proximal end of an elongate shaft is fixedly attached to a scope housing and the distal end of an elongate shaft comprises an optics mount. In various embodiments, the optics mount has a proximal portion having a pocket therein. In various embodiments, an elongate shaft and a scope housing are rotatably attached to a camera head. In various embodiments, a simulated light cable is fixedly attached to and extends from a scope housing. In various embodiments, a simulated light cable is arranged to not be able to be connected to a light source. In various embodiments, a lens is disposed within the optics mount and angled at a predetermined angle relative to the longitudinal axis. In various embodiments, the predetermined angle is less than ninety degrees, is less than thirty degrees, is about thirty degrees, and/or ranges from +/−15 degrees to +/−45 degrees. In various embodiments, an image sensor is disposed within a pocket of an optics mount. In various embodiments, an image sensor has a distal face facing a distal end of an elongate shaft and angled at a predetermined angle relative to a longitudinal axis defined by the elongate shaft.

In various embodiments, a controller box is connected to the simulated light cable and the data cable. In various embodiments, a controller is encased in a controller box and connected to a simulated light cable and a data cable. In various embodiments, a surgical trainer comprises a processor connected to a data cable. In various embodiments, a camera head comprises a proximal portion comprising a simulated camera head housing and a distal portion comprising a simulated coupler. In various embodiments, a simulated camera head housing is curved and comprises one or more flat surfaces arranged to facilitate gripping and maintaining the simulated camera head housing stationary with a scope housing connected thereto being rotated.

In various embodiments, a simulated camera head housing comprises a tapered tail terminating below a horizontal midline. In various embodiments, a simulated coupler differentiates a camera head from a scope housing. In various embodiments, a scope housing comprises a proximal portion comprising a rotary barrel and a distal portion comprises an adapter housing. In various embodiments, a camera head encases the rotary barrel and the simulated coupler is disposed between the simulated light cable and a proximal end of the camera head. In various embodiments, an adapter circuit is fixedly connected to a simulated light cable and is enclosed within an adapter housing.

In various embodiments, a simulated light cable extends perpendicularly relative to a longitudinal axis extending through and along a portion of a scope. In various embodiments, a simulated light cable is a USB or HDMI cable. In various embodiments, a simulated camera head housing comprises one or more internal ribs, providing one or more bearing surfaces for a rotary barrel to contact and rotate against within a simulated camera head housing. In various embodiments, a frictional interface is disposed between a scope housing and a camera head and configured to prevent inadvertent rotational movement between the scope housing and the camera head.

In various embodiments, an encoder is disposed within a cavity defined by a rotary barrel. In various embodiments, an encoder comprises an encoder shaft extending out and through an aperture in a proximal end of a rotary barrel and is fixedly secured to a camera head. In various embodiments, an encoder is an absolute encoder and is connected to an adapter circuit in an adapter housing via wires extending through a connector housing disposed between a rotary barrel and an adapter housing. In various embodiments, an encoder provides rotational data to an adapter circuit. In various embodiments, an adapter circuit provides rotational data to a controller through a simulated light cable. In various embodiments, an elongate shaft has a non-adjustable length, is not bendable, and not able to be articulated. In various embodiments, an optics mount has a distal face facing a distal end of an elongate shaft and is angled at a predetermined angle relative to a longitudinal axis.

In various embodiments, an optics mount has a proximal face facing a proximal end of an elongate shaft and is angled at a predetermined angle relative to a longitudinal axis. In various embodiments, an optics floor is disposed within a distal end of an elongate shaft and is positioned next to an optics mount. In various embodiments, an optics floor has a distal face facing a distal end of an elongate shaft and is angled at a predetermined angle relative to a longitudinal axis. In various embodiments, an optics floor has a proximal face facing a proximal end of an elongate shaft and is angled at a predetermined angle relative to a longitudinal axis.

In various embodiments, an optics cover is disposed next to a lens and arranged to protect the lens. In various embodiments, an optics cover is optically clear and is configured to filter out near-infrared wavelengths. In various embodiments, a light emitting diode is disposed within a square cavity within an optics mount. In various embodiments, one or more wires are connected to a light emitting diode. In various embodiments, one or more wires extends to a scope housing and is disposed within a channel within an optics mount. In various embodiments, a channel in the optics mount is connected to a square cavity in the optics mount. In various embodiments, an optics mount has a projection facing proximally and arranged to interface with an angled surface at a distal end of an elongate shaft. In various embodiments, an optics mount has a dovetail facing proximally and is arranged to interface with a slot within an optics floor.

In various embodiments, a ribbon cable is connected to an image sensor and extends to a scope housing. In various embodiments, a ribbon cable is configured to provide power to an image sensor and to supply data from an image sensor to an adapter circuit. In various embodiments, a pocket of an optics mount has a depth smaller than a thickness of an image sensor. In various embodiments, an optics mount has a threaded portion and a lens mount comprises a lens and has corresponding threads, the lens mount being configured to be threaded into the optics mount. In various embodiments, a lens has a distal face facing the distal end of an elongate shaft and is angled at a predetermined angle relative to a longitudinal axis. In various embodiments, an optics cover has a distal face facing a distal end of an elongate shaft and angled at a predetermined angle relative to a longitudinal axis. In various embodiments, a light emitting diode has a distal face facing a distal end of an elongate shaft and is angled at the predetermined angle relative to a longitudinal axis. In various embodiments, a light emitting diode is placed near an outer diameter of the optics mount. In various embodiments, a wall within an optics mount is disposed between a light emitting diode and a lens. In various embodiments, a controller receives a camera image from an image sensor and receives rotational data from an absolute encoder. In various embodiments, the predetermined angle is less than ninety degrees, is less than thirty degrees, is about thirty degrees, and/or ranges from +/−15 degrees to +/−45 degrees.

In various embodiments, a processor is connected to a controller via a data cable. In various embodiments, a processor is configured to rotate a camera image utilizing rotational data and to transmit a rotated camera image to a display screen of a surgical trainer. In various embodiments, a processor is configured to crop ta rotated camera image into a predetermined circular shape prior to transmitting a rotated camera image to a display screen. In various embodiments, a predetermined circular shape has a diameter equal to a height of a camera image received from an image sensor. In various embodiments, a predetermined circular shape has curved sides between a flat top edge and a flat bottom edge. In various embodiments, a flat top edge matches a flat top edge of a display screen and a flat bottom edge matches a flat bottom edge of the display screen. In various embodiments, a controller comprises an image sensor microcontroller, an encoder microcontroller, a power supply, and/or a USB hub.

In various embodiments, a surgical simulation scope comprises a handle and a cylindrical elongate shaft having a proximal end coupled to the handle and a distal end comprising a cylindrical optics mount. In various embodiments, a cylindrical lens is disposed within a cylindrical optics mount. In various embodiments, a light emitting diode is disposed within a cylindrical optics mount near a cylindrical lens and having a flat distal surface facing a distalmost end of a cylindrical elongate shaft. In various embodiments, a light emitting diode is coupled to one or more wires extending proximally and terminating in a handle. In various embodiments, an image sensor is disposed within a pocket of a cylindrical optics mount and is between a cylindrical lens and a ribbon cable attached to the image sensor. In various embodiments, a ribbon cable extends proximally and terminates in the handle.

In various embodiments, the optics mount has one or more projections arranged to interface with one or more corresponding notches in the elongate shaft to clock the optics mount to the elongate shaft. In various embodiments, the optics mount is clocked and secured within the elongate shaft in that the lens and image sensor are aligned with an identical upward orientation as the handle. In various embodiments, the elongate shaft is clocked to the handle via a slot in the elongate shaft arranged to interface with a rib in the handle.

In various embodiments, the optics cover has a diameter arranged to match a diameter of an aperture in the optics mount. In various embodiments, the optics cover is arranged to fit within an aperture in the optics mount in which the lens is disposed. In various embodiments, the optics cover has a diameter less than a diameter of the optics mount.

In various embodiments, the light emitting diode has a square shape. In various embodiments, the light emitting diode is connected to a printed circuit board assembly. In various embodiments, an optics cover is located in a counterbore in front of a lens. In various embodiments, a counterbore is deeper than the optics cover is thick. In various embodiments, the optics mount has the counterbore and a chamfer at an entry of the aperture of the optics mount. In various embodiments, an image sensor microcontroller and a power supply are integrated into a controller or controller PCBA. In various embodiments, the handle defines an interior and houses a controller or controller PCBA. The handle, in various embodiments, has a curved body relative to a longitudinal axis of the elongate shaft. In various embodiments, a data cable connects a handle and a controller or controller PCBA to a surgical trainer and, in various embodiments, a processor and a video display are attached to a surgical trainer to display images captured by an image sensor and processed by a microcontroller on a controller or controller PCBA of contents within a cavity defined by the surgical trainer.

Many of the attendant features of the present invention will be more readily appreciated as the same becomes better understood by reference to the foregoing and following description and considered in connection with the accompanying drawings in which like reference symbols designate like parts throughout.

BRIEF DESCRIPTION OF THE DRAWINGS

The present inventions may be understood by reference to the following description, taken in connection with the accompanying drawings in which the reference numerals designate like parts throughout the figures thereof.

6

Figure 13:
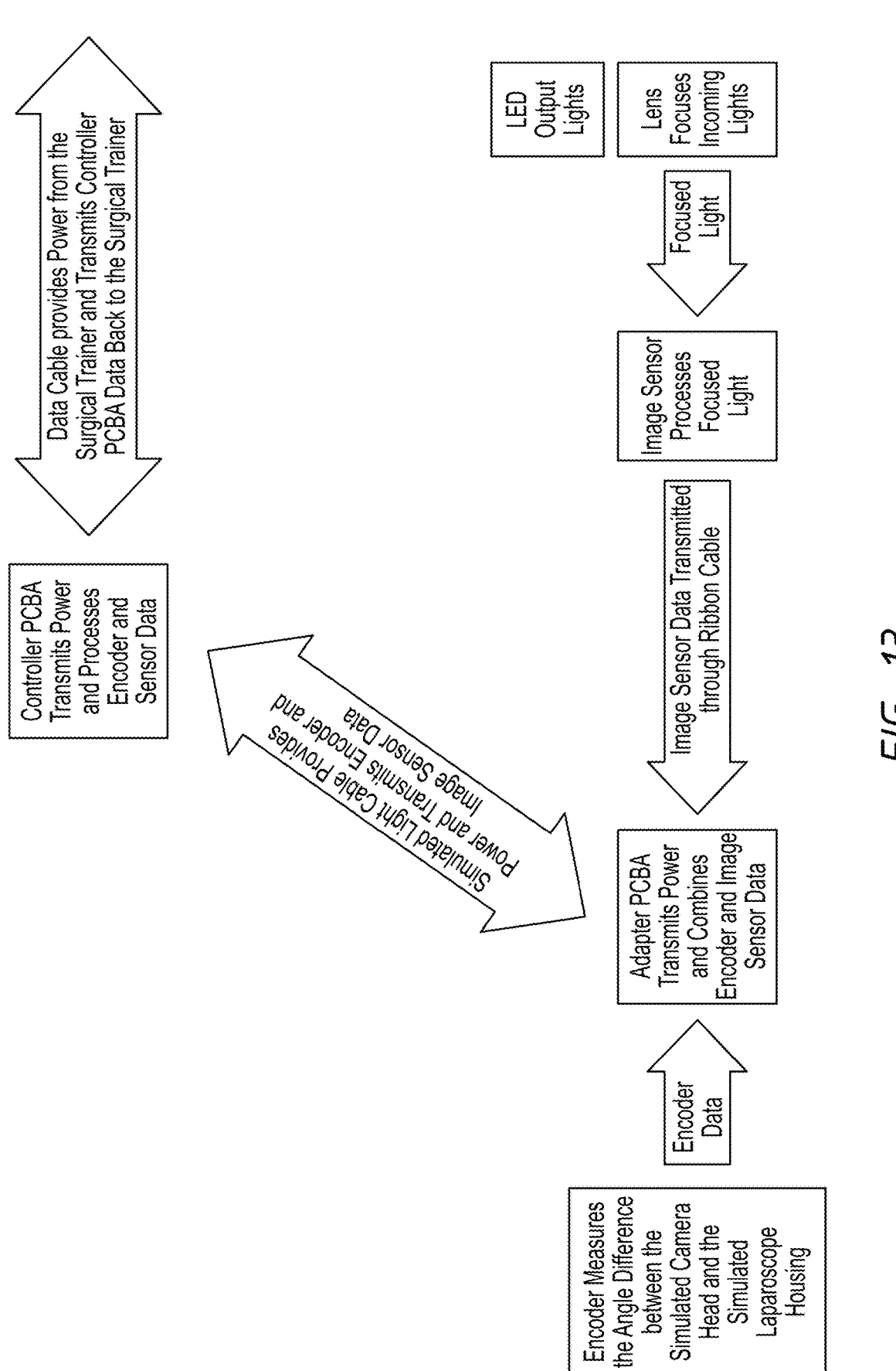

FIG. 13 is a process diagram of a surgical simulation scope system in accordance with various embodiments of the present invention.

Figure 14:
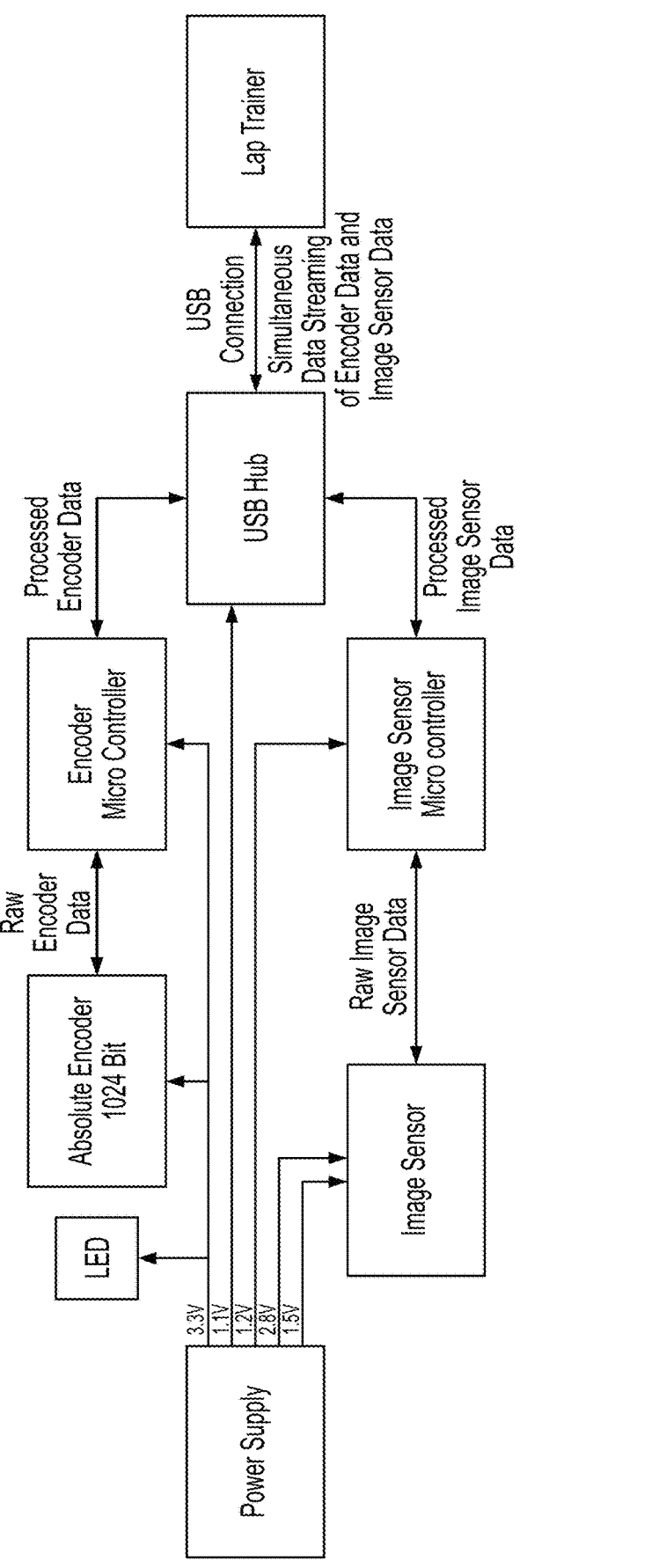

FIG. 14 is a functional block diagram of a surgical simulation scope system in accordance with various embodiments of the present invention.

Figure 15A:
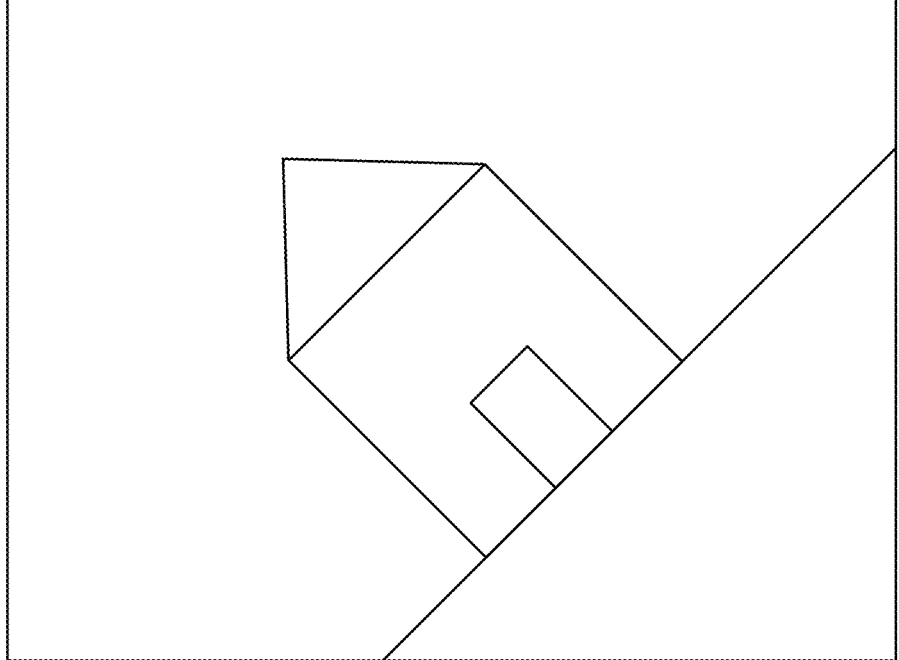

FIG. 15A is an exemplary image in accordance with various embodiments of the present invention.

Figure 15B:
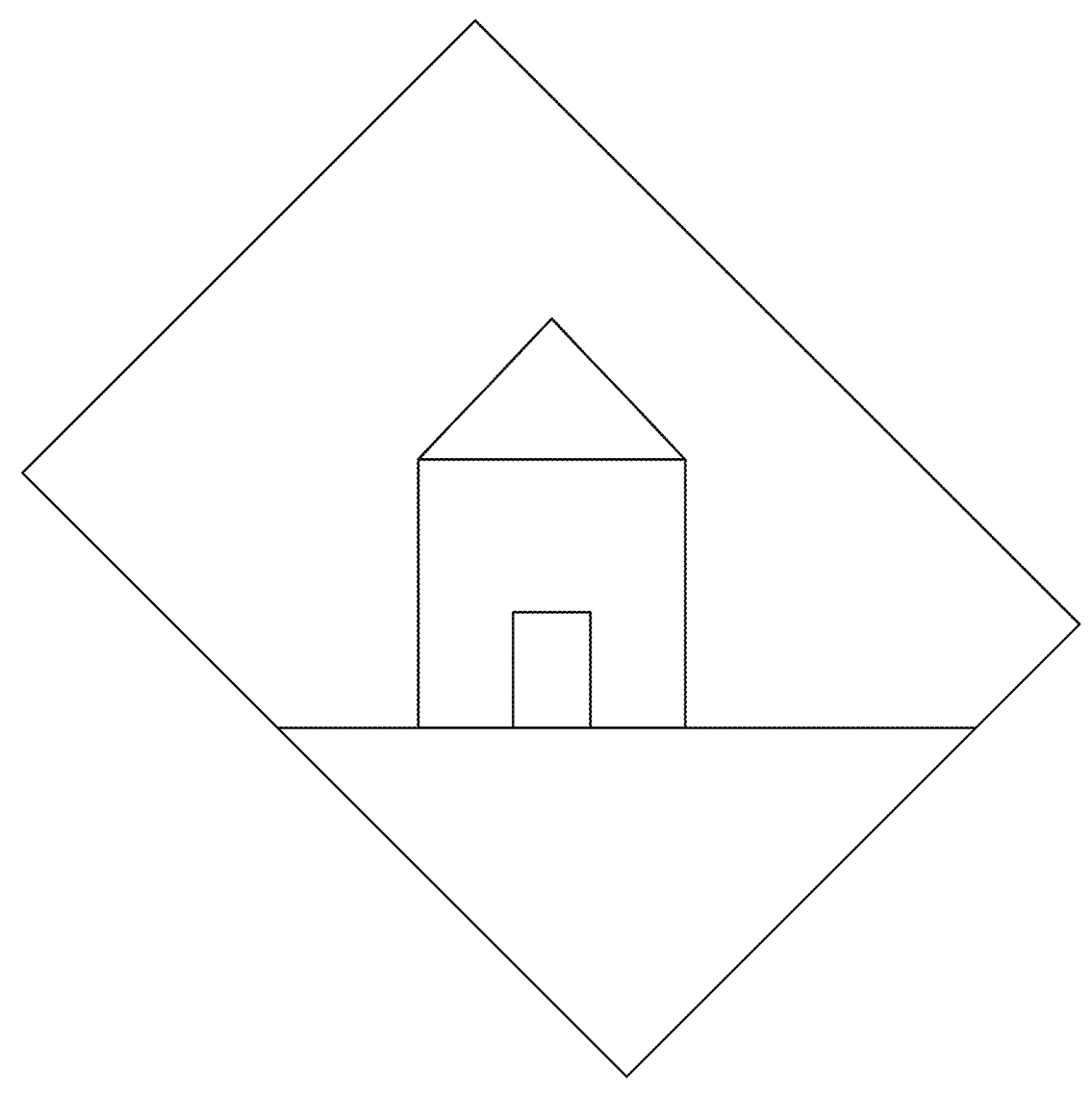

FIG. 15B is a rotated exemplary image in accordance with various embodiments of the present invention.

Figure 15C:
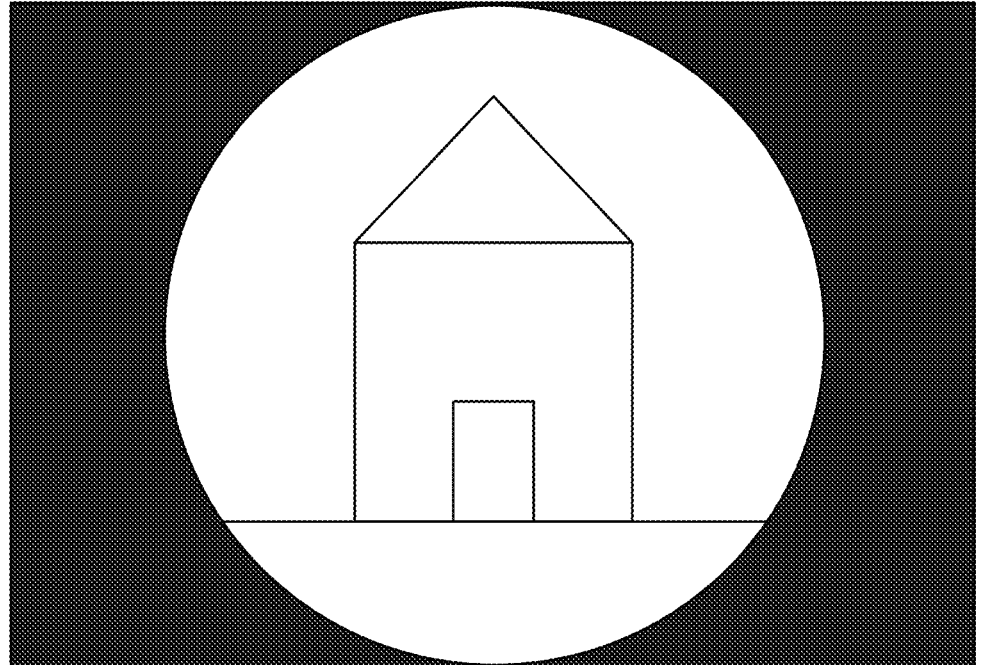

FIG. 15C is a cropped exemplary image in accordance with various embodiments of the present invention.

Figure 16A:
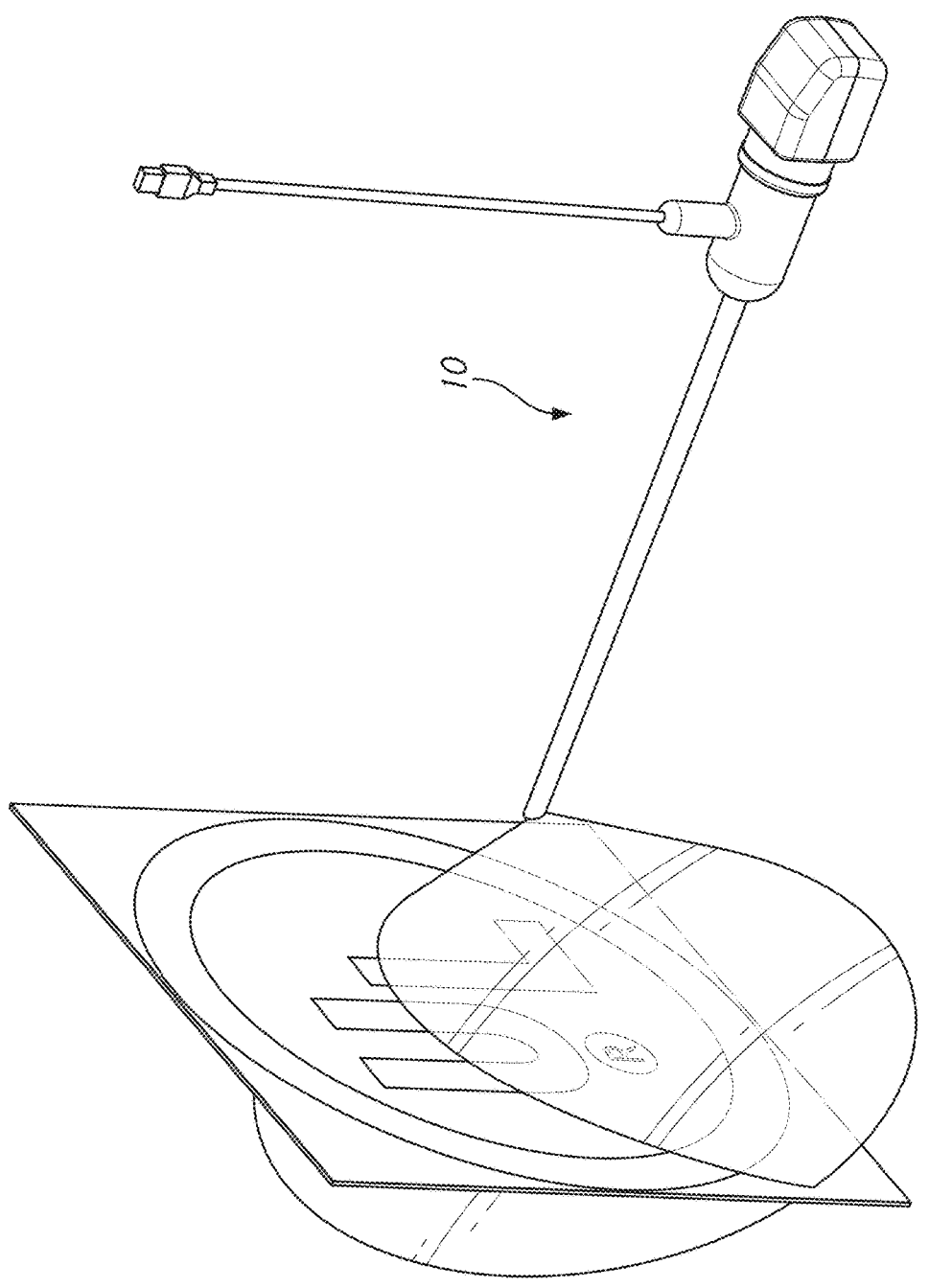

FIG. 16A is a representative view of a surgical simulation scope in accordance with various embodiments of the present invention.

Figure 16C:
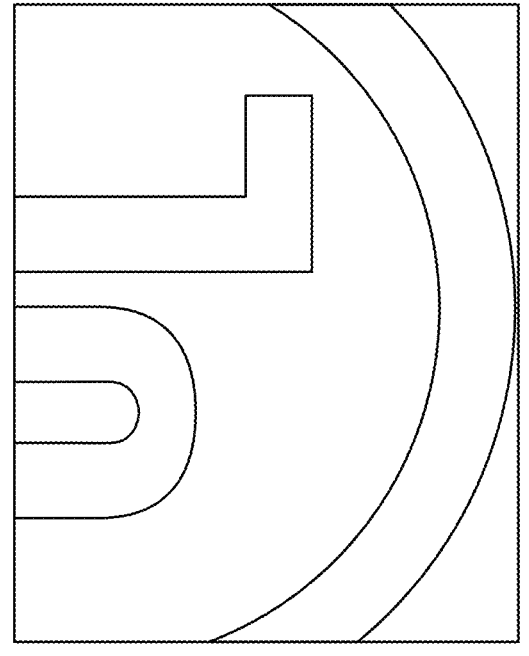
Figure 16B:
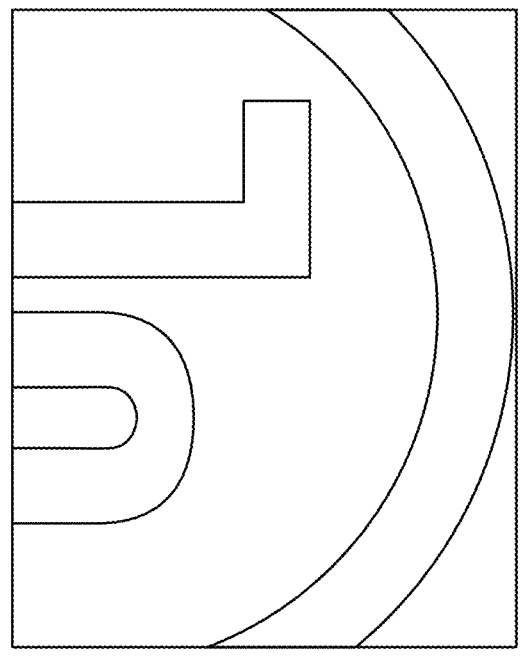

FIG. 16B is an exemplary camera image in accordance with various embodiments of the present invention.

FIG. 16C is a rotated exemplary image in accordance with various embodiments of the present invention.

Figure 17A:
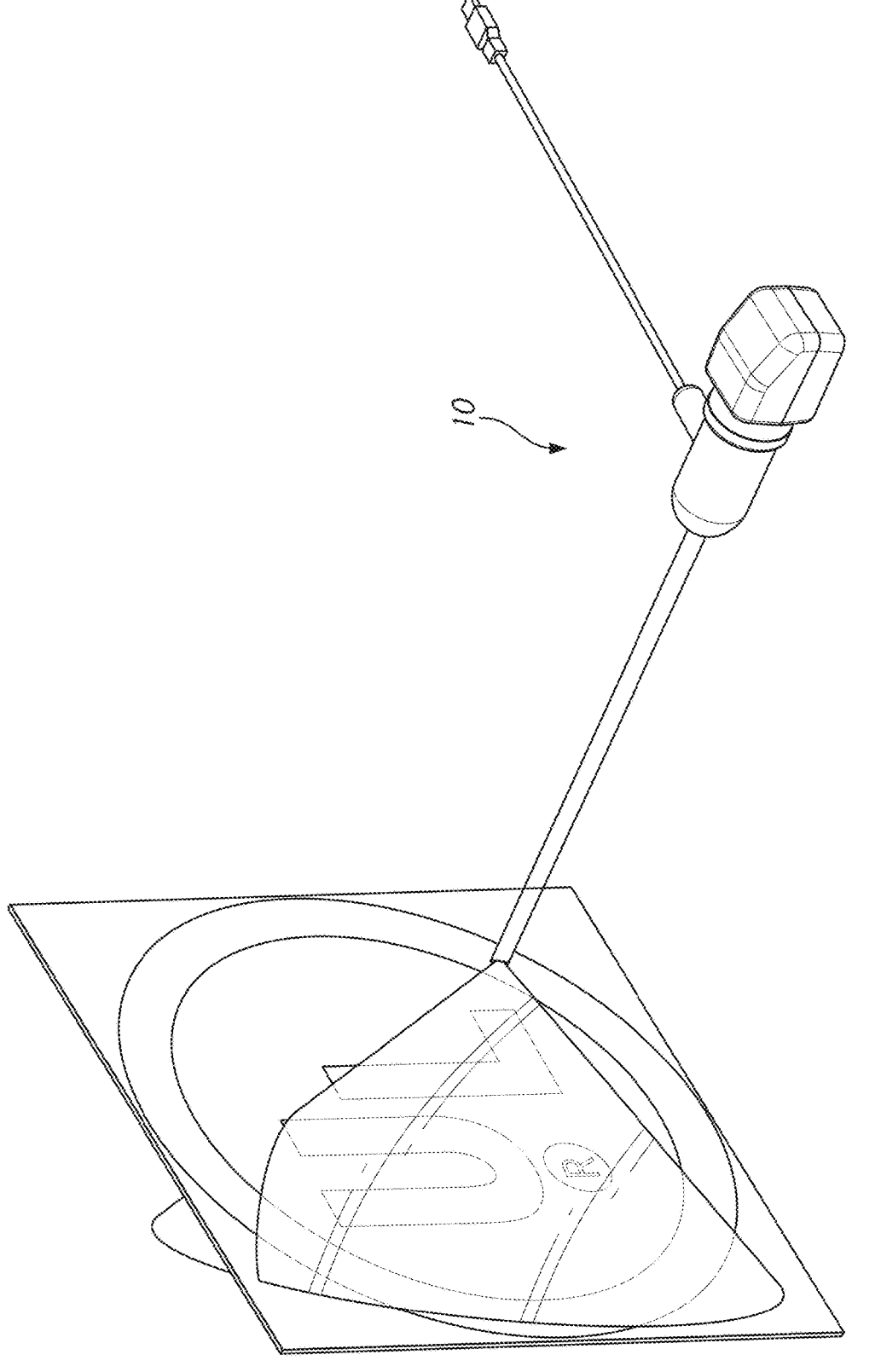

FIG. 17A is a representative view of a rotated surgical simulation scope in accordance with various embodiments of the present invention.

Figure 17C:
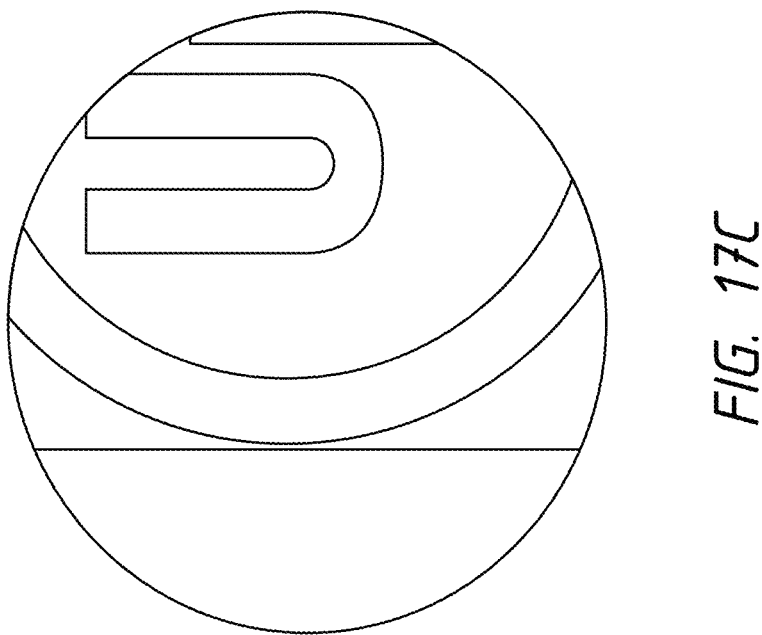
Figure 17B:
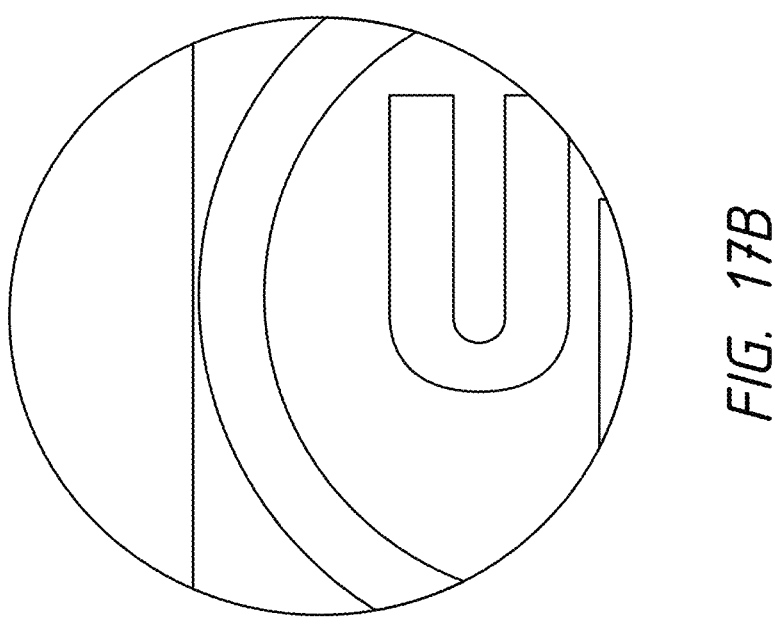

FIG. 17B is an exemplary camera image in accordance with various embodiments of the present invention.

FIG. 17C is a rotated exemplary image in accordance with various embodiments of the present invention.

Figure 18A:
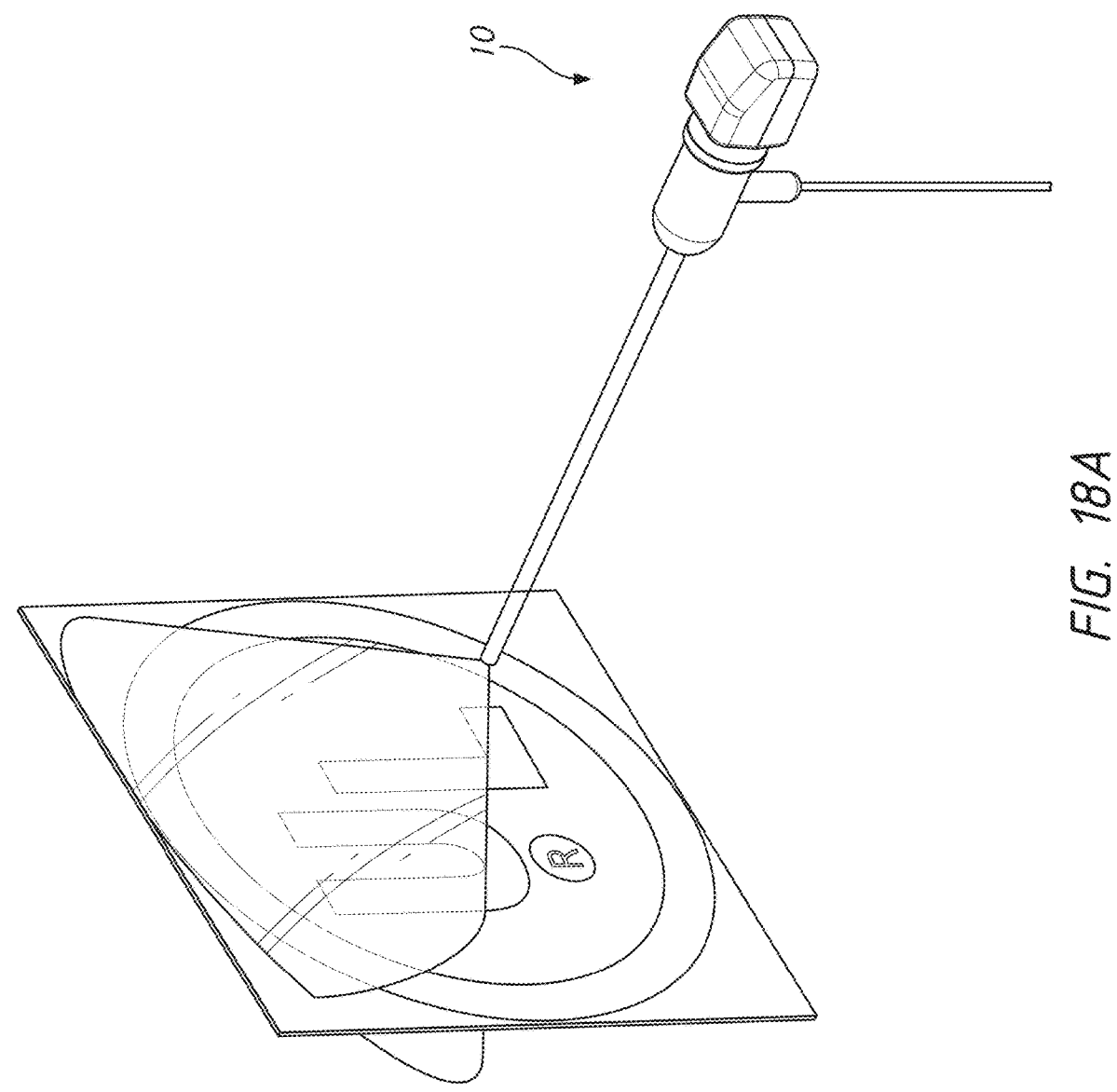

FIG. 18A is a representative view of a rotated surgical simulation scope in accordance with various embodiments of the present invention.

Figure 18C:
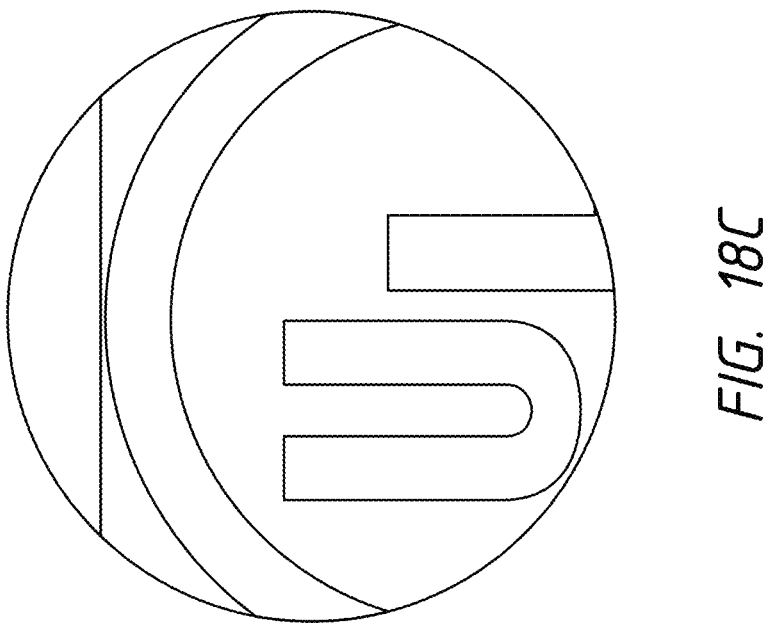
Figure 18B:
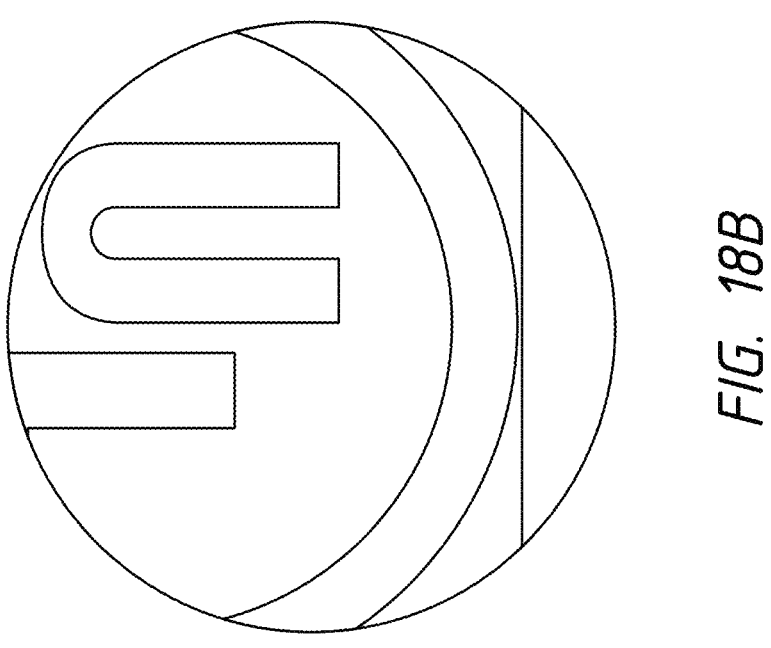

FIG. 18B is an exemplary camera image in accordance with various embodiments of the present invention.

FIG. 18C is a rotated exemplary image in accordance with various embodiments of the present invention.

Figure 19A:
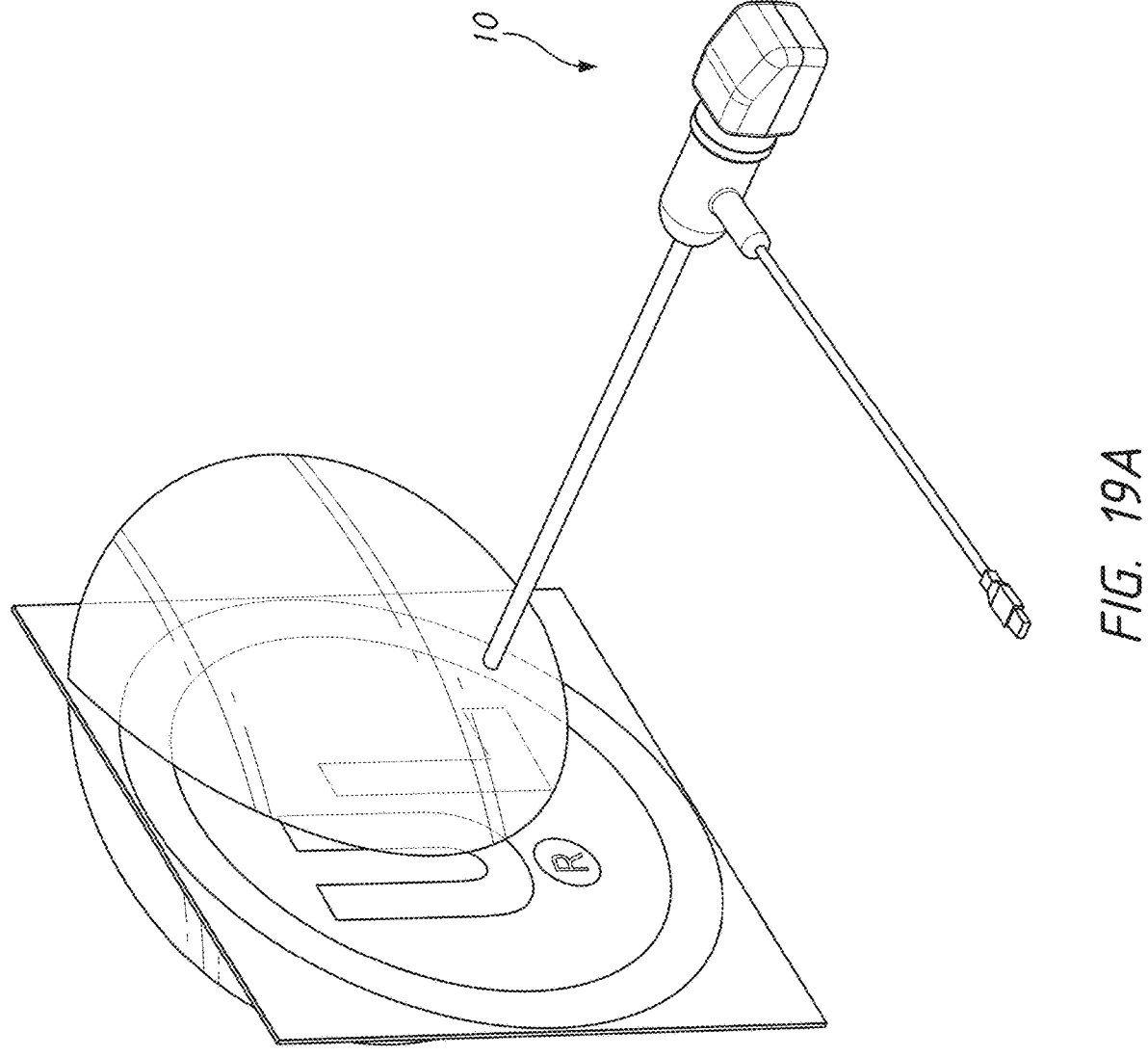

FIG. 19A is a representative view of a rotated surgical simulation scope in accordance with various embodiments of the present invention.

Figure 19C:
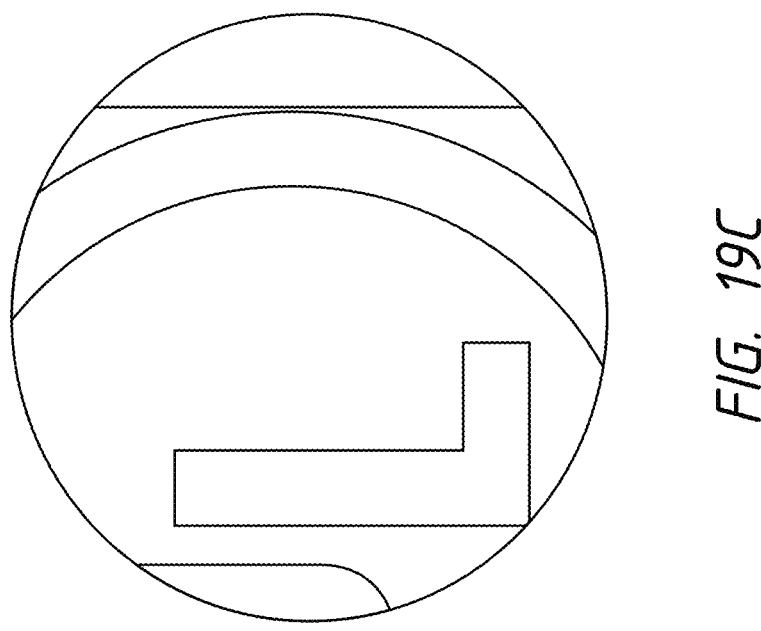
Figure 19B:
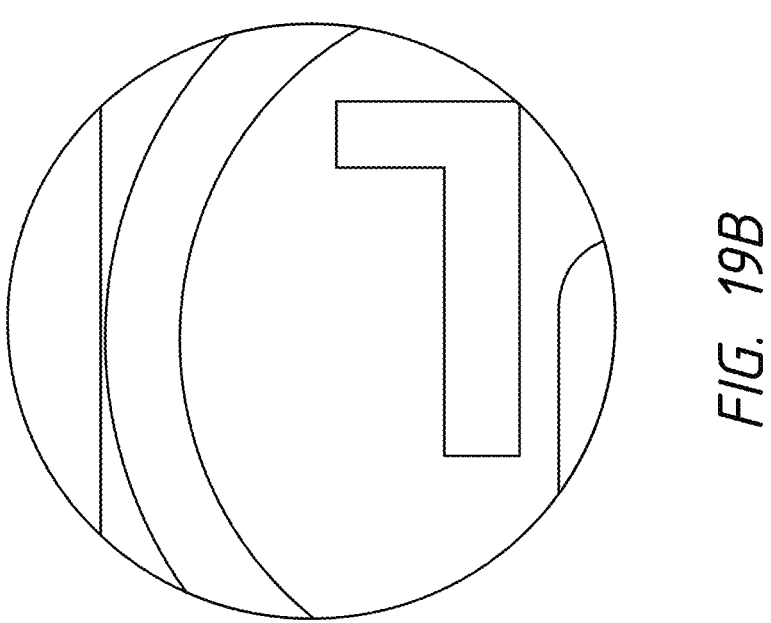

FIG. 19B is an exemplary camera image in accordance with various embodiments of the present invention.

FIG. 19C is a rotated exemplary image in accordance with various embodiments of the present invention.

Figure 20:
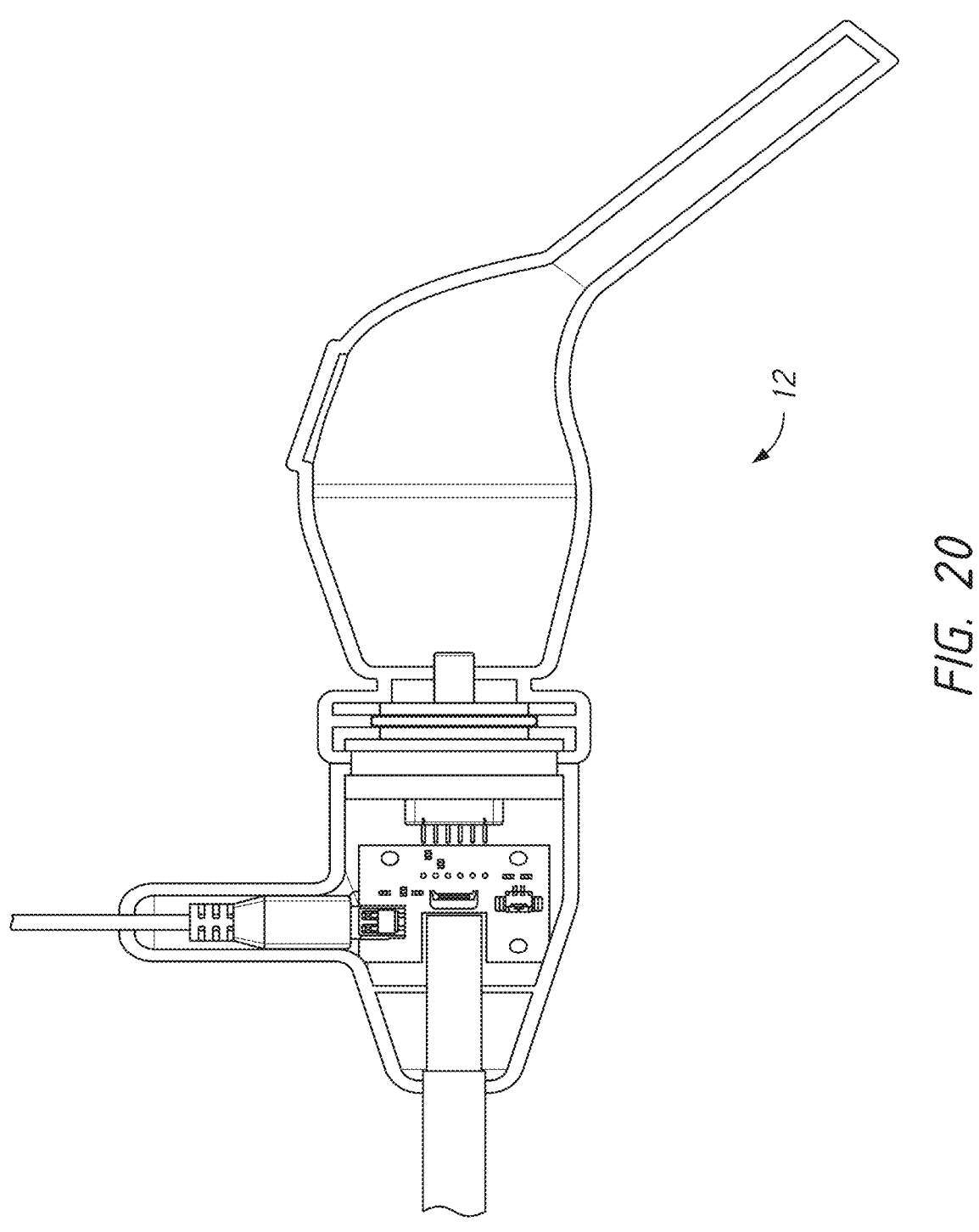

FIG. 20 is a side view of portions of a surgical simulation scope in accordance with various embodiments of the present invention.

Figure 21:
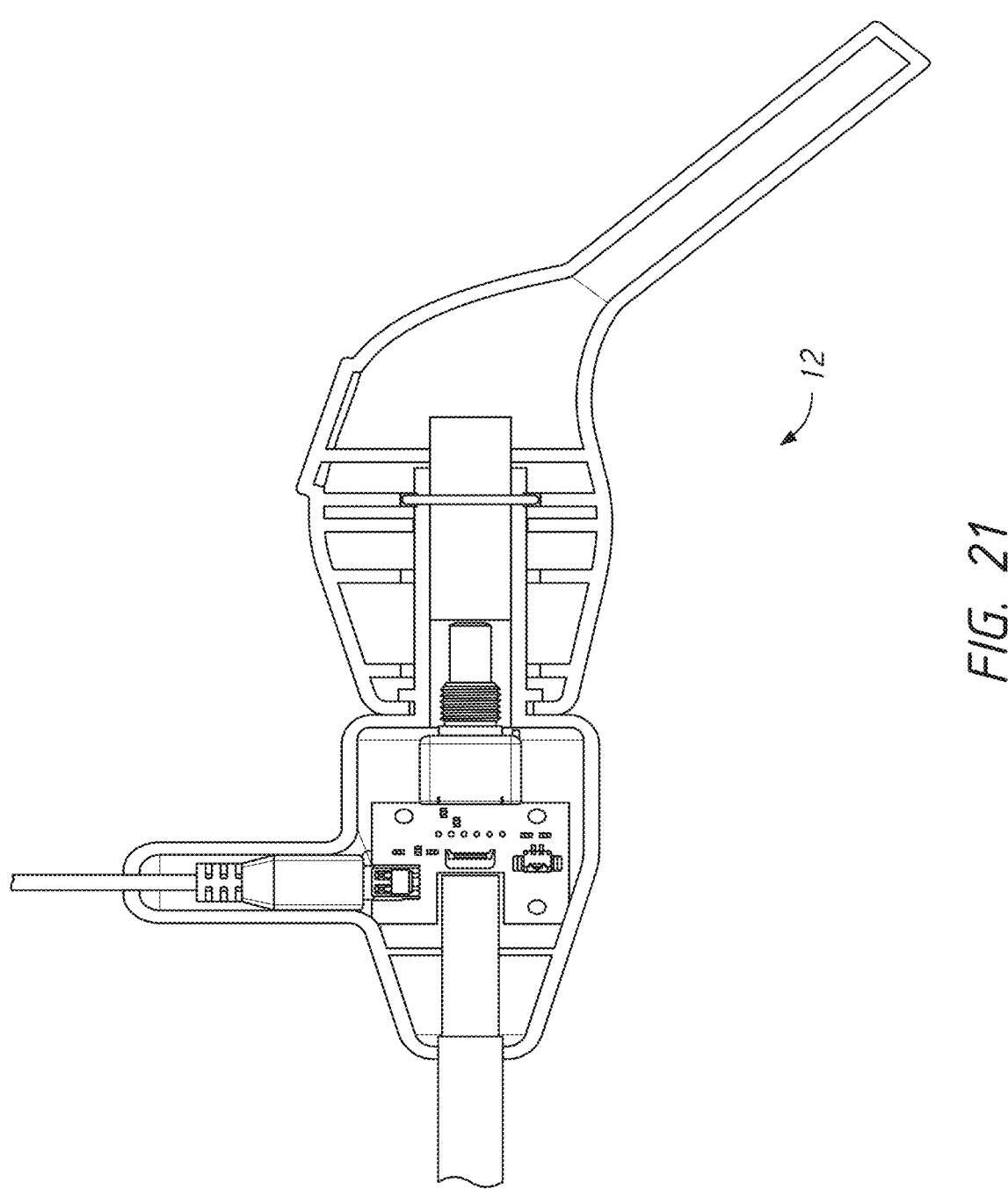

FIG. 21 is a side view of portions of a surgical simulation scope in accordance with various embodiments of the present invention.

Figure 22:
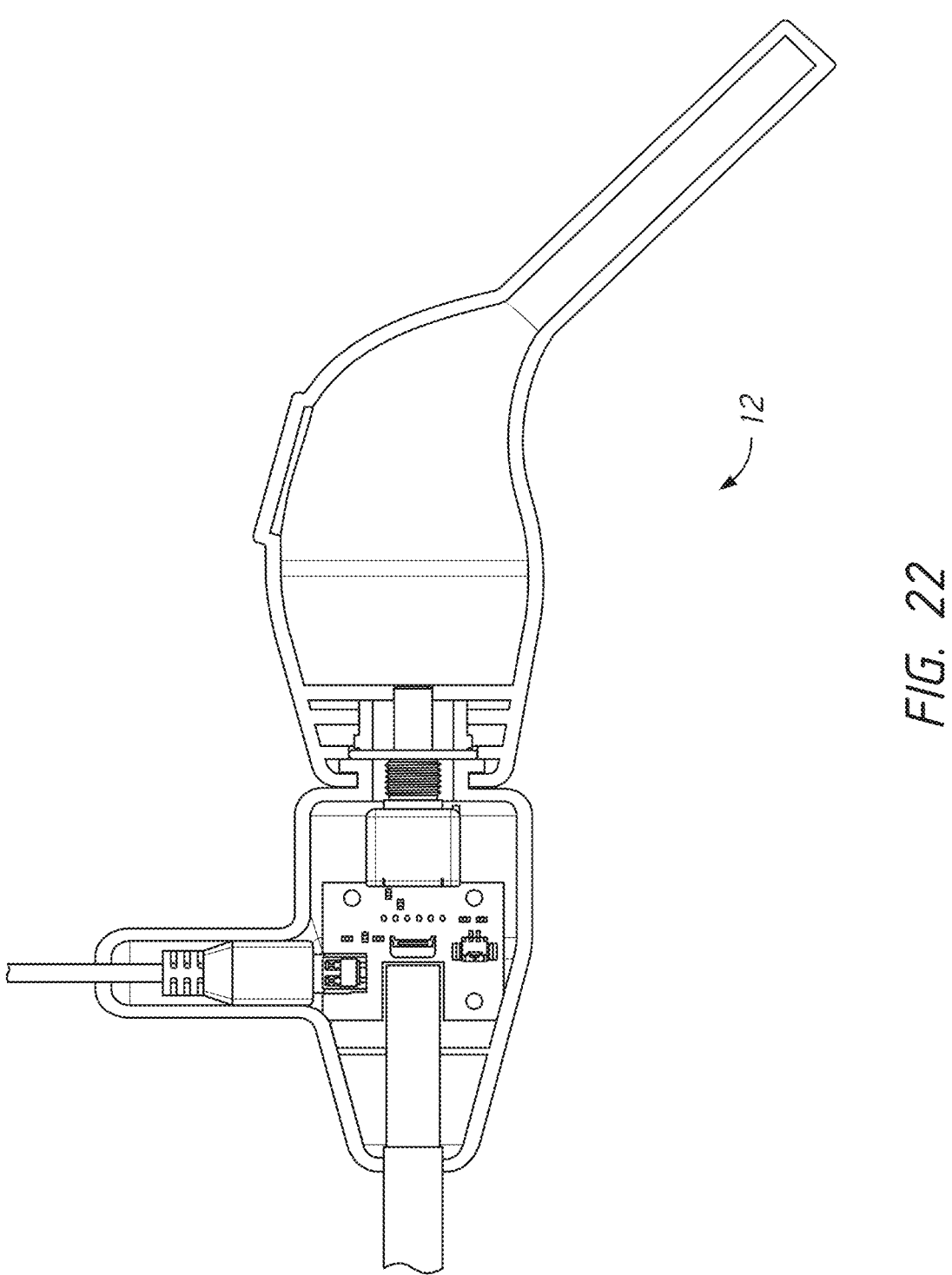

FIG. 22 is a side view of portions of a surgical simulation scope in accordance with various embodiments of the present invention.

Figure 23:
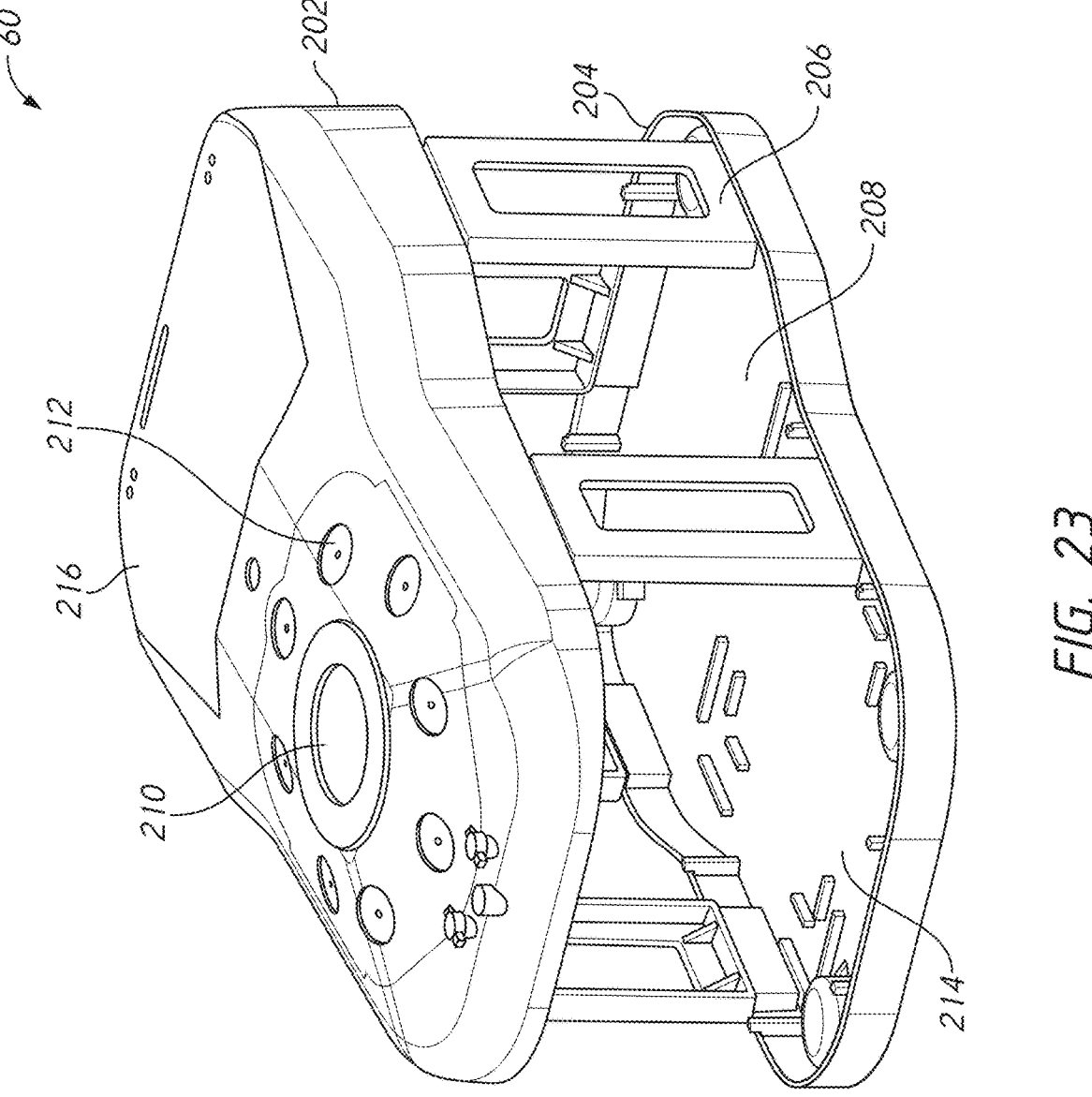

FIG. 23 is a perspective view of a laparoscopic or surgical trainer of a surgical simulation angled surgical system in accordance with various embodiments of the present invention.

FIGS. 24-28 are perspective views of a surgical simulation scope system in accordance with various embodiments of the present invention.

Figure 29:
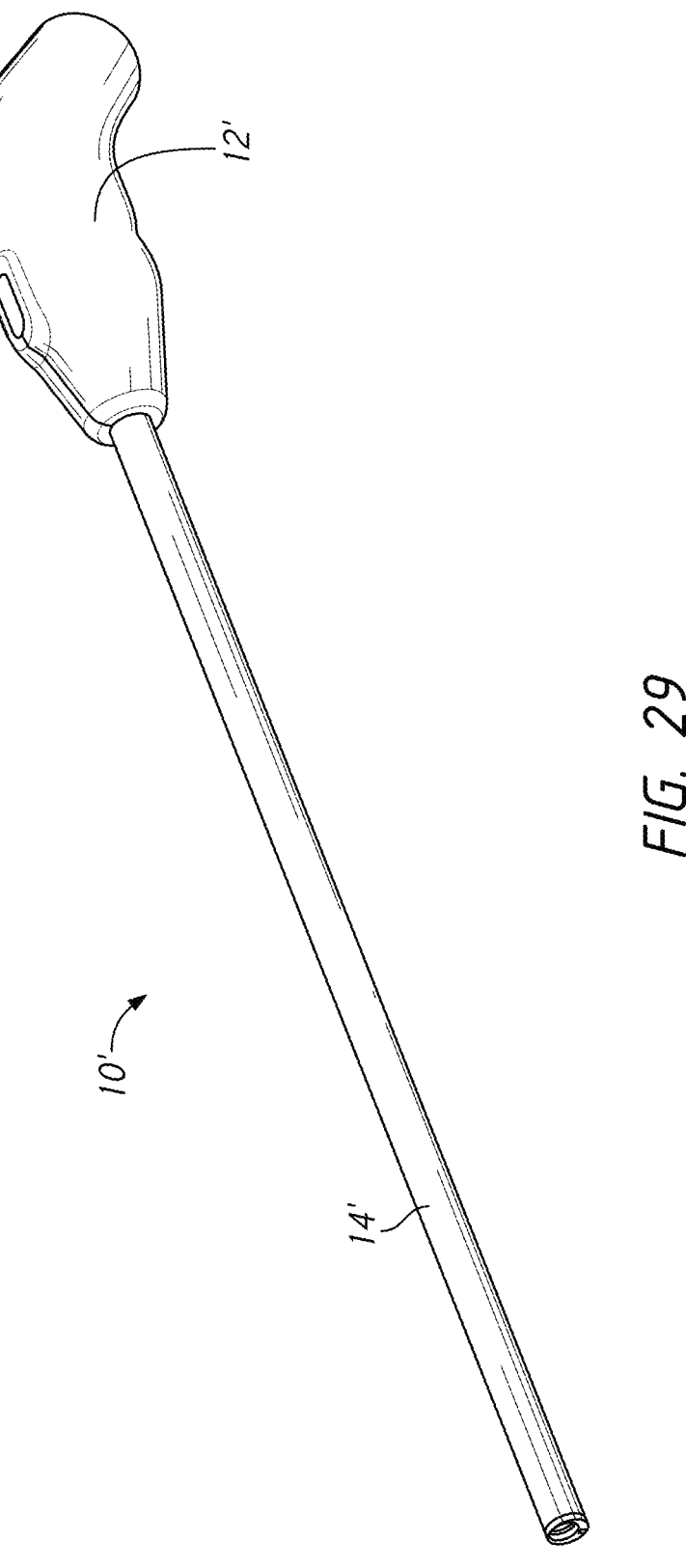

FIG. 29 is a perspective view of a surgical simulation scope in accordance with various embodiments of the present invention.

Figure 30:
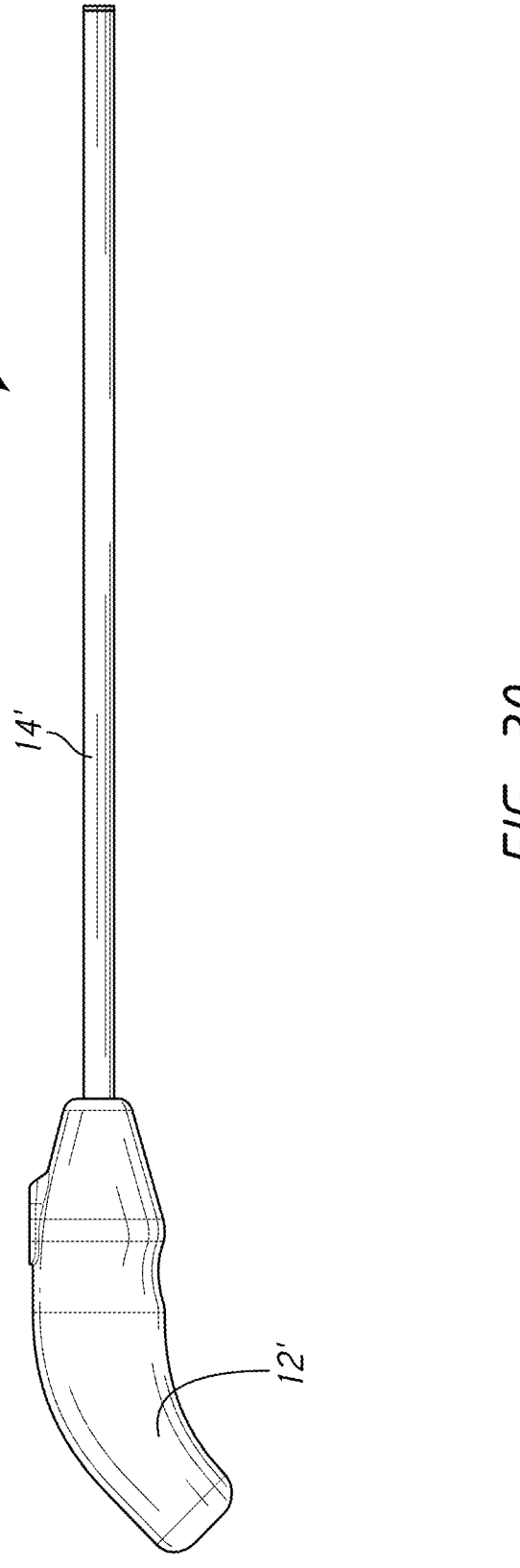
Figure 31:
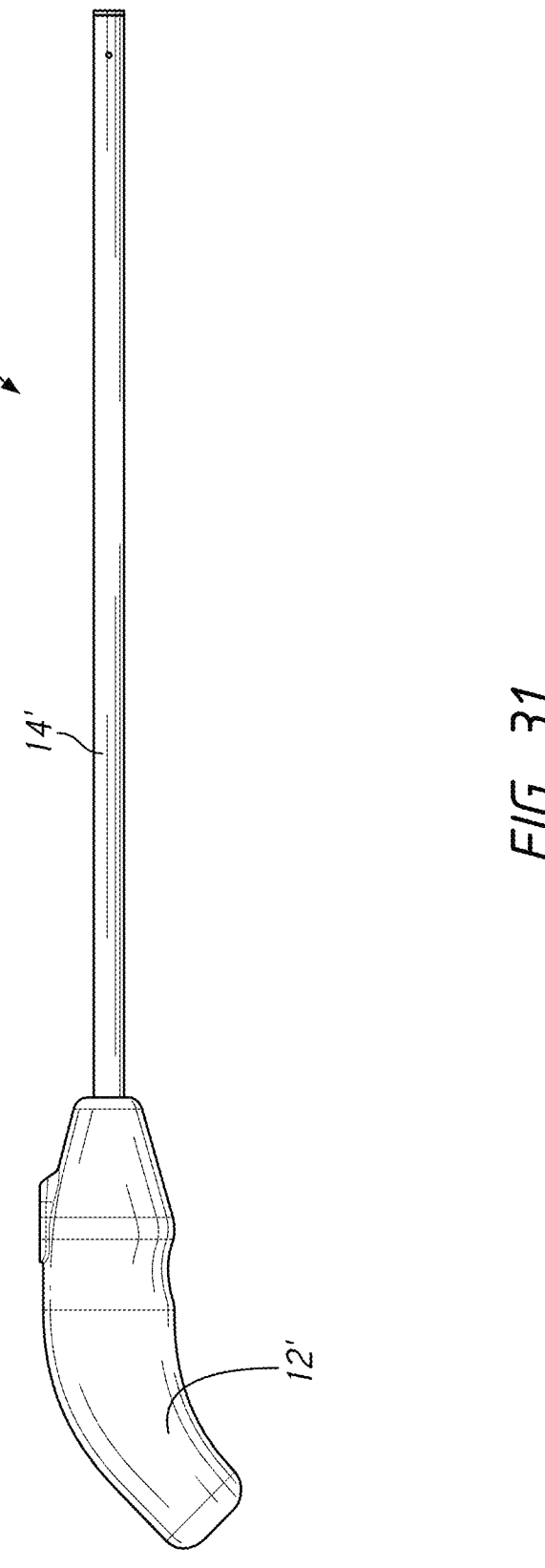

FIGS. 30-31 are side views of a surgical simulation scope in accordance with various embodiments of the present invention.

Figure 32:
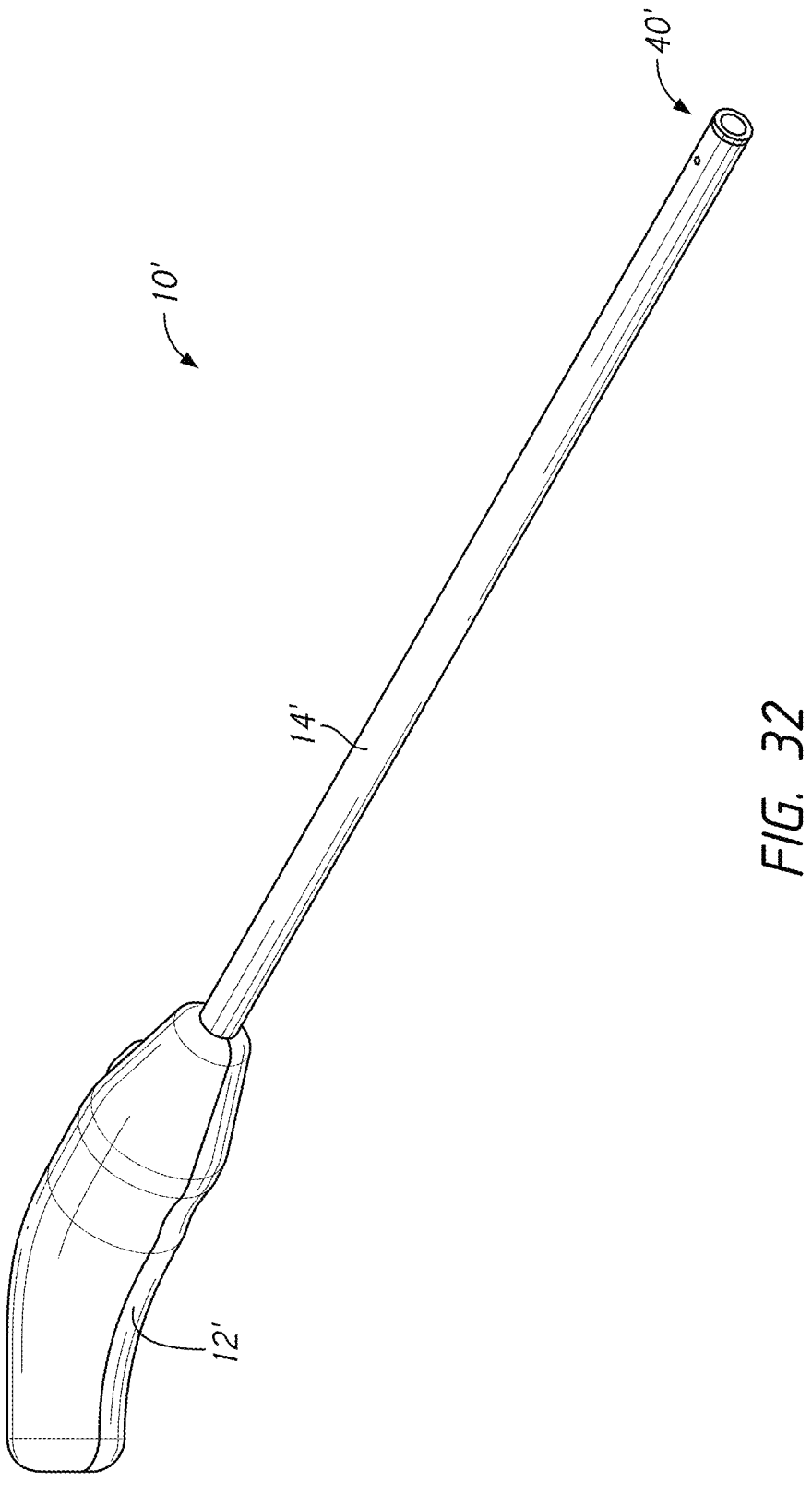

FIG. 32 is a perspective view of a surgical simulation scope in accordance with various embodiments of the present invention.

US 12,646,423 B2

7

Figure 33:
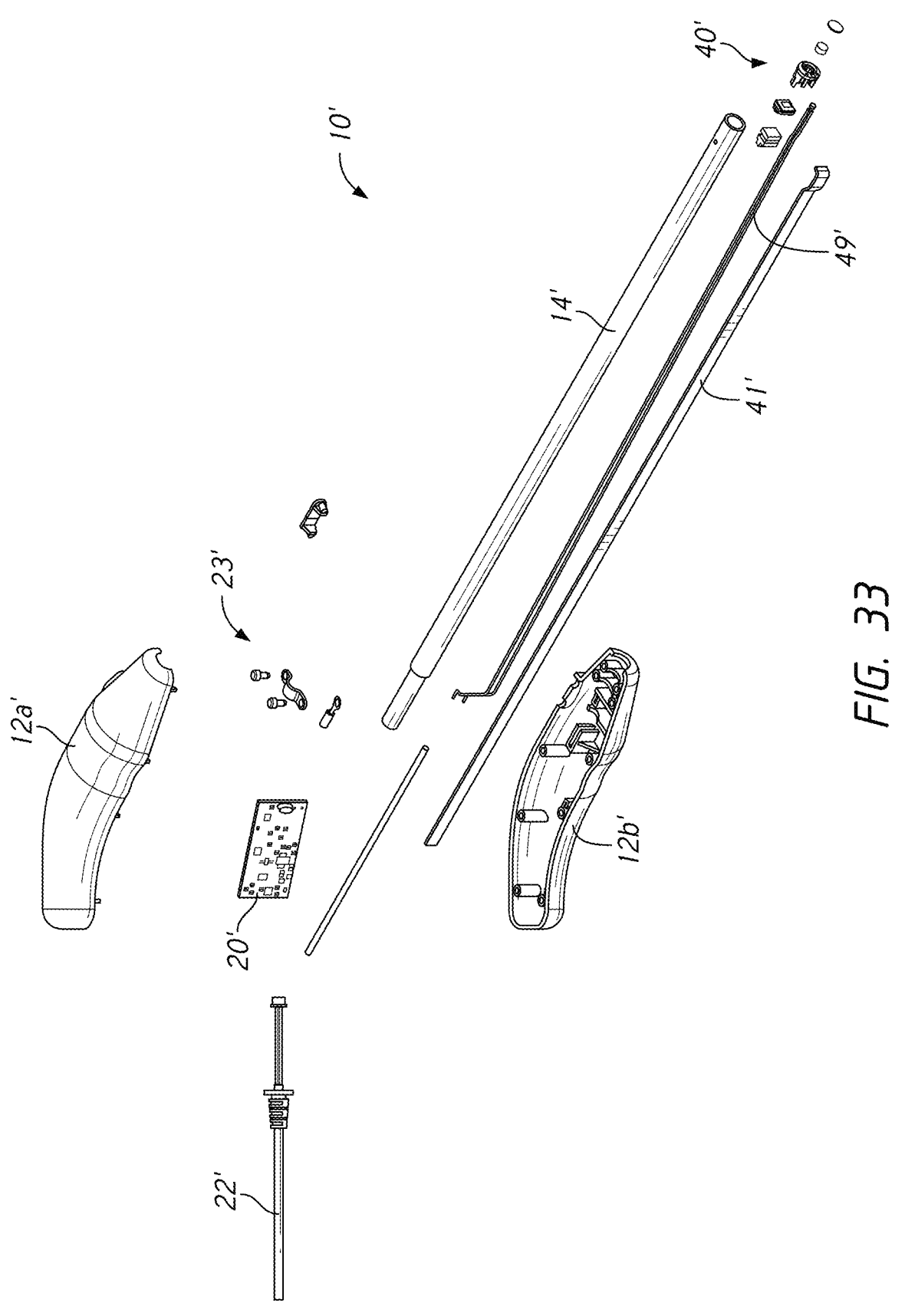

FIG. 33 is an exploded view of a surgical simulation scope in accordance with various embodiments of the present invention.

Figure 34:
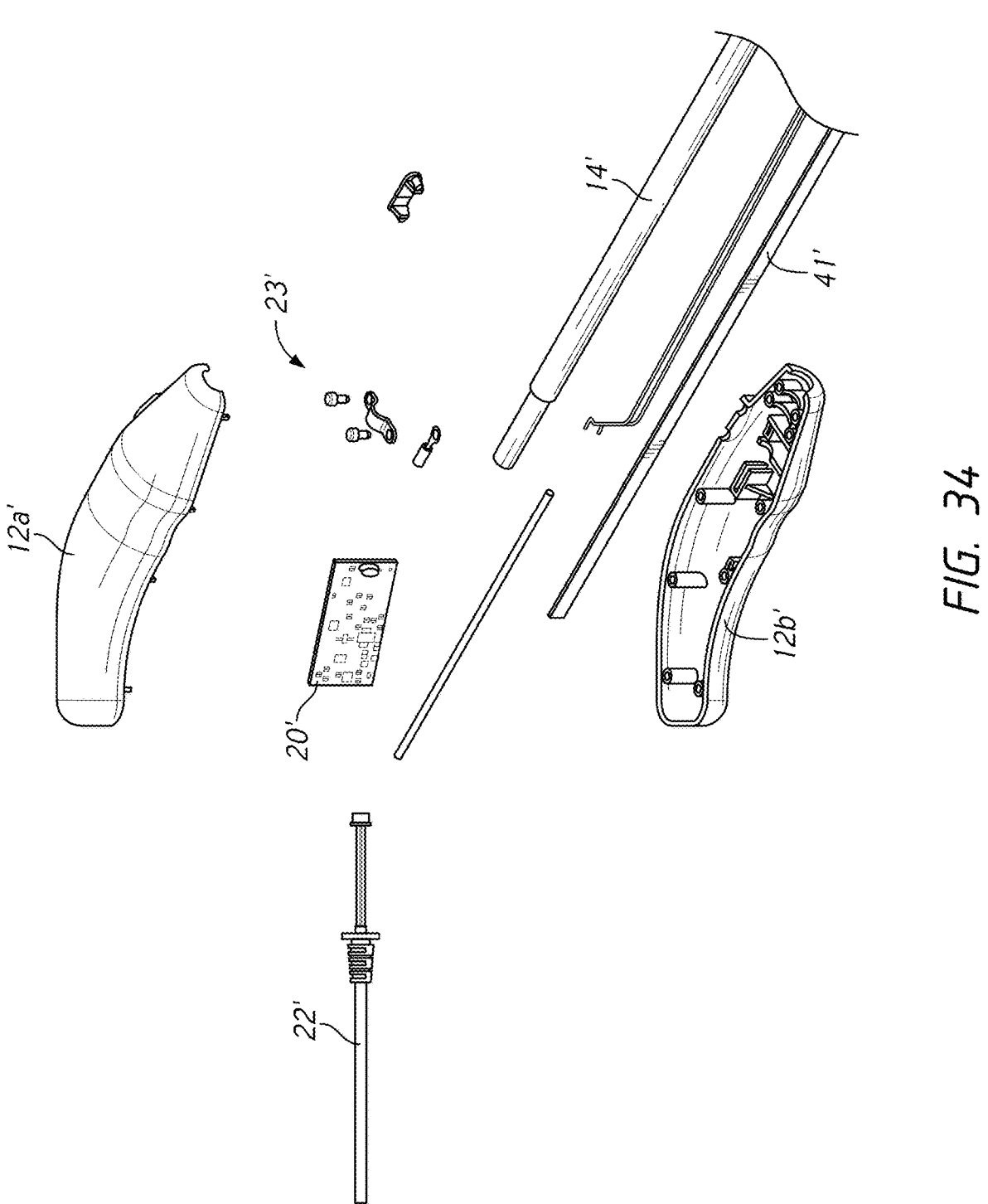

FIG. 34 is an exploded view of a proximal portion of a surgical simulation scope in accordance with various embodiments of the present invention.

Figure 35:
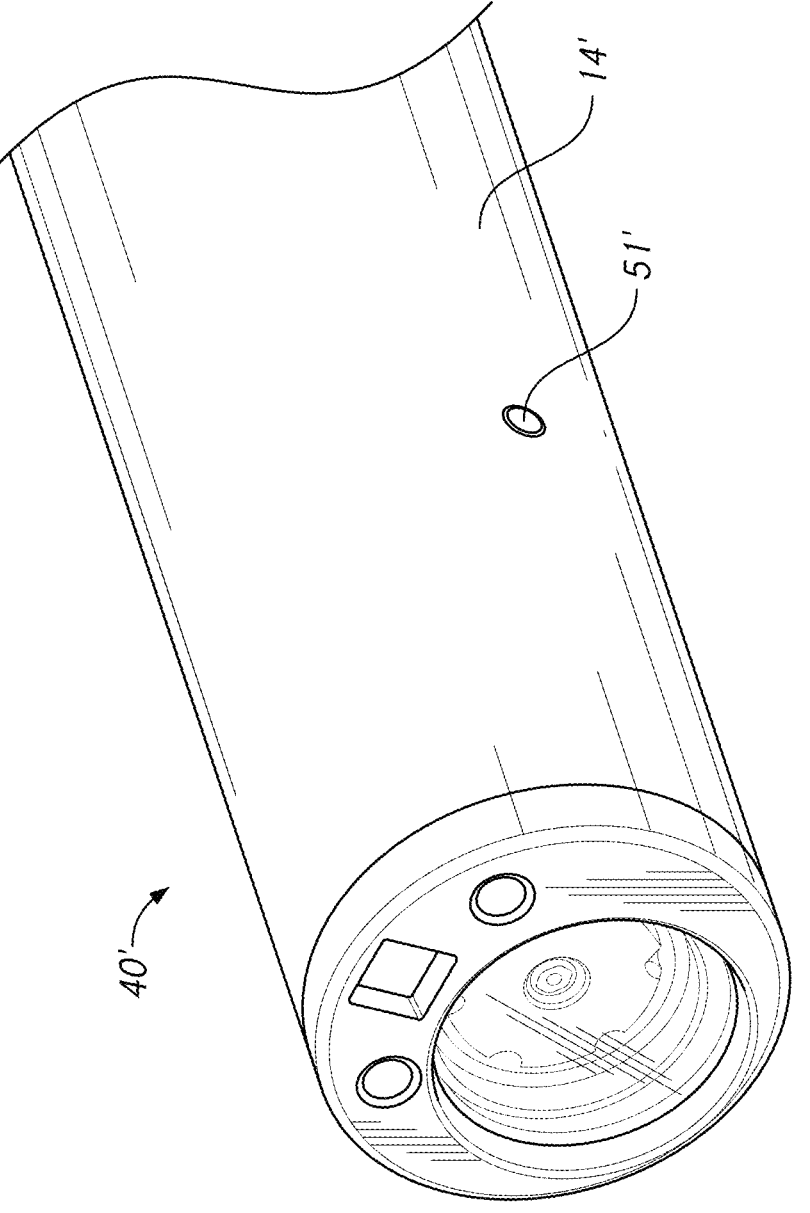

FIG. 35 is a perspective view of a distal portion of a surgical simulation scope in accordance with various embodiments of the present invention.

Figure 36:
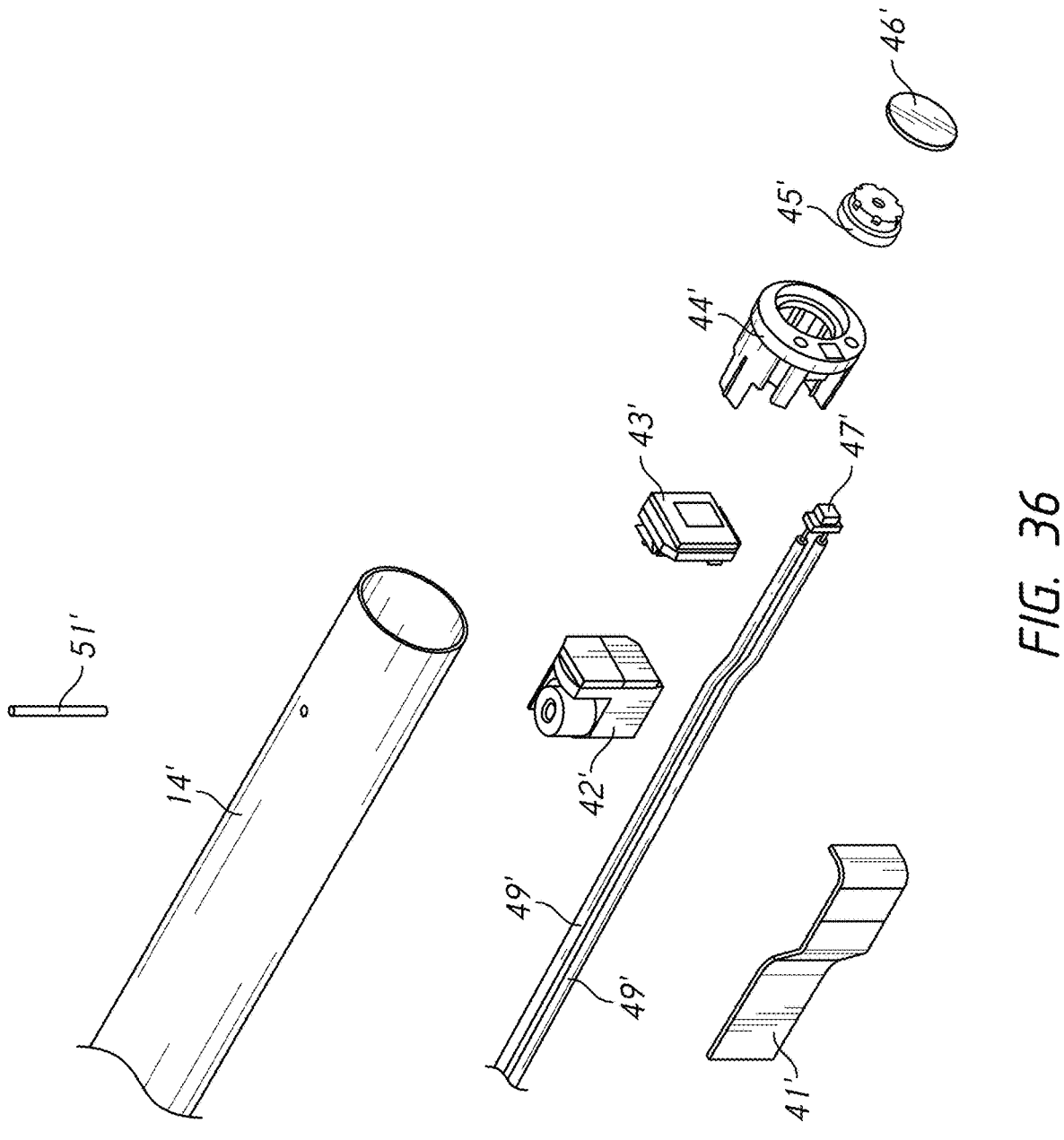

FIG. 36 is an exploded view of a distal portion of a surgical simulation scope in accordance with various embodiments of the present invention.

Figure 37:
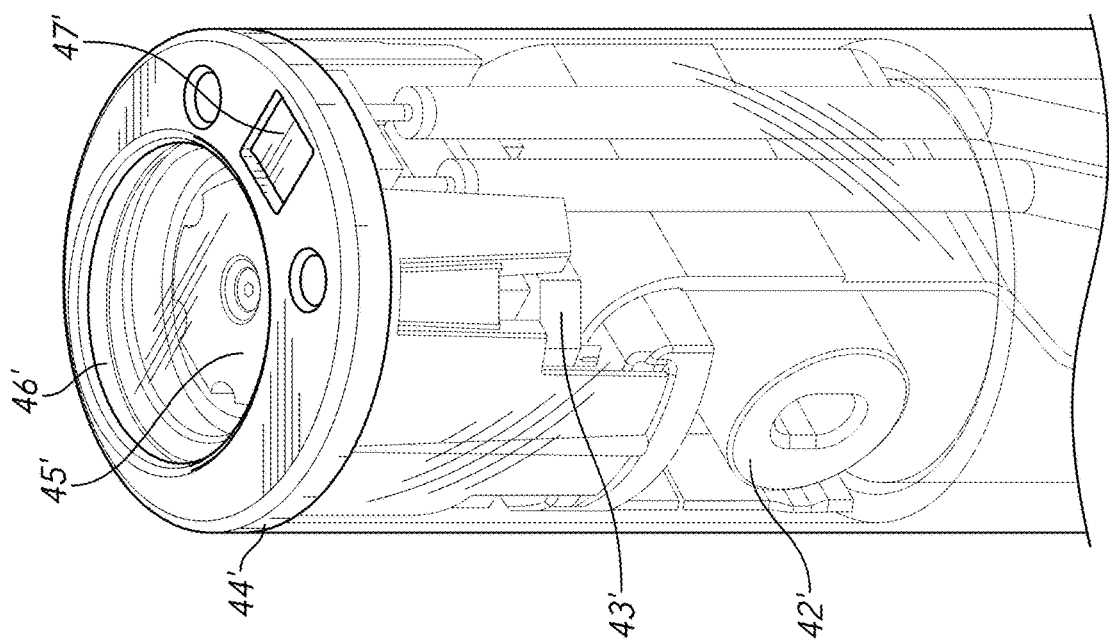
Figure 38:
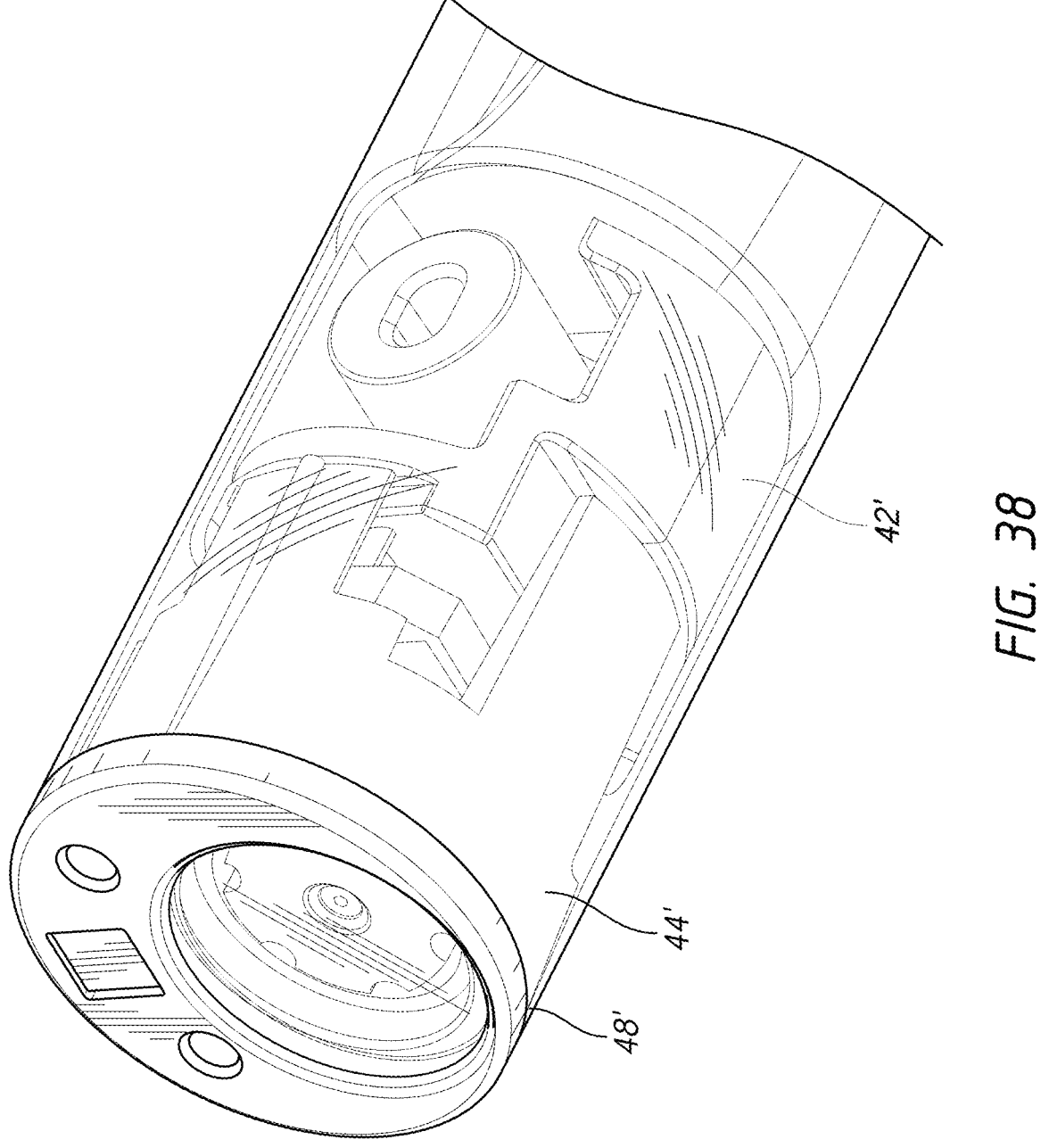
Figure 40:
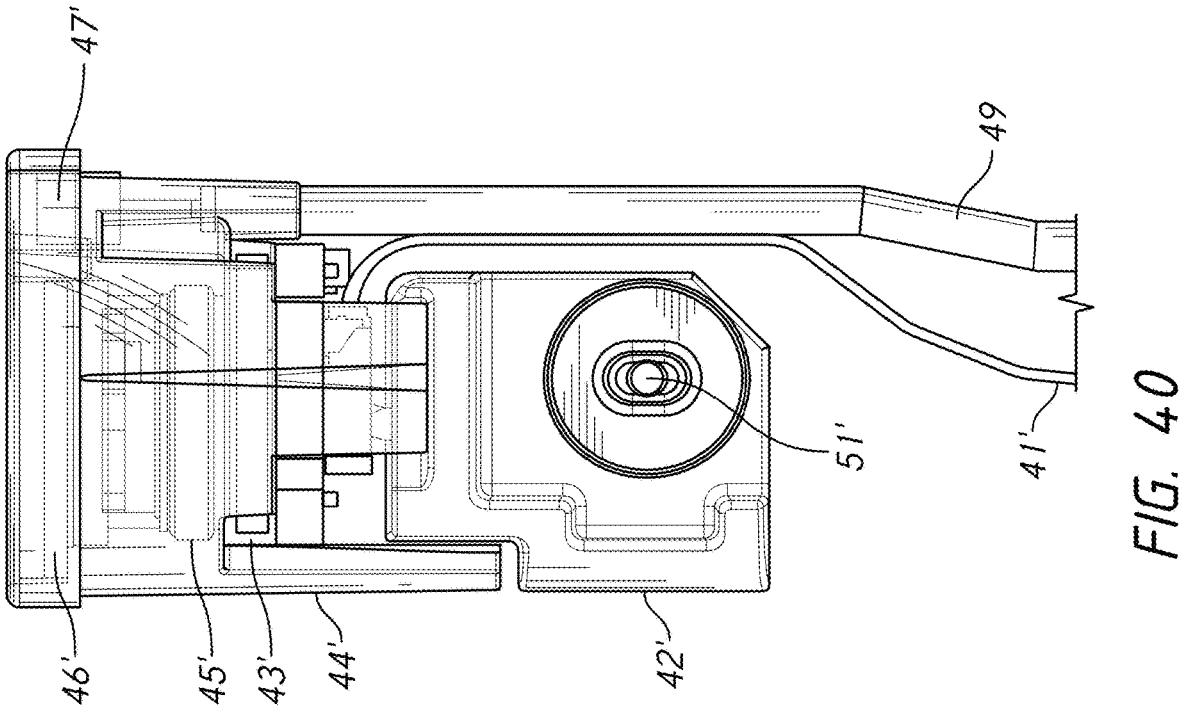
Figure 39:
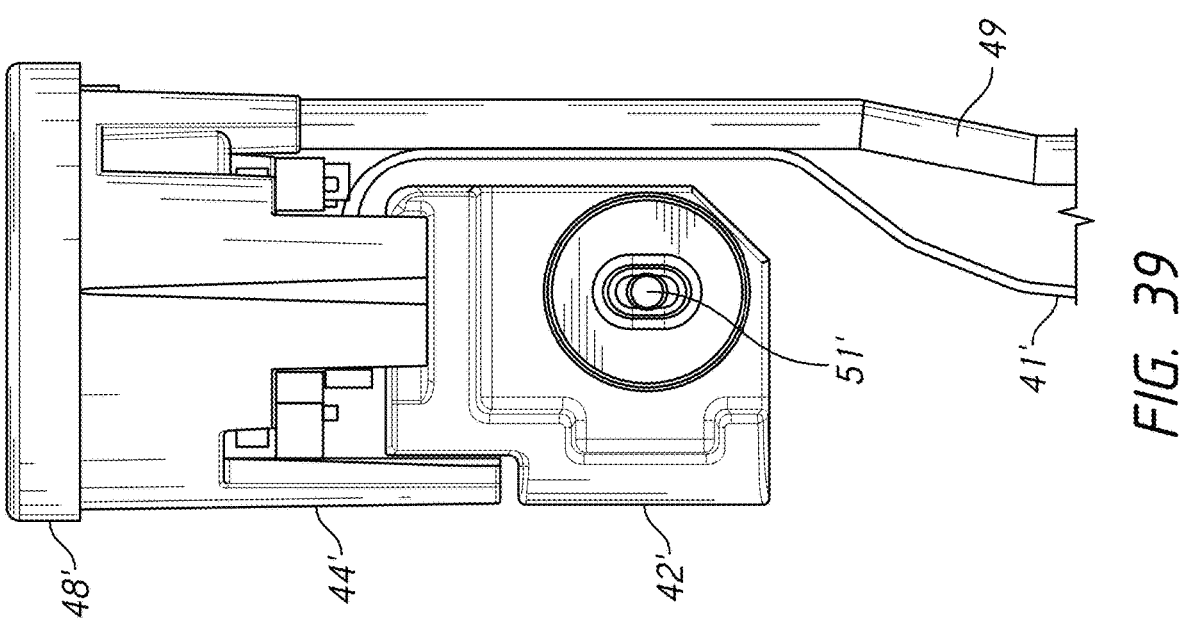
Figure 42:
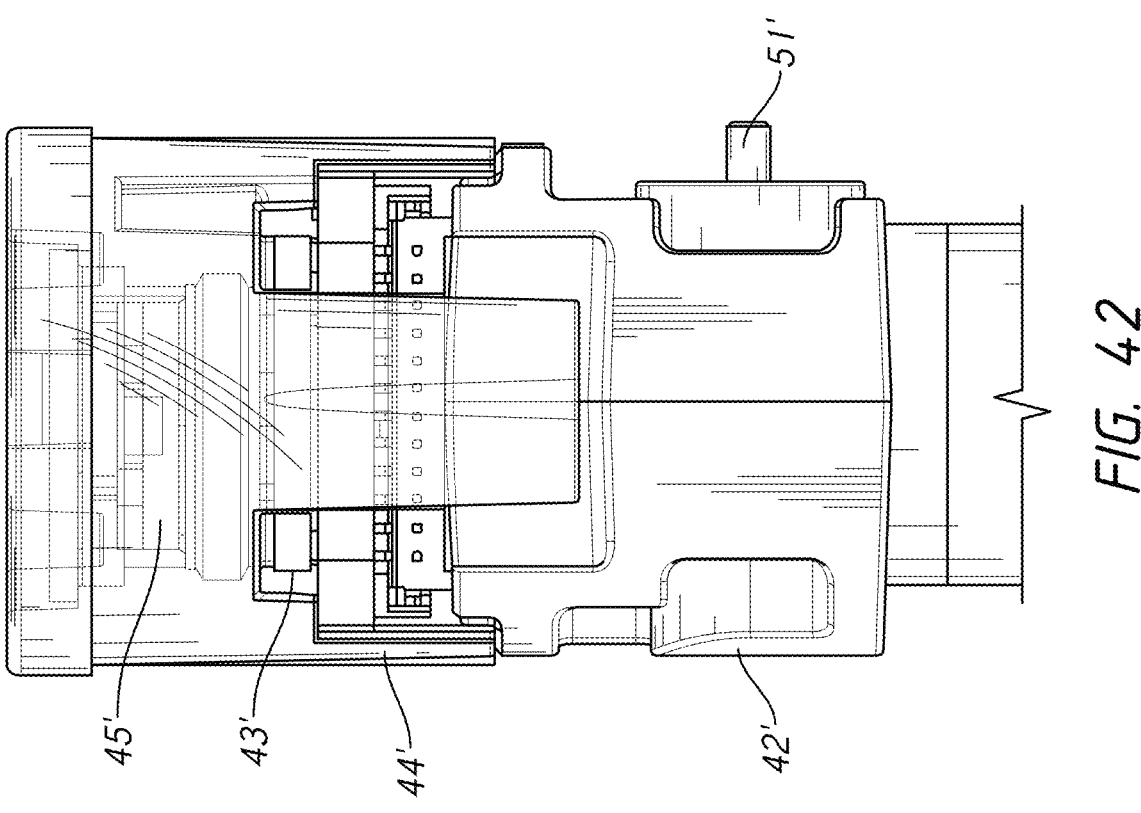
Figure 41:
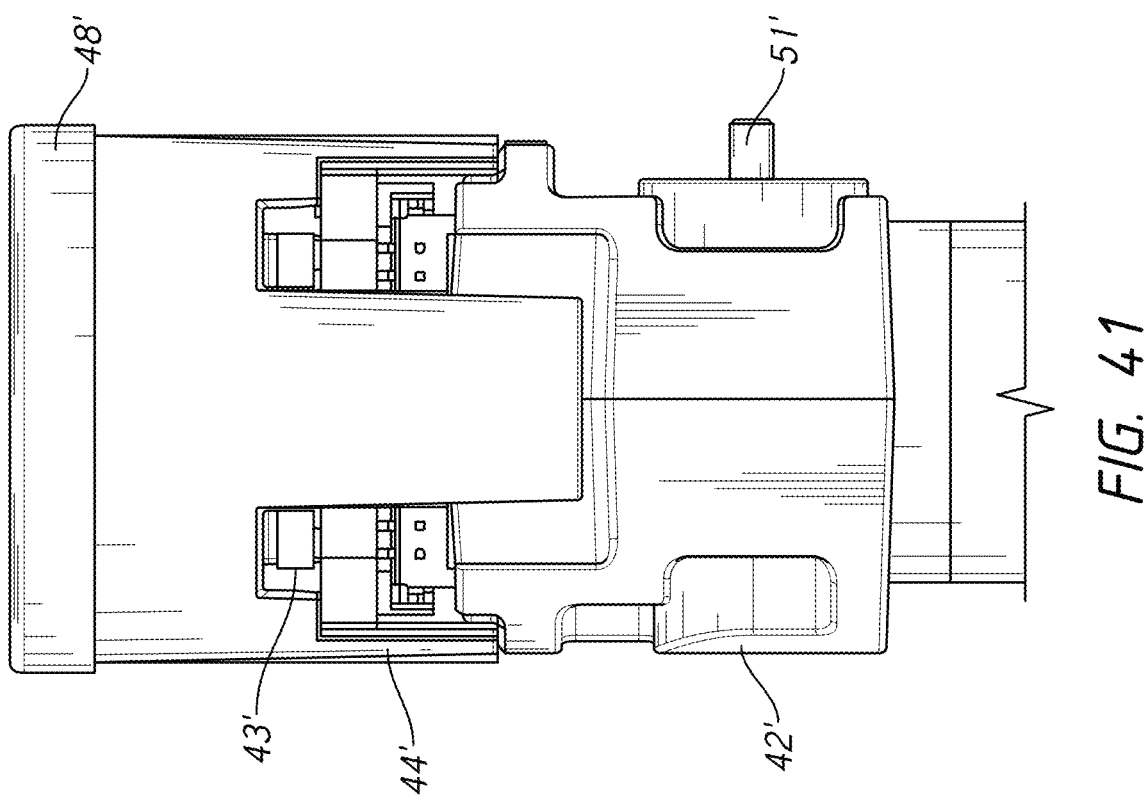
Figure 44:
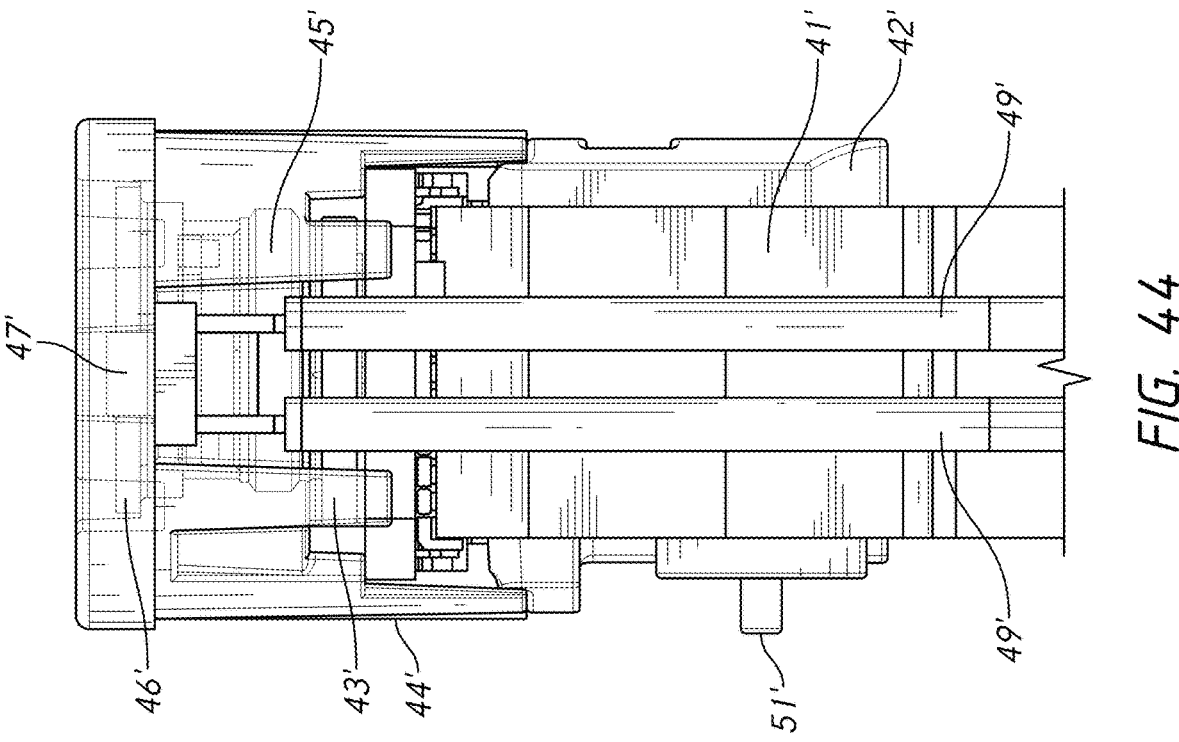
Figure 43:
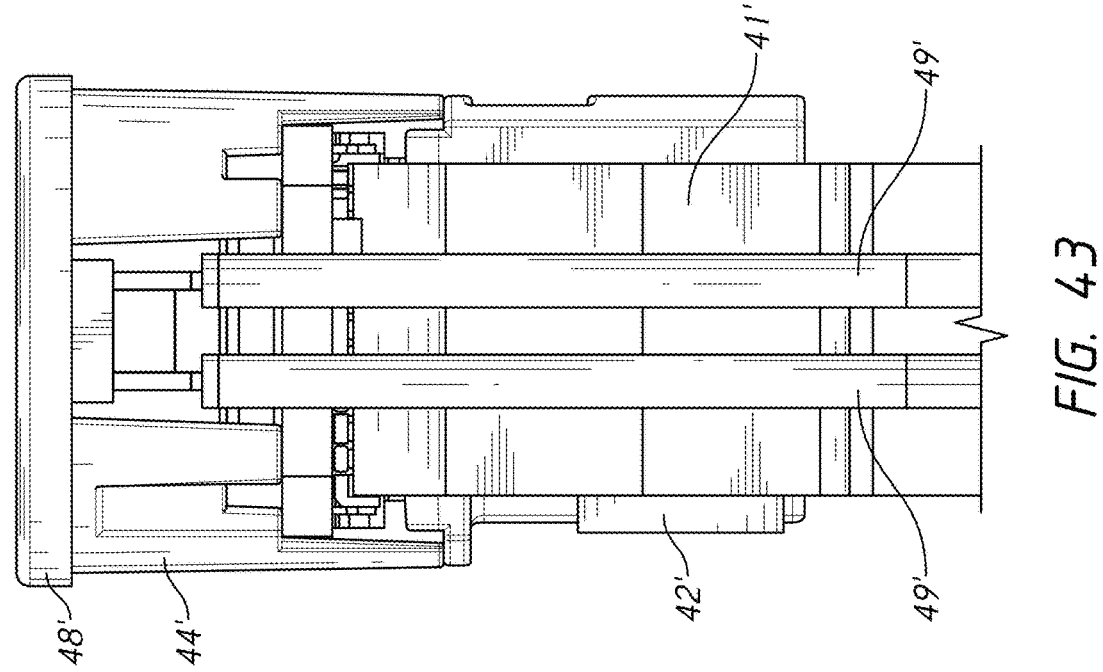
Figure 45:
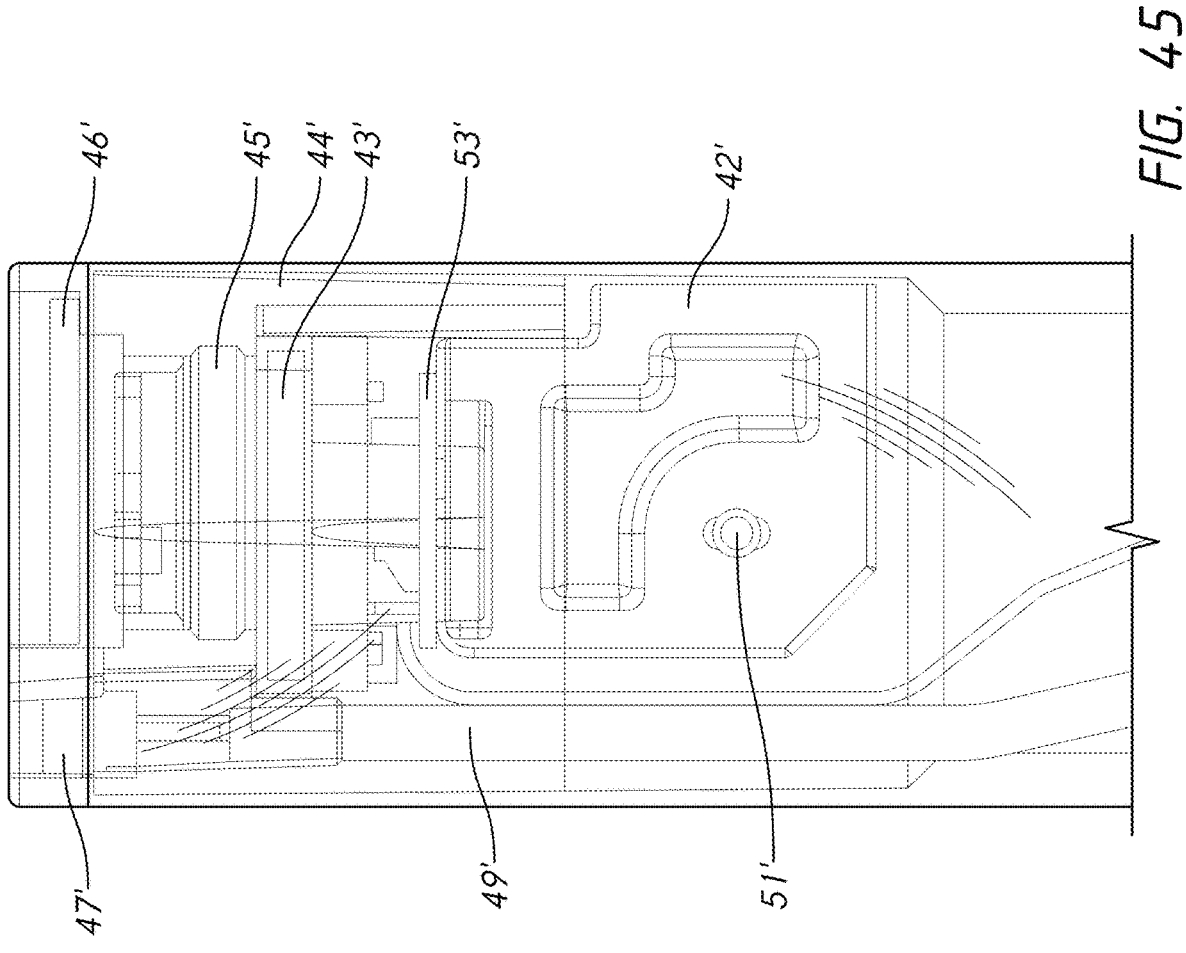
Figure 46:
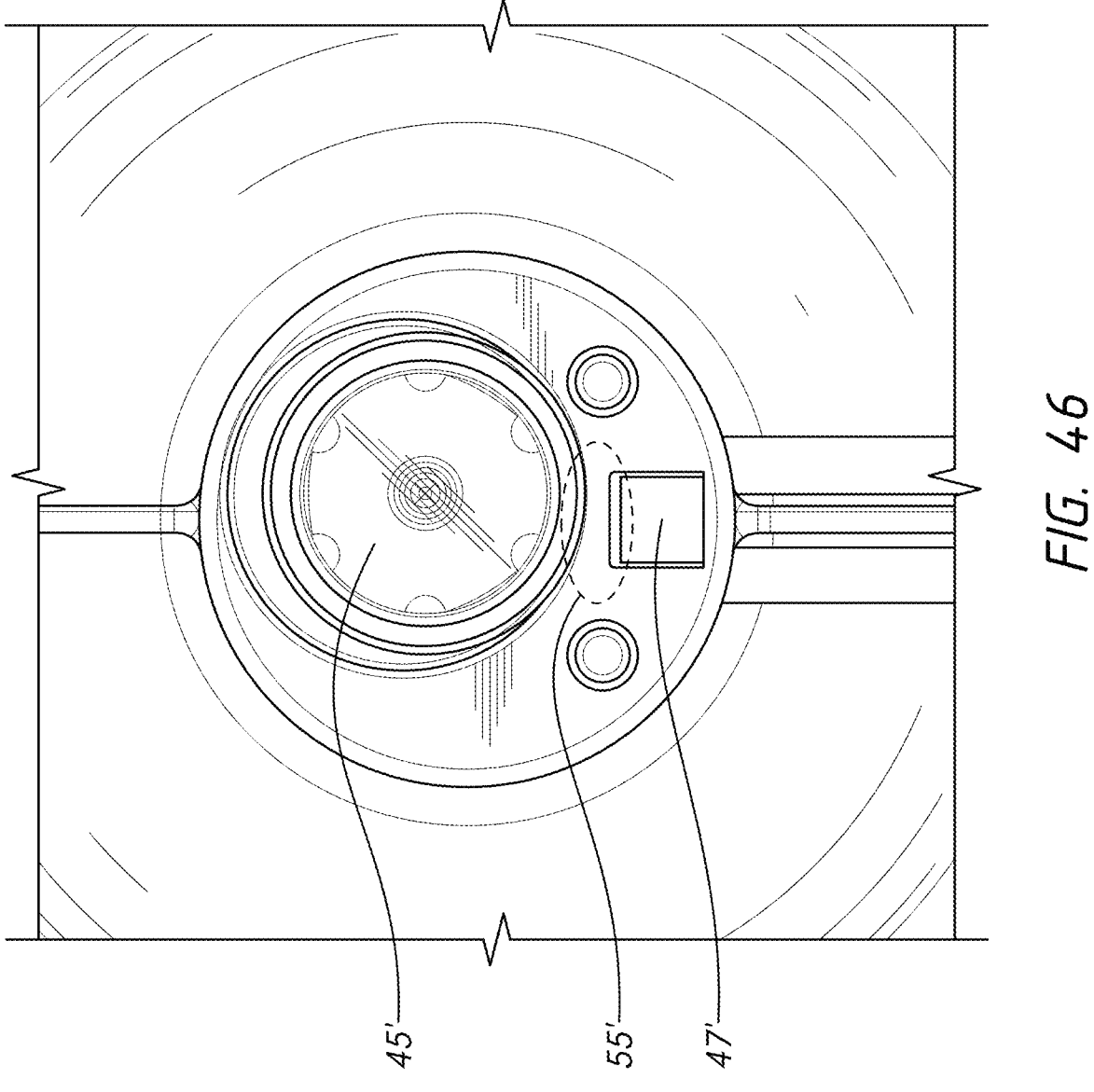
Figures 47A, 47B, 47C, 47D, 47E:
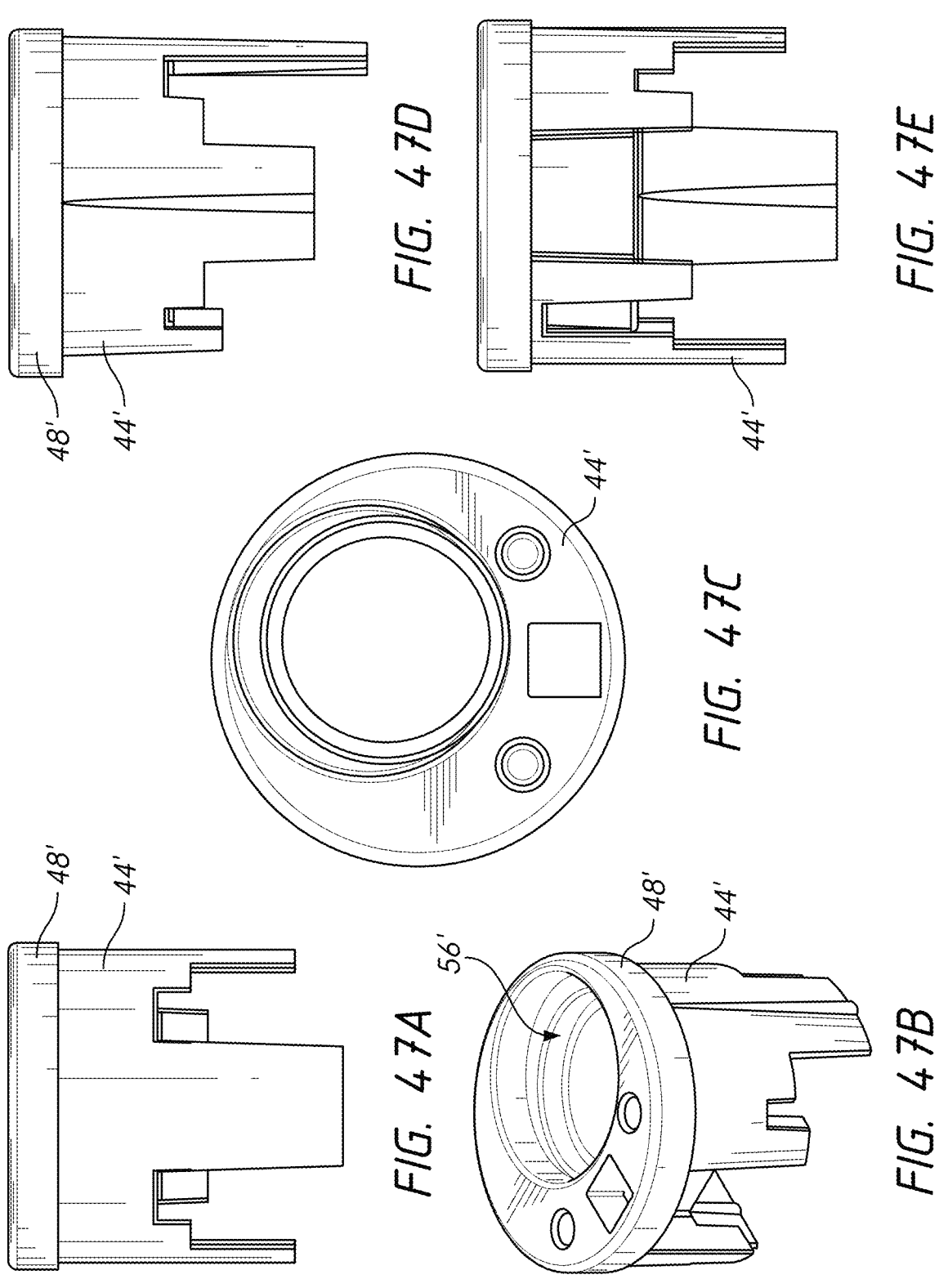
Figures 47F, 47G, 47H:
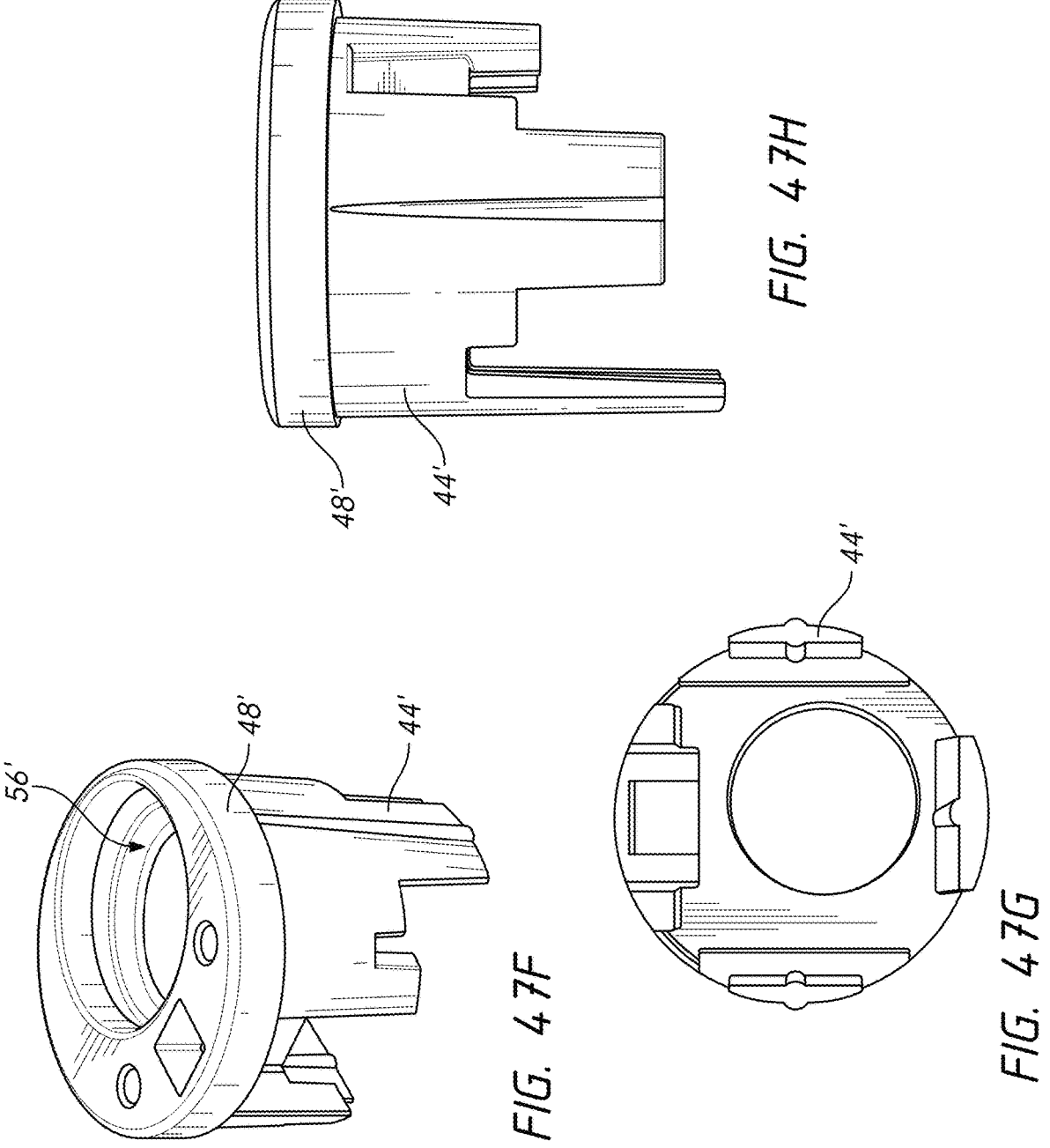
Figures 48A, 48B, 48C, 48D, 48E:
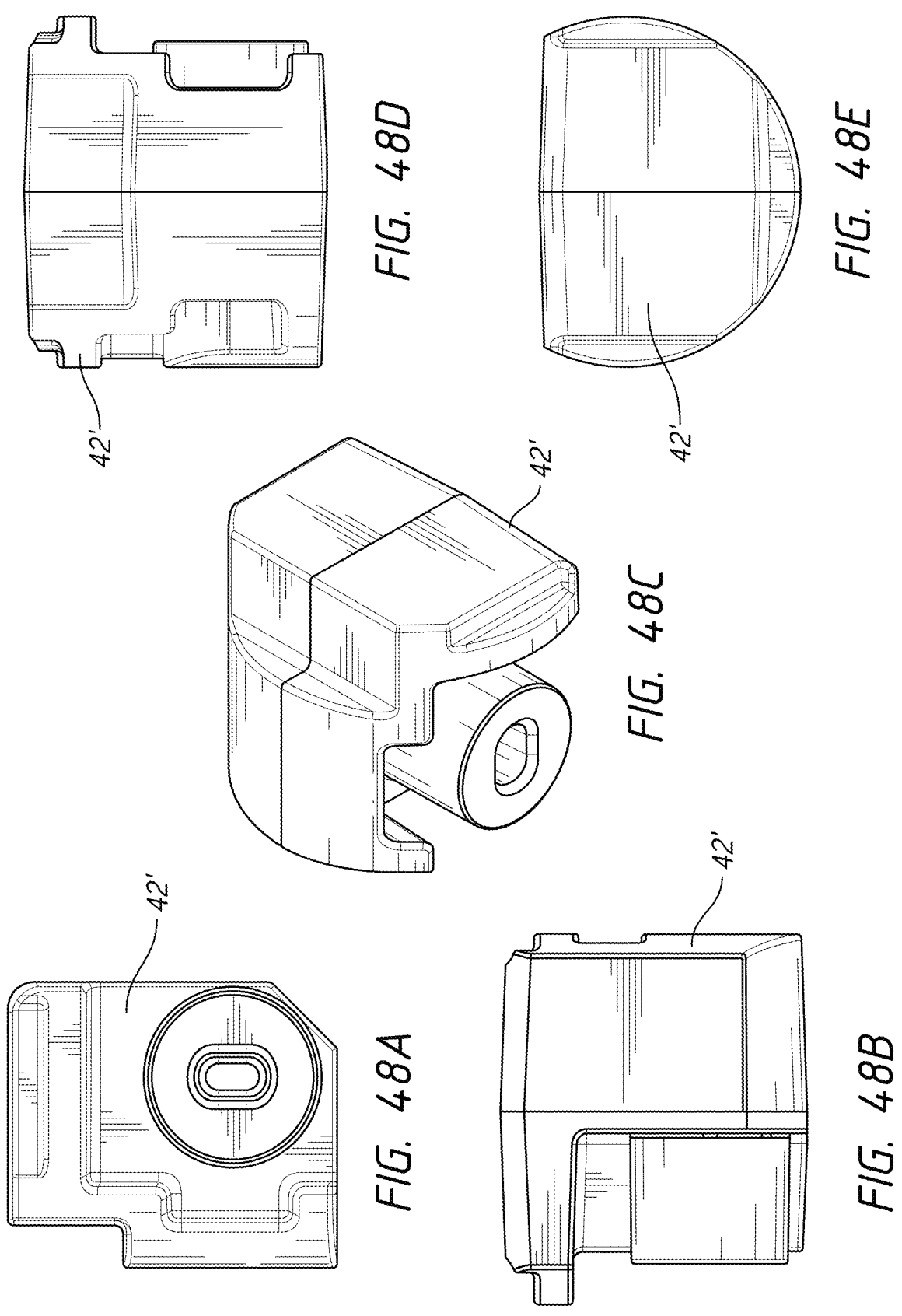

FIG. 37 is a perspective view of portions of a surgical simulation scope in accordance with various embodiments of the present invention.

FIGS. 38-46 are various views of portions of a surgical simulation scope in accordance with various embodiments of the present invention.

FIGS. 47A-47H are various views of an optics mount of a surgical simulation scope in accordance with various embodiments of the present invention.

FIG. 48A-48H are various views of an optics floor of a surgical simulation scope in accordance with various embodiments of the present invention.

Figure 49:
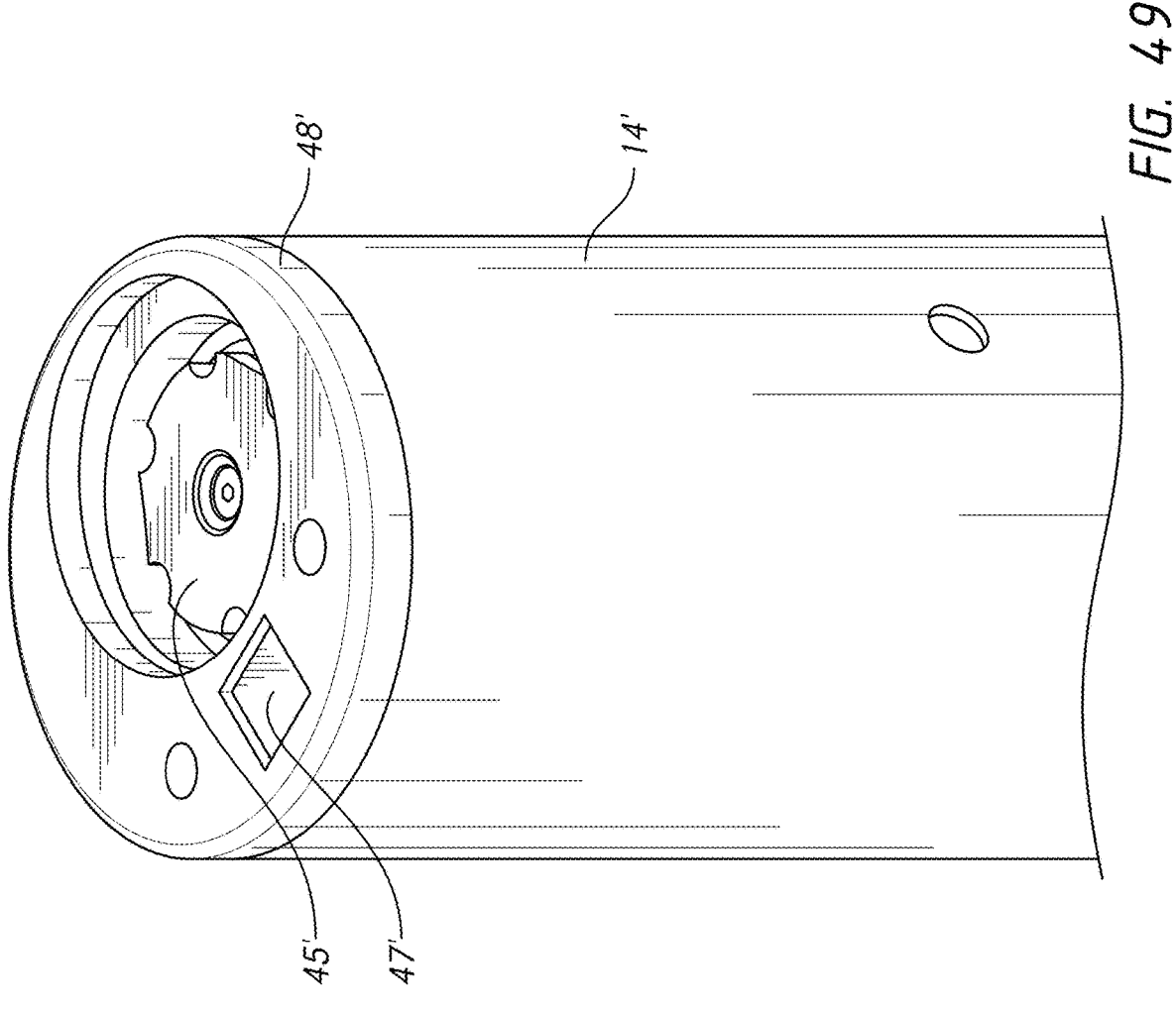

FIG. 49 is a perspective view of portions of a surgical simulation scope in accordance with various embodiments of the present invention.

Figure 51:
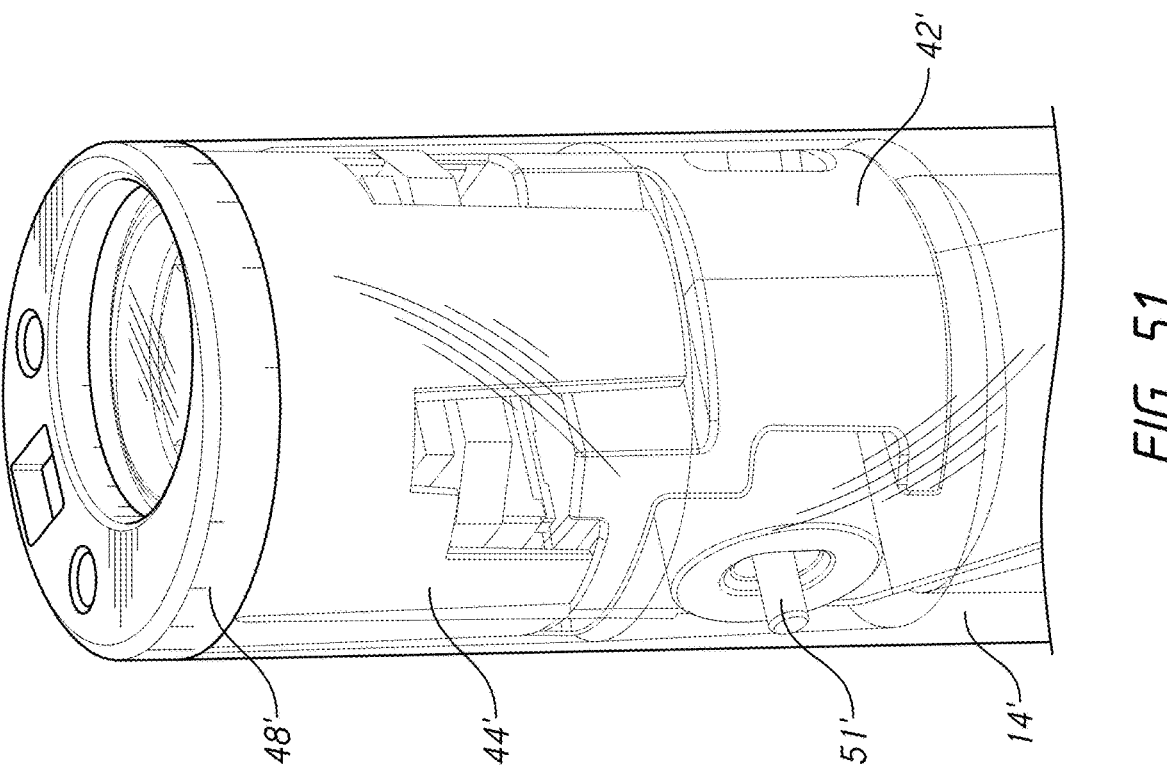
Figure 50:
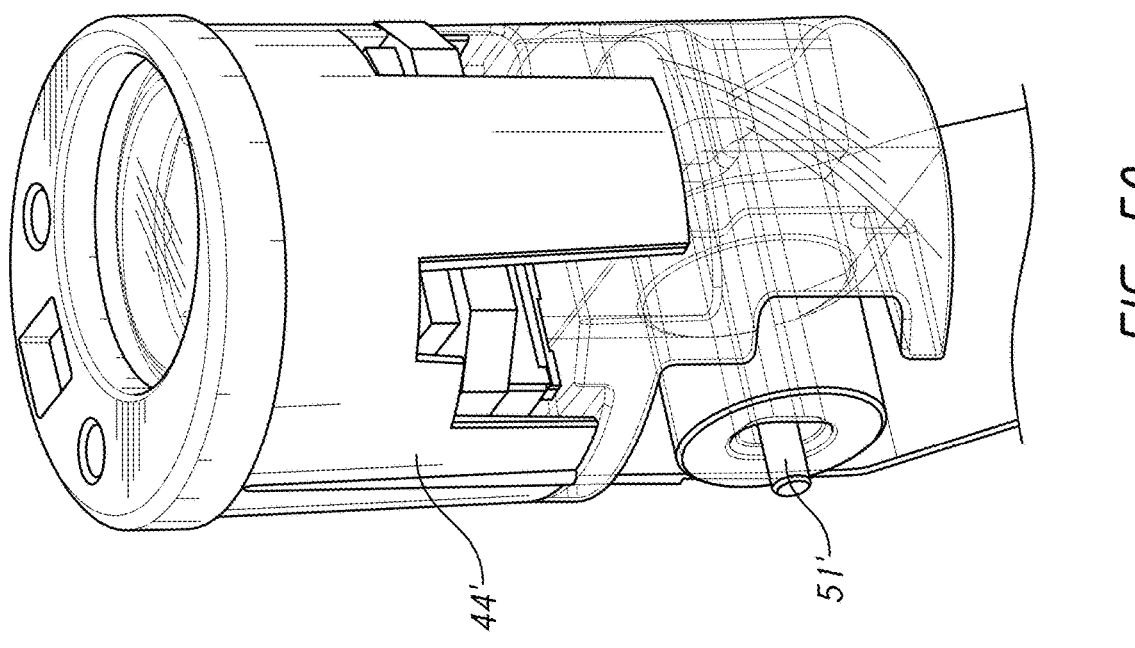

FIGS. 50-51 are perspective views of portions of a surgical simulation scope in accordance with various embodiments of the present invention.

Figure 52:
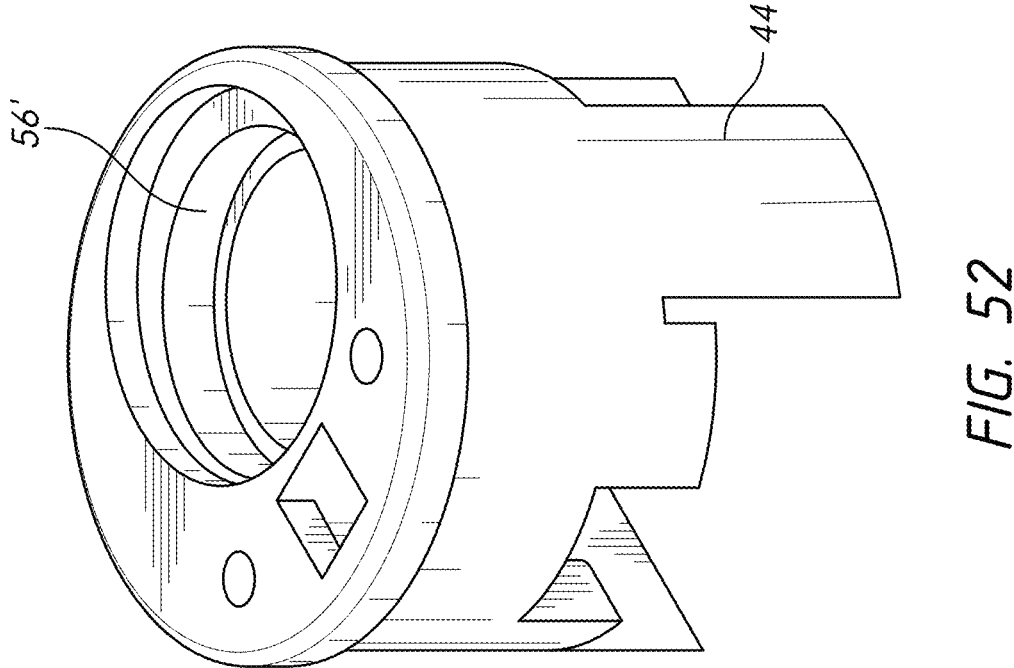

FIG. 52 is a perspective view of an optics mount in accordance with various embodiments of the present invention.

Figure 53:
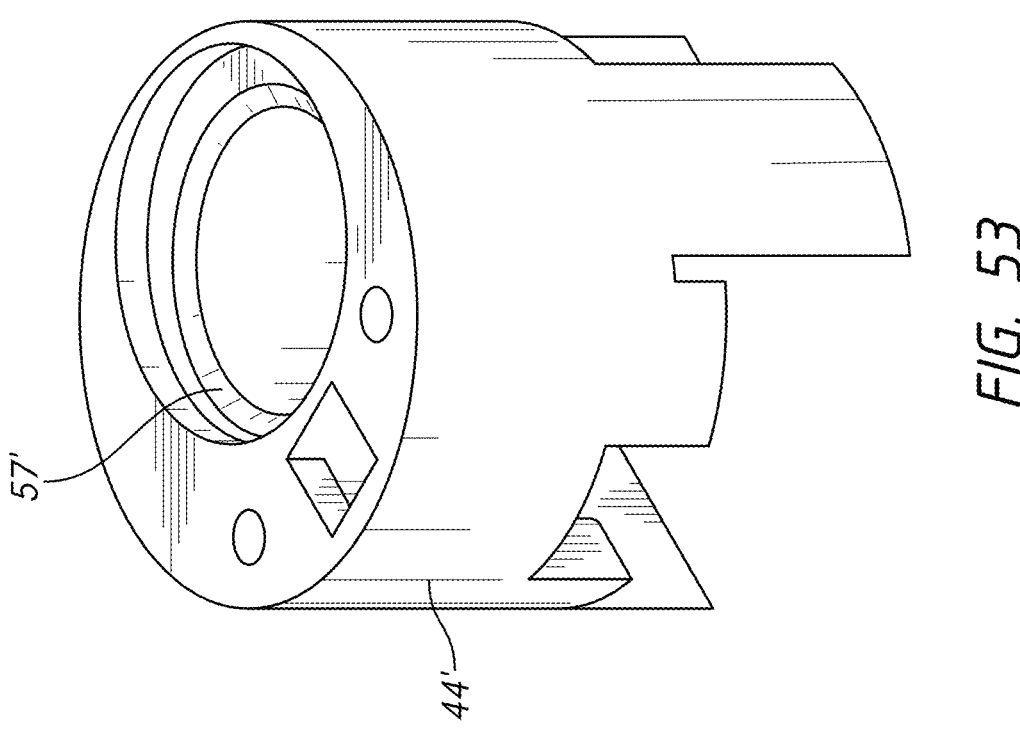

FIG. 53 is a perspective view of an optics mount in accordance with various embodiments of the present invention.

Figure 54:
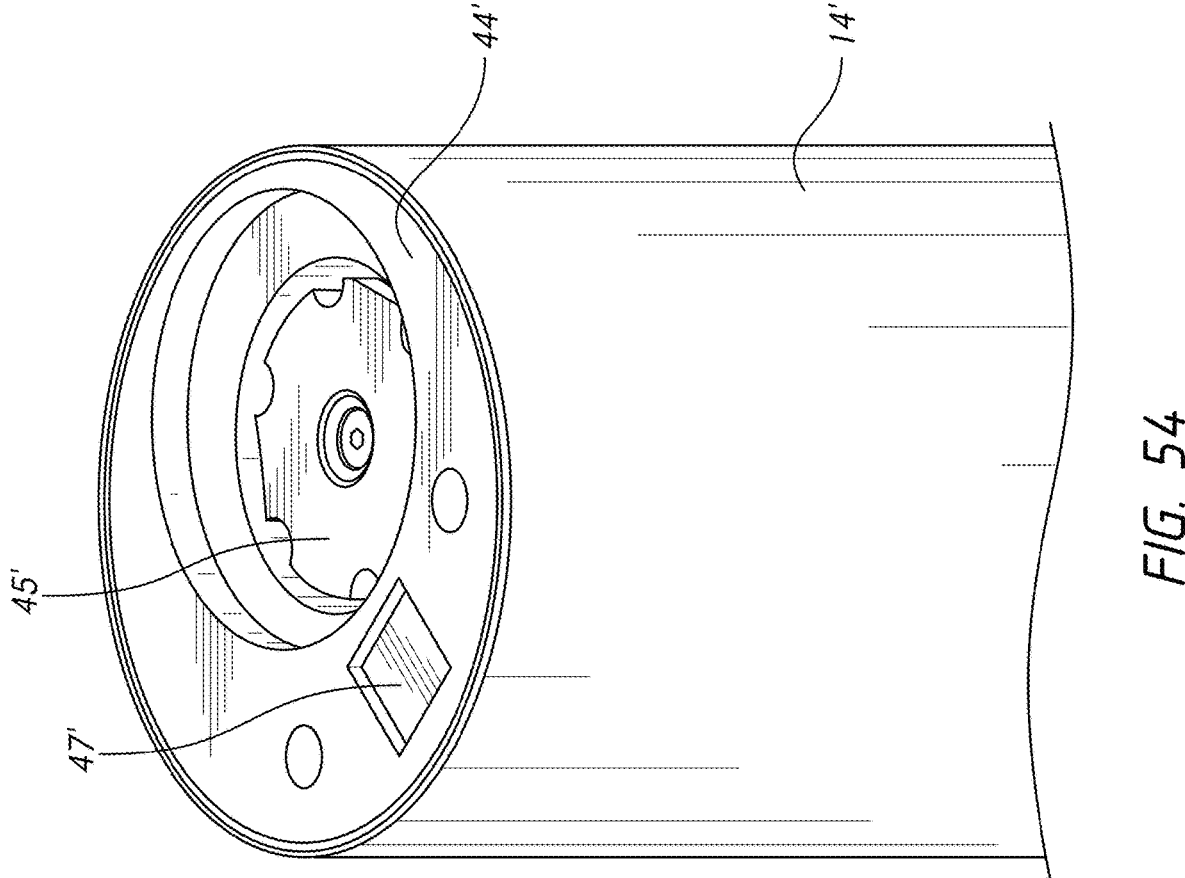

FIG. 54 is a perspective view of portions of a surgical simulation scope in accordance with various embodiments of the present invention.

Figure 55B:
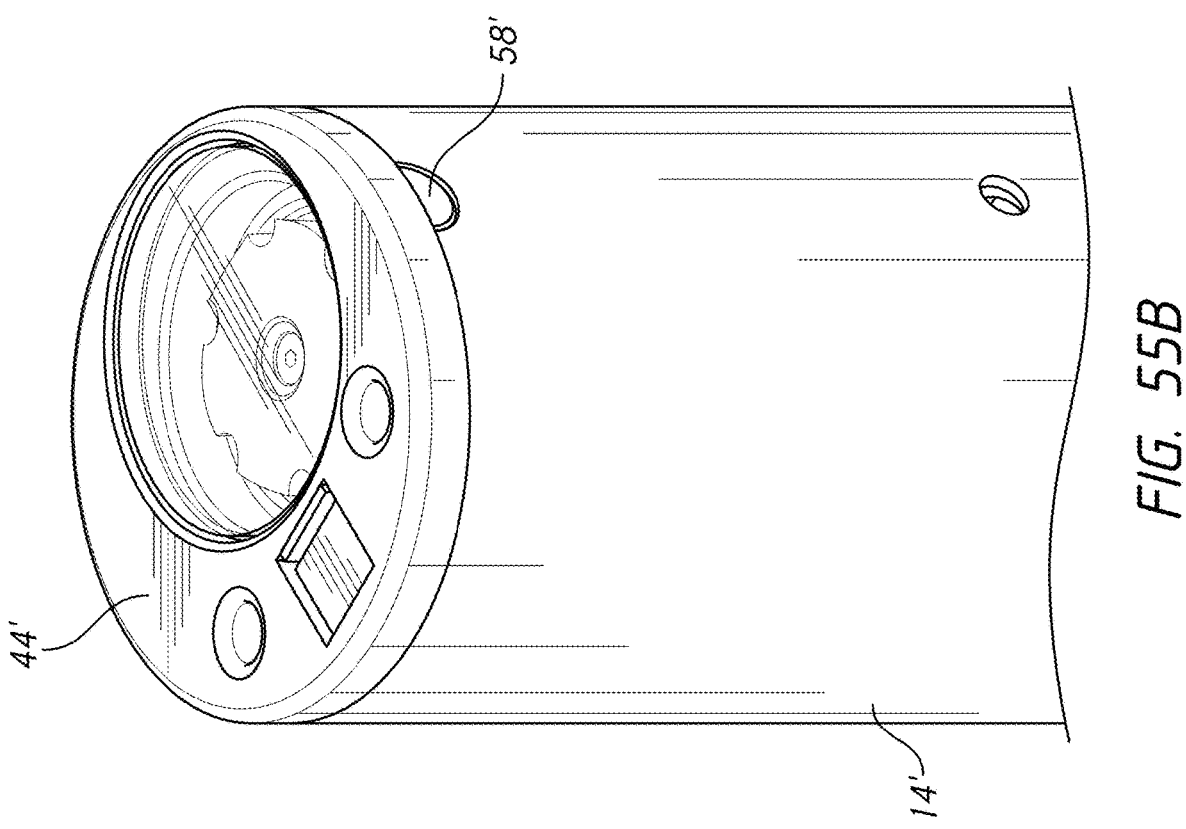
Figure 55A:
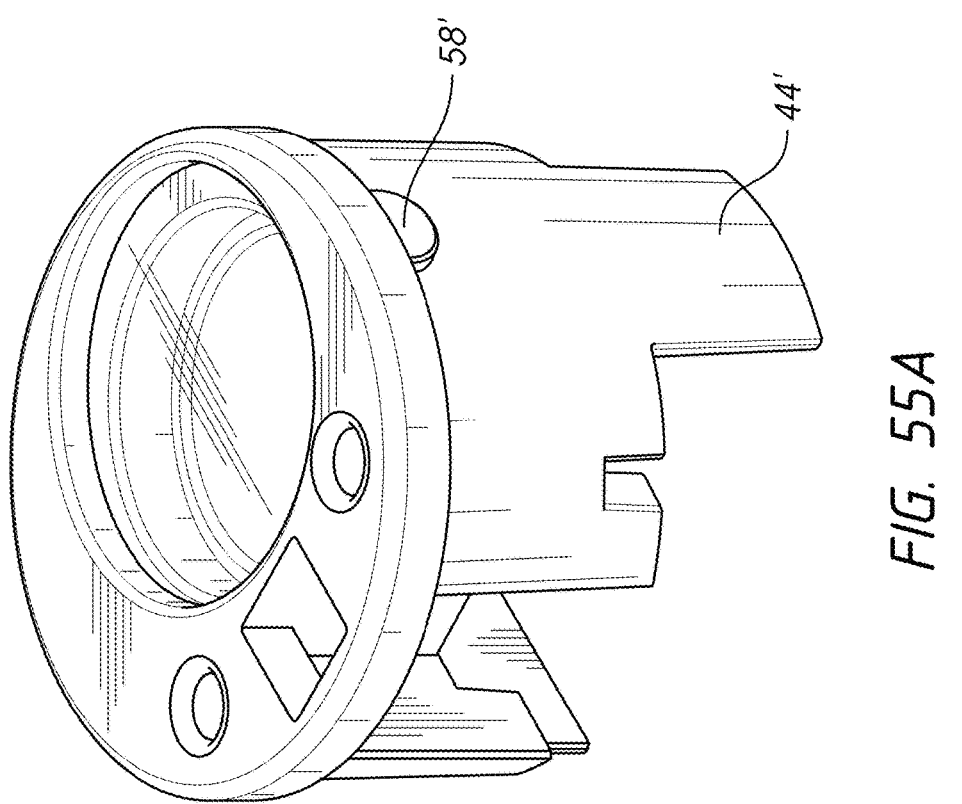

FIG. 55A is a perspective view of an optics mount in accordance with various embodiments of the present invention.

FIG. 55B is a perspective view of portions of a surgical simulation scope in accordance with various embodiments of the present invention.

Figure 56:
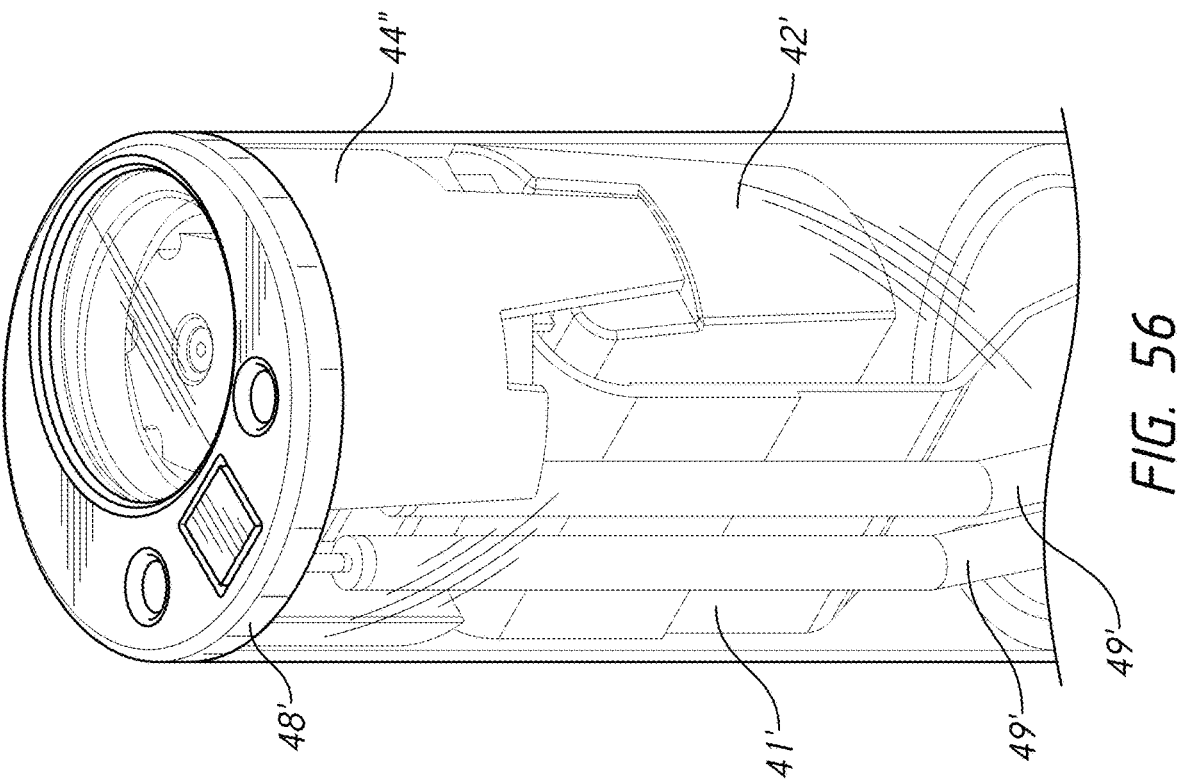

FIG. 56 is a perspective view of portions of a surgical simulation scope in accordance with various embodiments of the present invention.

DETAILED DESCRIPTION

Generally, simulation surgical angled scopes or scopes are provided to assist in laparoscopic surgical skill training and simulation. The environment for training laparoscopic surgical skills can include a surgical trainer that is intended to simulate the human abdominal area. The trainer in various embodiments includes a penetrable cover and/or ports that simulates an abdominal wall and/or access therethrough through which surgical instruments and/or scopes are inserted to access a simulated body cavity that houses artificial organs or skills training models upon which mock surgical procedures are practiced. Real surgical or surgical-grade scopes may be employed in a training environment. Surgical-grade scopes are high quality, calibrated, precision instruments, have very limited optical distortion, and provide enough light to completely illuminate the cavity. Surgical-grade scopes however are also very expensive costing thousands of dollars. Because surgical-grade scopes are expensive and can be easily mishandled, damaged, and scratched by less experience users, there is a need for training scopes for use in a training environment. In addition, less expensive scopes and scopes that are more portable are needed, not only in a training environment, but also, in a marketing environment to showcase instruments and demonstrate new procedures on the go. Scopes of the same caliber as surgical-grade scopes are not needed in a training or marketing environment and may be too cumbersome and expensive to port. In addition, because budgets for surgical training and simulation centers are limited, there is a need for inexpensive, yet effective scopes designed with training purposes in mind.

With reference to FIGS. 1-28, a surgical simulation angled scope or scope 10 in accordance with various embodiments is provided. The scope comprises a handle 12 connected to an elongate shaft or tube 14. The handle 12 comprises a simulated scope housing 20 and a simulated camera head 30. The simulated camera head 30 has an angled or curved body relative to a longitudinal axis of the elongate shaft 14. The simulated scope housing 20 and the elongate shaft 14 are rotatable relative to the simulated camera head 30. A simulated light cable 21 connects the simulated scope housing 20 to a controller box 50. A data cable 51 connects the controller box 50 to a surgical trainer 60 and, in various embodiments, a computer, microcontroller and/or processor and/or a video display or monitor integrated or attached to the surgical trainer 60 to display images of contents within a cavity defined by the surgical trainer. The scope 10 has a scope view that is off axis with respect to a longitudinal axis of the elongate shaft. A lens 45 and an image sensor 43 are placed at the distal end of the scope at a predetermined angle, e.g., 30°, with respect to a centerline or longitudinal axis of the elongate shaft, thereby providing the off-axis or angled scope view. In various embodiments, the predetermined angle is about 30 degrees, e.g., +/−30 degrees. In various embodiments, the predetermined angle ranges from +/−15 degrees to +/−45 degrees. In operation, a user holds the simulated camera head 30 steady and level with the horizon when navigating the surgical simulation scope and rotating the simulated scope housing 20, the simulated light cable 21 and/or the elongate shaft 14.

In accordance with various embodiments, the simulated camera head 30 comprises a simulated camera head housing 32 and a simulated coupler 34. The simulated camera head housing 32 is disposed on or integrated in a proximal portion of the simulated camera head and the simulated coupler 34 is disposed on or integrated in a distal portion of the simulated camera head. In various embodiments, as shown, for example, in FIGS. 3-5, the simulated camera head 30 is a two-piece clam shell design with a pair of camera head housing halves 32a, b with a pair of simulated coupler halves 34a, b to ease assembly and connectivity to the simulated scope housing 20. The simulated camera head housing 32, in various embodiments, is curved or contoured to fit ergonomically in the hand of a user, e.g., a trainer or practicing surgeon. The simulated camera head housing 32 comprises one or more flat surfaces to facilitate handling or gripping of the simulated camera head 30. In various embodiments, the simulated camera housing 32 comprises a rectangular cross-section near or at a center point of the simulated camera head housing 32, providing flat surfaces on all sides of the simulated camera head 30 to facilitate handling or gripping of the simulated camera head 30. In various embodiments, the simulated camera head 30 resembles a pistol grip. In various embodiments, the simulated camera head comprises a proximal end having a tapered tail that terminates below a horizontal midline providing a "up" or a directional indicator. The simulated coupler 34, in various embodiments, facilitates positioning a user's hand or grip on the simulated camera head 30. The simulated coupler 34, in various embodiments, differentiates or delineates the simulated camera head 30 from the simulated scope housing 20.

In various embodiment, each half of the simulated camera head 30 is pressed fit together around the simulated scope housing 20. The simulated scope housing 20 has an inverted T-shape. In various embodiments, the simulated scope housing 20 has a longitudinal portion extending proximally and distally along a longitudinal axis of the scope 10 and a portion extending perpendicular or transverse relative to the longitudinal portion of the simulated scope housing 20. The simulated scope housing 20, in various embodiments, comprises an adapter housing 22 and a rotary barrel 29. The rotary barrel 29 is disposed on or integrated in a distal portion of the simulated scope housing 20 and the adapter housing is disposed on or integrated in a proximal portion of the simulated scope housing 20. In various embodiments, the simulated scope housing 20 is a two-piece clam shell design with a pair of rotary barrel halves 29a, b and a pair of adapter housing halves 22a, b to ease assembly and connectivity to the elongate shaft 14 and/or a simulated light cable 21.

The adapter housing 22 defines an interior or cavity sized, shaped, and dimensioned to enclose and secure an adapter circuit or printed circuit board (PCBA) 24. The simulated light cable 21 is connected to the adapter PCBA 24 and extends perpendicularly or transverse relative to the adapter PCBA. The cavity of the adapter housing 22 also encloses and secures the simulated light cable 21. A portion of the adapter housing 22 extending perpendicular or transverse relative to the longitudinal axis of the scope 10 further secures the perpendicular or transverse direction of the simulated light cable relative to the adapter PCBA.

The simulated light cable 21 mimics a light cable or the placement of a light cable relative to a surgical scope. In various embodiments, the simulated light cable, however, does not include any optical wires, cabling, or the like, such as fiber optics cables, configured to transmit light. The simulated light cable transmits data from the adapter PCBA 24 to the controller PCBA 52 of the controller box 50. In various embodiments, the simulated light cable 21 is an HDMI, USB or other similar data cable or connection arranged to transmit data from the adapter PCBA to the controller PCBA. In various embodiments, the adapter PCBA and/or the controller PCBA comprises one or more connectors arranged to connect to the simulated light cable and transmit/receive data and/or power therethrough.

In various embodiments, the simulated camera head 30 defines an interior or cavity in which a portion of the simulated scope housing 20, e.g., a proximal portion of the adapter housing 22 and the rotary barrel 29, are located, enclosed, and rotationally secured therein. In various embodiments, the simulated camera head 30 comprises one or more internal ribs, providing one or more bearing surfaces for the simulated scope housing, e.g., the adapter housing 22 and/or the rotary barrel 29, to rotate within. In various embodiments, the one or more internal ribs are arranged or spaced from each other to mitigate any rocking of the simulated scope housing 20 within the simulated camera head 30.

In various embodiments, a frictional interface or ring is provided between the simulated scope housing 20 and the simulated camera head 30 to prevent inadvertent rotational movement therebetween and/or ensuring a deliberate and intentional force is used to rotate the simulated scope housing 20. In various embodiment, the frictional interface is an O-ring is fitted around a proximal end of the rotary barrel 29 to provide torsional friction between the simulated camera head 30 and the simulated scope housing 20. In various embodiments, the O-ring is compressed axially between a surface of a support rib of the simulated camera head housing 32 and an opposing surface of the rotary barrel 29. In various embodiments, the O-ring provides a predetermined torsional friction. In various embodiments, the predetermined torsional friction prevents the simulated scope housing 20 and/or the simulated light cable 21 from rotating under its own weight and/or prevents jitter. In various embodiments, the O-ring provides lateral pressure on the simulated scope housing 20 and biases the simulated scope housing 20 inside the simulated camera head housing 32, removing any slop. In various embodiments, the friction interface or material is a type of clutch material or brake pad or compression springs.

In various embodiments, a frictional interface is provided on the rotary barrel 29. In various embodiments, the frictional interface comprises distal control interface, e.g., an O-ring at a distal end of the rotary barrel 29, and proximal control interface, e.g., a shim at a proximal end of the rotary barrel 29. In various embodiments, the distal control interface is made of a different material, thickness and/or number of components than the proximal control interface. In various embodiments, the distal control interface comprises one or more O-rings, made of an elastic or elastomeric material, e.g., rubber, and the proximal control interface comprises, one or more shims, made of a rigid material, e.g., metal, and having a thickness different from the one or more O-rings. In various embodiments, the distal control interface comprises a rubber O-ring and the proximal control interface comprises two stainless steel shims and having a thickness less than the O-ring. In various embodiments, the proximal control interface, e.g., one or more shims, allows for a variable axial compressive force to provide a predetermined torsional friction and/or in various embodiments, the distal control interface, e.g., one or more O-rings, and the proximal control interface, e.g., one or more shims, provide for dissimilar material interaction between the distal and proximal ends of the simulated camera head and simulated scope housing, thereby increasing control of the rotation.

The rotary barrel 29, in various embodiments, defines an interior or cavity sized, shaped and/or dimensioned to enclose and secure an encoder 26. In various embodiments, the encoder 26 is fully constrained within and to the rotary barrel 29. Connected to the encoder 26 is an encoder shaft 27 extending out of a proximal end of the rotary barrel through an aperture formed therein. The encoder shaft 27 is secured to and/or fully constrained within the simulated camera head 30 and, in particular, the simulated camera head housing 32, e.g., between the simulated camera head housing halves 32a, b. Wires 25 connect the encoder 26 to the adapter PCBA 24. The wires, in various embodiments, is secured within a cavity defined by a connector housing 92 that is disposed between the rotary barrel 29 and the adapter housing 22.

In accordance with various embodiments, the encoder 26 measures or determines rotational positions, increments or data of the elongate shaft 14 and the simulated scope housing 20, including, for example, the lens, image sensor, adapter PCBA and/or the encoder, with respect to the simulated camera head 30, including, for example, the simulated camera head housing and/or the encoder shaft. In various embodiments, the encoder shaft 27 is affixed or mounted to the simulated camera head and the encoder 26 is attached or housed within the simulated scope housing 20 that rotates relative to the simulated camera head. As the encoder rotates, the encoder shaft remains fixed or stationary and as such, the encoder determines a rotational position or incremental change or difference between the encoder 26 and the encoder shaft 27. In various embodiments, the encoder 26 is an absolute encoder. The encoder 26 provides or transmits the rotational data to the adapter PCBA 24 through wires 25. The adapter PCBA 24 passes the rotational data to the controller PCBA 52 in the controller box 50 through the simulated light cable 21.

The elongate shaft 14 is connected to the distal end of the handle 12. The elongate shaft 14 includes a sidewall having a cylindrical shape defining a lumen. The shaft 14 includes a proximal end and a distal end with the lumen extending therebetween. In various embodiments, the distal end of the elongate shaft 14 is cut or angled, i.e., having a predetermined angle, e.g., 30 degrees. In various embodiments, the predetermined angle is about 30 degrees, e.g., +/−30 degrees. In various embodiments, the predetermined angle ranges from +/−15 degrees to +/−45 degrees. The distal end of the elongate shaft 14 includes a distal opening and, in various embodiments, is arranged to receive and house the optics housing 40. The proximal end of the shaft 14 is connected to the handle 12 and includes a proximal opening such that the lumen of the shaft 14 opens to the interior of the handle 12.

In various embodiments, the proximal end of the elongate shaft 14 is connected to a simulated scope housing 20 via machined holes that interface with molded pins on the simulated scope housing 20. In various embodiments, the elongate shaft 14 has a machined keyway arranged to interface with a molded rib in the simulated scope housing 20. In various embodiments, a dual-purpose clamp 23 is provided to secure the elongate shaft 14 to the simulated scope housing 20. In various embodiments, the dual-purpose clamp 23 is a metallic clamp secured around the proximal end of the elongate shaft 14 to ground the elongate shaft 14 to the adapter PCBA 24. In accordance with various embodiments, the diameter of the elongate shaft 14 is approximately between 3 mm to 15 mm. The outside diameter is sized to fit inside a correspondingly sized trocar. The elongate tube, in various embodiments, is made of stainless steel and/or is formed as a monolithic structure. In various embodiments, the elongate shaft 14 has a fixed or non-adjustable length and/or not bendable. In various embodiments, the elongate shaft 14 is straight, aligned with the handle 12, the simulated camera head 30 and/or the simulated scope housing 20.

As shown, for example, in FIGS. 6 to 10D, an optics housing 40 is located inside the scope 10 and connected to the elongate shaft 14. In various embodiments, the optics housing 40 is adhered or otherwise attached to the distal end of the elongate shaft 14. In various embodiments, a dowel pin extends between and connects the optics housing 40 to the elongate shaft 14. The optics housing 40 ensures that an active area of the image sensor 43 is aligned with the lens 45, thereby avoiding unintended image cropping or shadowing.

In various embodiments, the optics housing 40 is located at the distal end of the elongate shaft 14 and comprises an optics mount 44 and/or an optics floor 42. The optics mount 44 and floor 42 are connected and aligned to each other. The optics mount 44 and/or floor 42, however, are disposed offset, angled, or slanted relative to a longitudinal axis of the elongate shaft 14. The optics mount 44 and/or floor 42 have surfaces that are disposed offset, angled, or slanted relative to a longitudinal axis of the elongate shaft 14

The optics mount 44 is sized and shaped to fit within the lumen of the elongate shaft 14. The optics mount 44 is generally or partially cylindrical with a proximal and a distal surface or wall, both slanted a predetermined angle, e.g., 30 degrees, relative to the longitudinal axis of the elongate shaft 14 and connected to each other by a generally cylindrical sidewall. In various embodiments, the predetermined angle is about 30 degrees, e.g., +/−30 degrees. In various embodiments, the predetermined angle ranges from +/−15 degrees to +/−45 degrees. The proximal and distal walls are thus parallel to each other. The optics mount 44 houses or secures image sensor 43, light emitting diode (LED) 47, lens 45, and optics cover 46. The optics mount has pocket or cavity 441 within the proximal wall to receive and secure the image sensor 43. In various embodiments, the image sensor is mounted on a printed circuit board (PCB) and thus the cavity of the optics mount is sized and shaped to receive and secure the image sensor PCB as well as the image sensor. In various embodiments, the image sensor PCB is hexagonal to minimize the space occupied in the optics housing. The cavity 441 also has an aperture or hole 442 extending through the pocket and out through the distal wall. This aperture is arranged to receive and secure the lens 45 and the optics cover 46. Through this arrangement, the image sensor 43 and, in particular, an active area of the image sensor 43, is securely aligned with the lens 45 and/or optics cover 46 to optimally capture images. In various embodiments, the lens 45 is circular in shape and/or has a wide field of view and a wide depth of field. In various embodiments, the lens has a 91.5 degree viewing angle and a depth of field of 1" to 4" (and, in various embodiments, 1" to 7") from the front or distal end of the optics housing and/or the distance from the lens 45 to the image sensor 43.

In various embodiments, the optics cover 46 is optically clear and arranged to protect the lens and, in various embodiments, is arranged to filter near-IR wavelengths that give the image a red color, e.g., near-IR wavelengths around and/or over 700 nm. In various embodiments, the optical cover comprises near-IR-cutoff filters around 700 nm. In various embodiments, a near-IR-cutoff filter is placed between the lens 45 and image sensor 43 and/or the optics cover 46 is devoid of a filter, remaining optically clear and protective of the lens. In various embodiments, the optics cover 46 is scratch resistance and durable. In various embodiments, the optics cover 46 is made of a sapphire glass. In various embodiments, the optics cover 46 is made of borosilicate glass, providing a durable material to avoid scratches and/or potential damage. In various embodiments, the optics cover 46 includes or is coated with an IR blocking material or coating which prevents transmission of IR light that may cause a red hazy image, e.g., due to proximity to a window or sunlight.

In accordance with various embodiments, a pocket or cavity 443 in the optics mount 44 is also provided in the distal wall to receive and secure the LED 47. The optics mount 44 also has a channel or slot 444 at or connected to the pocket 443 to receive, secure and route leads or wires 49 extending from the LED 47. The optics floor 42 also has a channel or slot 423 aligned with the optics mount channel 444 to receive, secure and route the wires 49 extending from the LED 47. The wires 49 extend through the elongate shaft 14 and into the handle 12. In various embodiments, the wires 49 connect to the adapter PCBA 24 disposed in the handle 12. In various embodiments, other apertures or cavities are provided in the assist in manufacturing and assembling the optics mount and/or the optics housing to the elongate shaft 14 and/or the optics floor 42.

In various embodiments, the optics mount 44 has a projection or step 445 facing proximally and arranged to interface with the angled, i.e., a predetermined angle, e.g., 30°, surface at the distal end of the elongate shaft and clocks the optics mount to the elongate shaft. In various embodiments, the predetermined angle is about 30 degrees, e.g., +/−30 degrees. In various embodiments, the predetermined angle ranges from +/−15 degrees to +/−45 degrees. The step also absorbs impacts and protects the elongate shaft in the event of an accidental drop. In various embodiments, the step has a thickness of around 1.5 mm and in various embodiments, the step has a thickness of around 1.5 mm to 2 mm. The optics mount 44 has a projection or dovetail 446 facing proximally and arranged to interface with a channel or slot 421 within the optics floor 42 to assist in securing and aligning the optics mount 44 with the optics floor 42. In various embodiments, the dovetail of the optics mount 44 is tapered and the channel 421 of the optics floor 42 has a corresponding taper to receive the dovetail of the optics mount.

The optics floor 42 is sized and shaped to fit within the lumen of the elongate shaft 14. The optics floor 42 is partially or generally cylindrical with a proximal and a distal surface or wall, both slanted a predetermined angle, e.g., 30 degrees, relative to the longitudinal axis of the elongate shaft 14 and connected to each other by a generally cylindrical sidewall. In various embodiments, the predetermined angle is about 30 degrees, e.g., +/−30 degrees. In various embodiments, the predetermined angle ranges from +/−15 degrees to +/−45 degrees. The proximal and distal walls are thus parallel to each other. Similarly, the proximal and distal walls of the optics floor and the proximal and distal walls of the optics mount are parallel with each other. The optics floor 42 is sized and configured to provide a backing and support for the image sensor 43 and/or the image sensor PCB. In various embodiments, the optics mount 44 and the optics floor 42 are adhered to each other. In various embodiments, a gasket is positioned between the optics mount 44 and the optics floor 42 to add back pressure to the image sensor positioned on the optics mount. In various embodiments, the image sensor is adhered to the optics mount. The optics floor 42 also has channel or slot 422 sized and shaped to receive, secure and route wires and/or a ribbon cable 41 extending from the image sensor 43. The ribbon cable 41 extends through the elongate shaft 14 and into the handle 12. In various embodiments, the ribbon cable 41 connects to the adapter PCBA 24 disposed in the handle 12. The ribbon cable 41 transmits the image sensor's image feed or raw image data from the image sensor 43 and in various embodiments, to the adapter PCBA 24. In various embodiments, the adapter PCBA 24 comprises one or more connectors arranged to connect to the wires 49 and/or the ribbon cable 41 transmit/receive data and/or power therethrough. In various embodiments, the optics floor 42 is optional and thus the connections or features of the optics mount 44 utilized to interface with the optics floor may be omitted. In various embodiments, the dovetail and corresponding receiving channel may be optional.

In accordance with various embodiments, one or more LEDs are secured or mounted to the optics housing. In various embodiment, an LED, e.g., LED 47, is placed on a PCB with two through holes and wires or leads are soldered to the through holes and pass down the elongate shaft 14 to transmit power to the LED. The LED 47 is placed near an outer diameter at an outer or distal surface or wall of the optics mount 44 and away from the lens 45 maximizing the distance between the two and/or the wall thickness of the optics mount therebetween to prevent or avoid any noticeable lens flare. In various embodiments, spacing behind the LED is blocked with glue, wax, or other similar opaque substances and/or the lumen of the elongate shaft entirely or near and/or around the optics housing includes or is coated with a non-reflective material to further assist in preventing any noticeable lens flare or halos. In various embodiments, a black or opaque adhesive material adheres the LED to the optics mount and, in various embodiments, placed along the edges on the back or proximal end of the LED, preventing light from the LED from shining back into the elongate shaft and/or the image sensor. In various embodiments, the optics cover is also isolated from the LED 47 via the optics mount and/or the placement or positioning thereto such that the LED is prevented from illuminating the optics cover, for example, creating unwanted reflections or image distortions. In various embodiments, a light blocking wall, e.g., a plastic and/or opaque wall, is positioned on the optics mount 44 between the LED, and the lens and/or the optics cover to reinforce light blocking between the LED and the lens and/or the optics cover.

Figure 11:
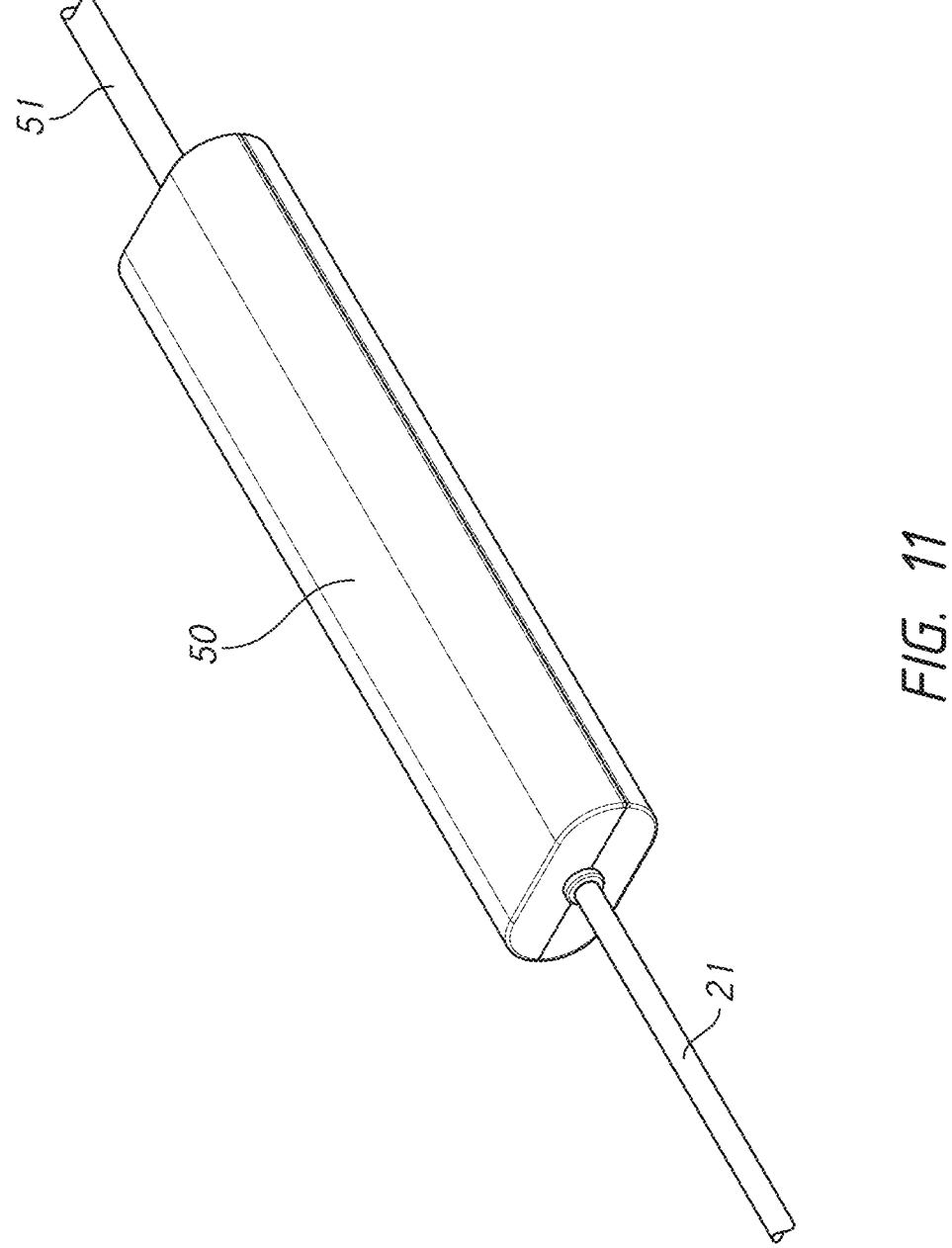
FIG. 11 is a perspective view of a controller box in accordance with various embodiments of the present invention.
Figure 12:
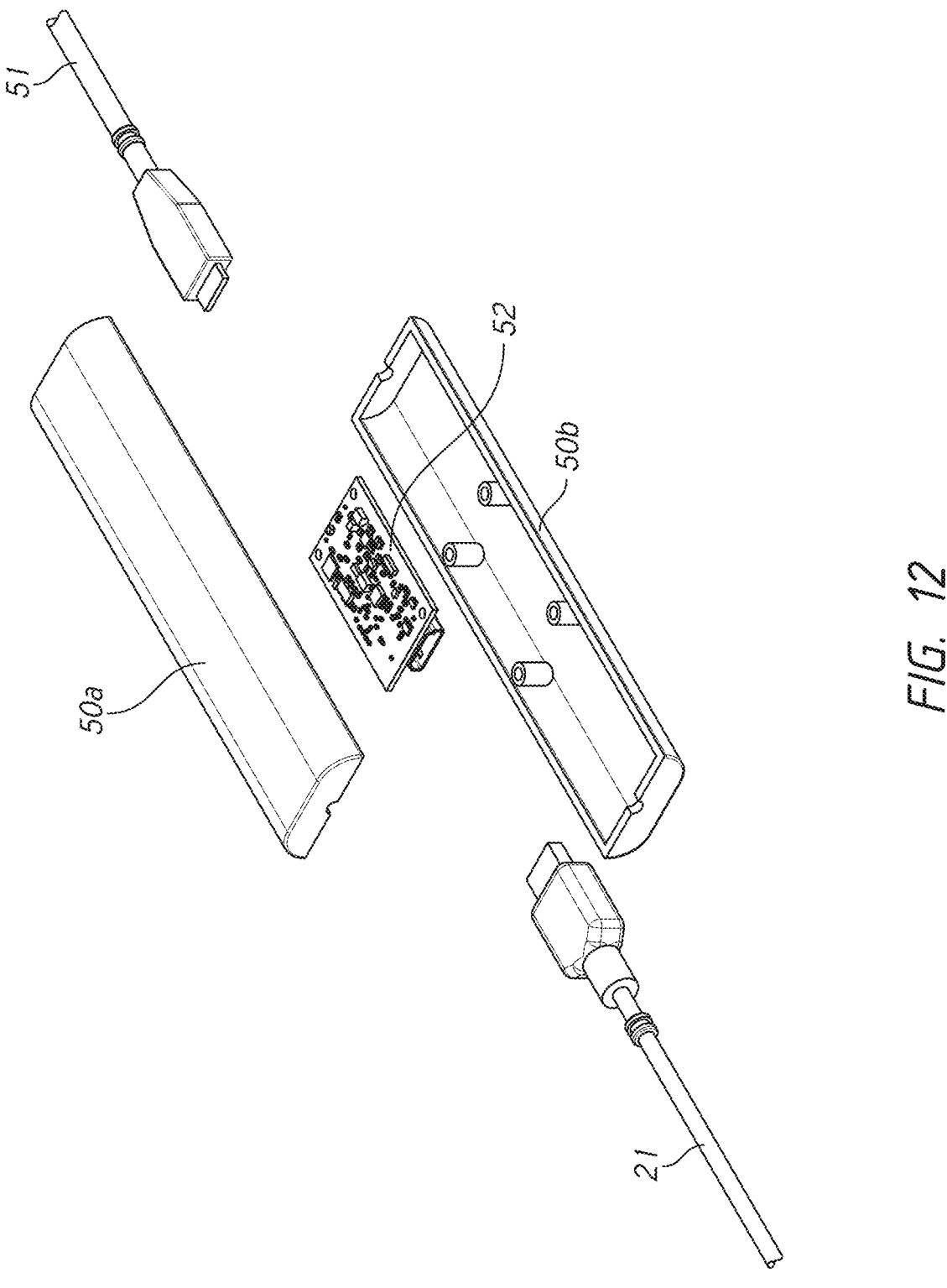
FIG. 12 is an exploded view of a controller box in accordance with various embodiments of the present invention.

As shown, for example, in FIGS. 11-12, in accordance with various embodiments, the controller box 50 comprises a cavity or interior with a controller PCBA 52 housed therein. The controller PCBA 52 is disposed between the simulated light cable 21 and the data cable 51. In various embodiments, the controller PCBA 52 comprises one or more connectors arranged to connect to the simulated light cable 21 and/or the data cable 51. In the illustrated embodiment, the controller box 50 is a two-piece clam shell design with a pair of controller box halves 50a, b to ease assembly and connectivity to the data cable 51 and/or a simulated light cable 21. The simulated light cable and/or the data cable is affixed, permanently, to the controller PCBA. In various embodiments, the simulated light cable and/or the data cable is removably attached to the controller PCBA. In various embodiments, the simulated light cable 21 is a HDMI cable or a HDMI to a micro-HDMI cable. In various embodiments, the data cable 51 is a USB cable or a USB to micro-USB cable.

Referring to also FIGS. 13-15C, the controller PCBA 52 receives the camera image from the image sensor 43. The controller PCBA 52 receives rotational data, e.g., an angle of rotation, from the encoder 26. The processor or controller of the surgical trainer 60 rotates the received camera image utilizing the received rotational data and transmits the rotated camera image to the display screen of the surgical trainer. In various embodiments, the surgical trainer controller comprises a filter to remove noise from the rotational data received from the encoder 26. In various embodiments, the filter uses an exponential moving average and smooths out the rotational data from the encoder 26. The surgical trainer controller uses the filtered/smoothed angle to rotate the camera image about its center using a two-dimensional rotation matrix as shown for example in FIGS. 15A-B.

In various embodiments, as shown, for example, in FIG. 15C, the rotated camera image is cropped by the surgical trainer controller into a predetermined shape, e.g., a circle, prior to transmitting the rotated camera image to the display screen. The predetermined circle has a diameter equal to the height of the camera image received from the image sensor. As the scope is rotated, the camera image displayed on the display screen fills the entire circle. As such, there are no moving visual artifacts, such as edges or corners of the camera image, while the scope is being rotated.

In various embodiments, the encoder 26 being an absolute encoder provides an absolute value according to the encoder shaft's position. The encoder outputs an encoder data, e.g., an encoder value of 0-1024 representing a rotational position of the encoder relative to the encoder shaft in a binary format. In various embodiment, an encoder microcontroller is integrated with or otherwise attached to the controller PCBA 52 receives and reads the encoder data, e.g., the binary encoder values, from the absolute encoder and outputs the values via USB communication. The image sensor 43, in various embodiments, is a CMOS (complementary metal oxide semiconductor). The image sensor 43 converts light into electrical signals which can be processed to produce an image. In various embodiments, an image sensor microcontroller is integrated with or otherwise attached to the controller PCBA 52 processes the raw image sensor data and outputs the image via USB communication. The USB hub takes in the processed encoder data and the processed image sensor data and outputs the two data streams simultaneously. The data streams are transmitted to a controller or processor attached or integrated with the surgical trainer 60. In accordance with various embodiments, the image sensor microcontroller, encoder microcontroller, power supply, and/or USB hub are all part of, e.g., integrated and/or attached to, the controller PCBA 52 in the controller box 50.

Referring now to FIGS. 16A-19C, as shown in the exemplary figures, the illustrated cone demonstrates a camera's field of view. As the simulated camera housing is held fixed or stationary, the simulated scope housing is rotated as illustrated by the position of the simulated light cable 21. As the simulated scope housing, elongate shaft and optics housing are rotated, the camera or cone of view is also rotated providing a different view of the "UL" shown. With the optics, e.g., lens and image sensor, at the tip or distal end of the elongate shaft, the camera perspective or image view is rotated along with the elongate shaft. The rotation or rotation angle or position between the simulation scope housing and the simulated camera housing is measured by the encoder 26. Using this measurement, the image is rotated such that the "UL" is displayed upright as shown. In the illustrated embodiment, the camera's field of view is shown as a cone, however, with this field of view may and, in various embodiments, not conical, dictated in part by the lens and/or image sensor. In various embodiments, the camera's field of view resembles a pyramid or a tapered view distally extending to a rectangular or quadrilateral base.

In FIG. 16B, an exemplary camera view is shown with the scope in a zero degree and/or initial position and in FIG. 16C, a rotated exemplary image is shown, as processed by the controller PCBA 52 and/or the processor of the surgical trainer 60 and displayed on the screen or monitor of the surgical trainer 60. FIGS. 17B, 18B and 19B provide the exemplary camera views with the scope in respective 90 degrees, 180 degrees and 270 degrees positions and FIGS. 17C, 18C and 19C provide the respective rotated exemplary images (90 degrees, 180 degrees and 270 degrees) as processed by the controller PCBA 52 and/or the processor of the surgical trainer 60 and displayed on the screen or monitor of the surgical trainer 60.

Referring to FIG. 20, in accordance with various embodiments, a machined encoder housing is provided. The encoder 26 is housed in a machined hollow rotary shaft or barrel that is rigidly connected to the simulated scope housing 20 and rotates within the simulated camera head 30.

Referring to FIG. 21, in accordance with various embodiments, a machined rotary shaft or barrel is provided. The machined solid rotary shaft serves as a connection between the encoder shaft 27 and the simulated camera head 30 and translates the rotation of the encoder in the simulated scope housing 30 relative to the simulated camera head. The machined rotary shaft could also serve as a bearing surface for the simulated scope housing 20 and the simulated camera head 30. Referring to FIG. 22, in accordance with various embodiments, a flange constraint and rotation is provided. A flange on the simulated scope housing constrains the simulated camera head 30 axially and allows for rotation around a protruding shaft. The short length of the shaft allows for the encoder shaft 27 to engage directly with the simulated camera head 30 and thus captures the rotation of the simulated scope housing relative to the simulated camera head.

Referring to FIGS. 23-28, a laparoscopic surgical training device or surgical trainer 60 according to various embodiments of the present invention is shown. The laparoscopic surgical training device 60 provides an internal cavity 208 substantially obscured from the user for receiving simulated or live tissue or model organs or training models. The body cavity 208 is accessed via a tissue simulation region 210 that is penetrated by the user employing devices to practice surgical techniques on the tissue or practice model found located in the body cavity 208. Although the internal cavity 208 is shown to be accessible through a tissue simulation region 210, a hand-assisted access device, trocar, or single-site port device may be alternatively employed to access the internal cavity 208. An exemplary laparoscopic surgical training device or surgical trainer is described in U.S. Pat. No. 8,764,452 entitled "Portable Laparoscopic Trainer" filed on Sep. 29, 2011 and incorporated herein by reference in its entirety. The surgical trainer is particularly well suited for practicing laparoscopic or other minimally invasive surgical procedures.

The surgical trainer includes a top cover 202 connected to and spaced apart from a base 204 by a plurality of legs 206. The surgical trainer, in various embodiments, is configured to mimic the torso of a patient such as the abdominal region. The top cover 202 is representative of the anterior surface of the patient and the space between the top cover 202 and the base 204 is representative of an interior of the patient or body cavity where organs reside. The surgical trainer is a useful tool for teaching, practicing, and demonstrating various surgical procedures and their related instruments in simulation of a patient undergoing a surgical procedure. Surgical instruments and/or a surgical simulation scope 10, 10', in accordance with various embodiments of the present invention, are inserted into the cavity through the tissue simulation region 210 and/or through pre-established apertures 212 in the top cover 202. Various tools and techniques may be used to penetrate the top cover 202 to perform mock procedures on simulated organs or practice models placed between the top cover 202 and the base 204. The base 204 includes a model-receiving area 214 or tray (not shown) for staging or holding a simulated tissue model or live tissue. The model-receiving area 214 of the base includes frame-like elements for holding the model in place. To help retain a simulated tissue model or live organs on the base 204, a clip attached to a retractable wire is provided at various locations around the base 204. The retractable wire is extended and then clipped to hold the tissue or organ model in position substantially beneath the tissue simulation region 210 and/or the apertures 212. Other means for retaining the tissue model include a patch of hook-and-loop type fastening material affixed to the base 204 in the model receiving area 214 such that it is removably connectable to a complementary piece of hook-and-loop type fastening material affixed to the tissue or organ model.

Figure 1:
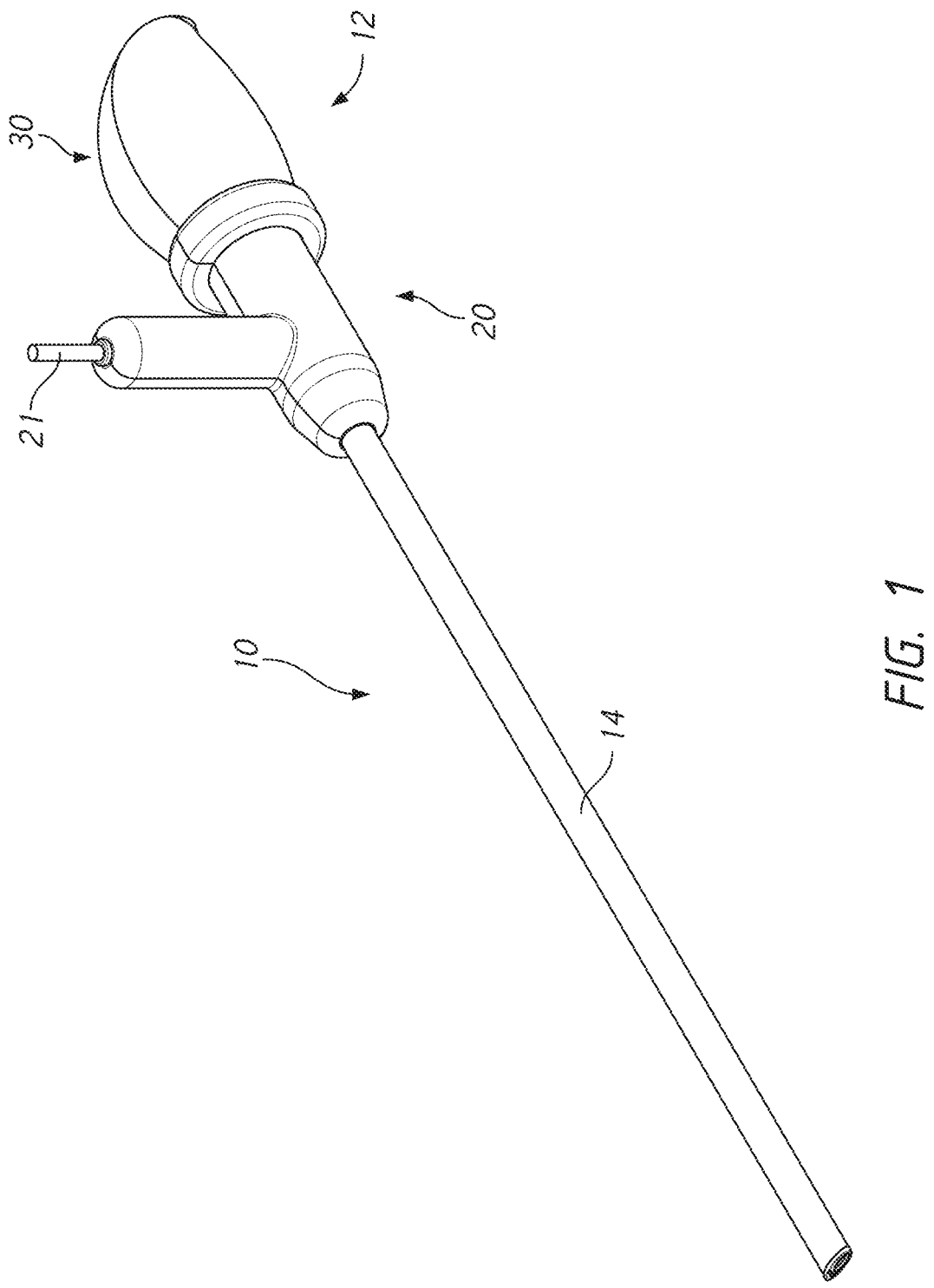
FIG. 1 is a perspective view of a surgical simulation scope in accordance with various embodiments of the present invention.
Figure 2:
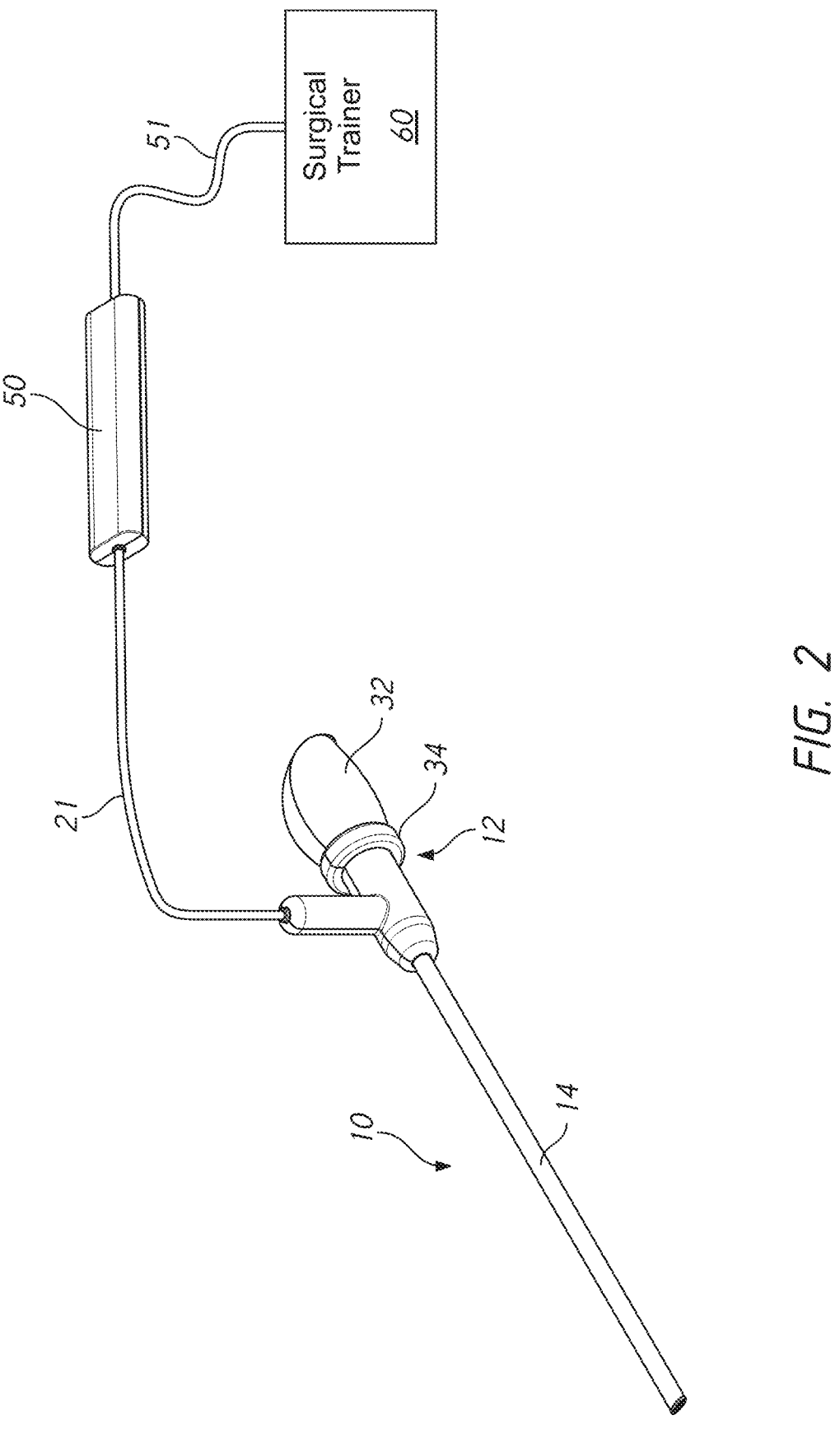
FIG. 2 is a perspective view of a surgical simulation scope system in accordance with various embodiments of the present invention.
Figure 3:
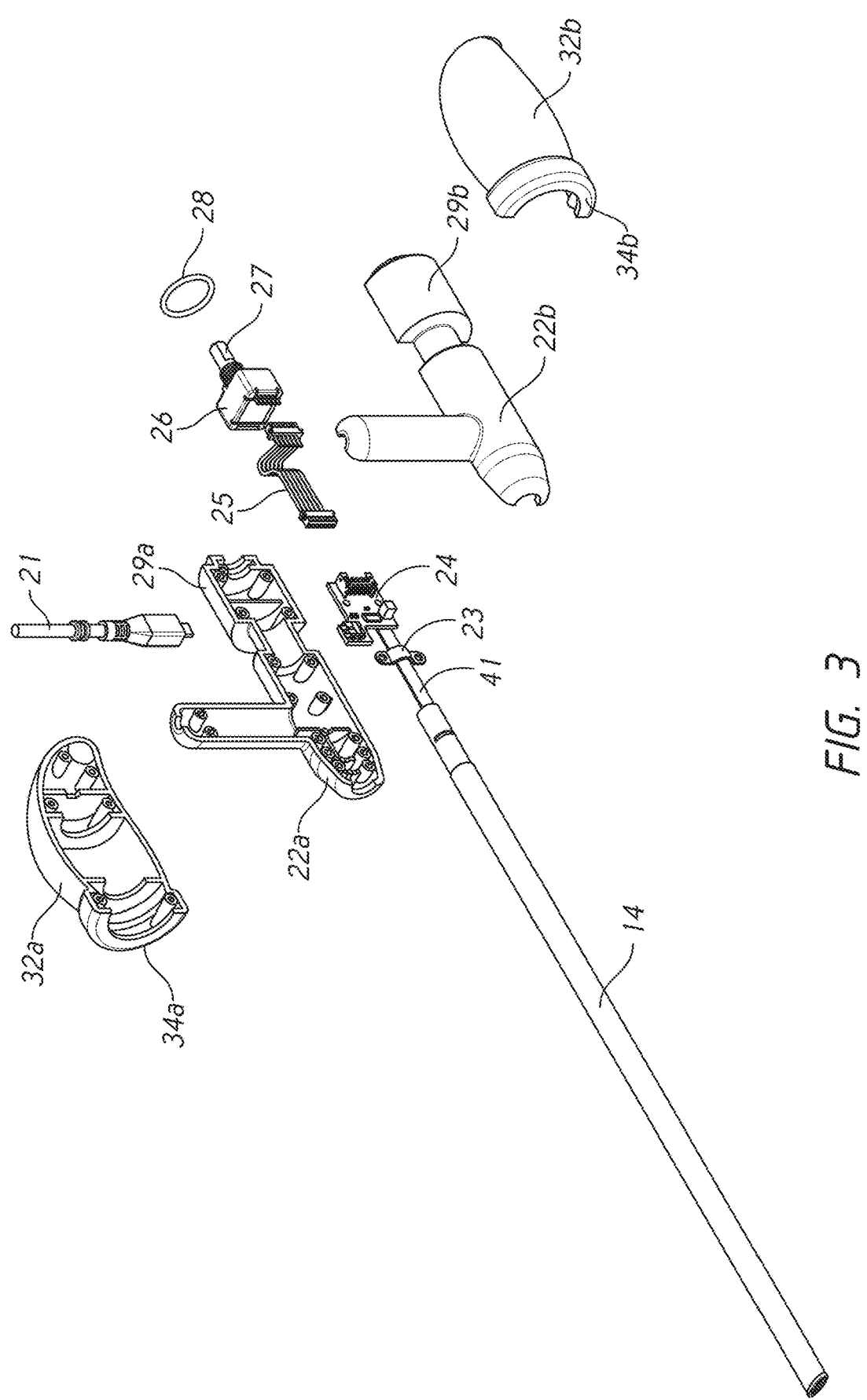
FIG. 3 is an exploded view of a surgical simulation scope in accordance with various embodiments of the present invention.
Figure 4A:
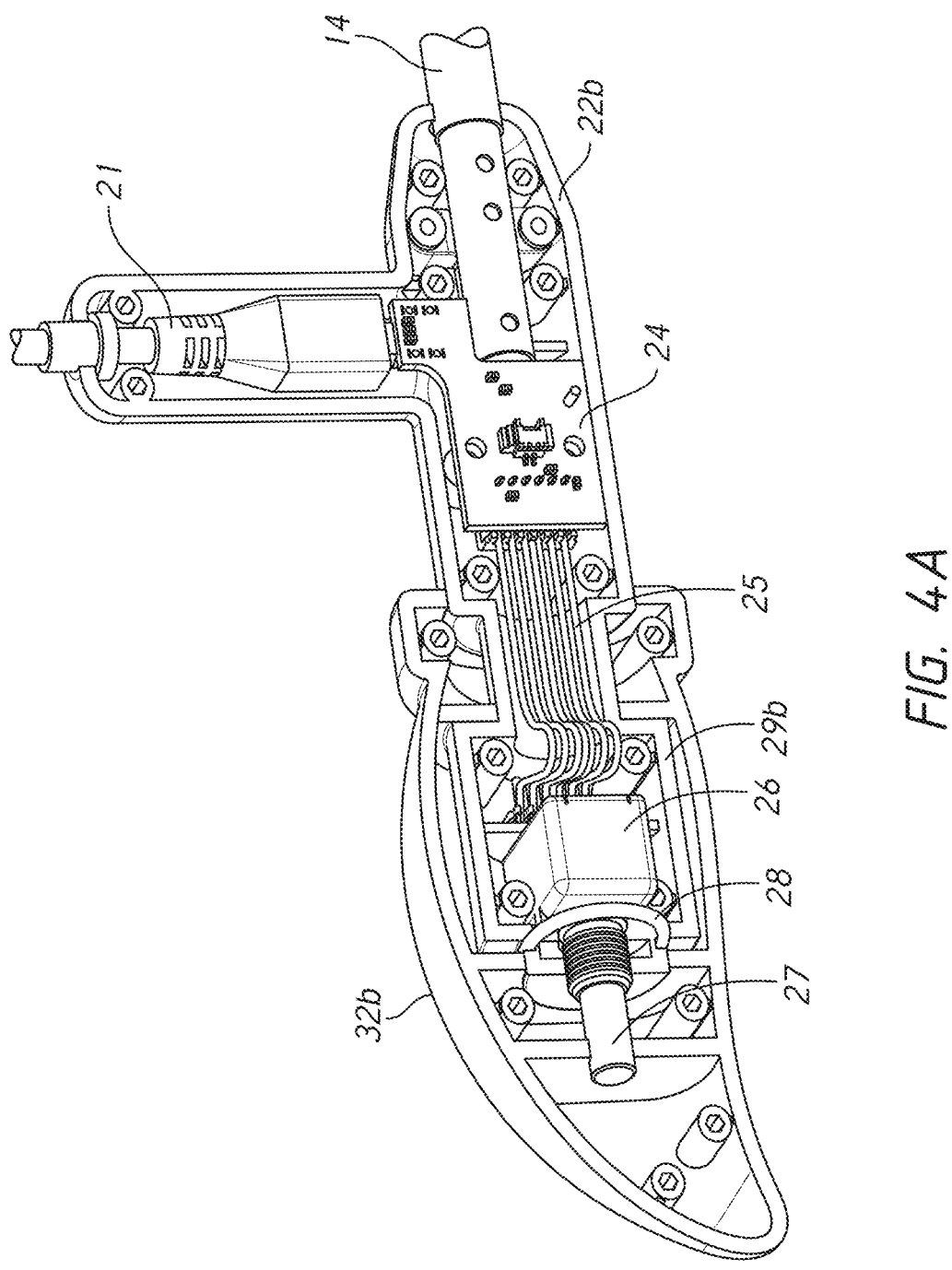
FIG. 4A-B are perspective views of portions of a surgical simulation scope in accordance with various embodiments of the present invention.
Figure 4B:
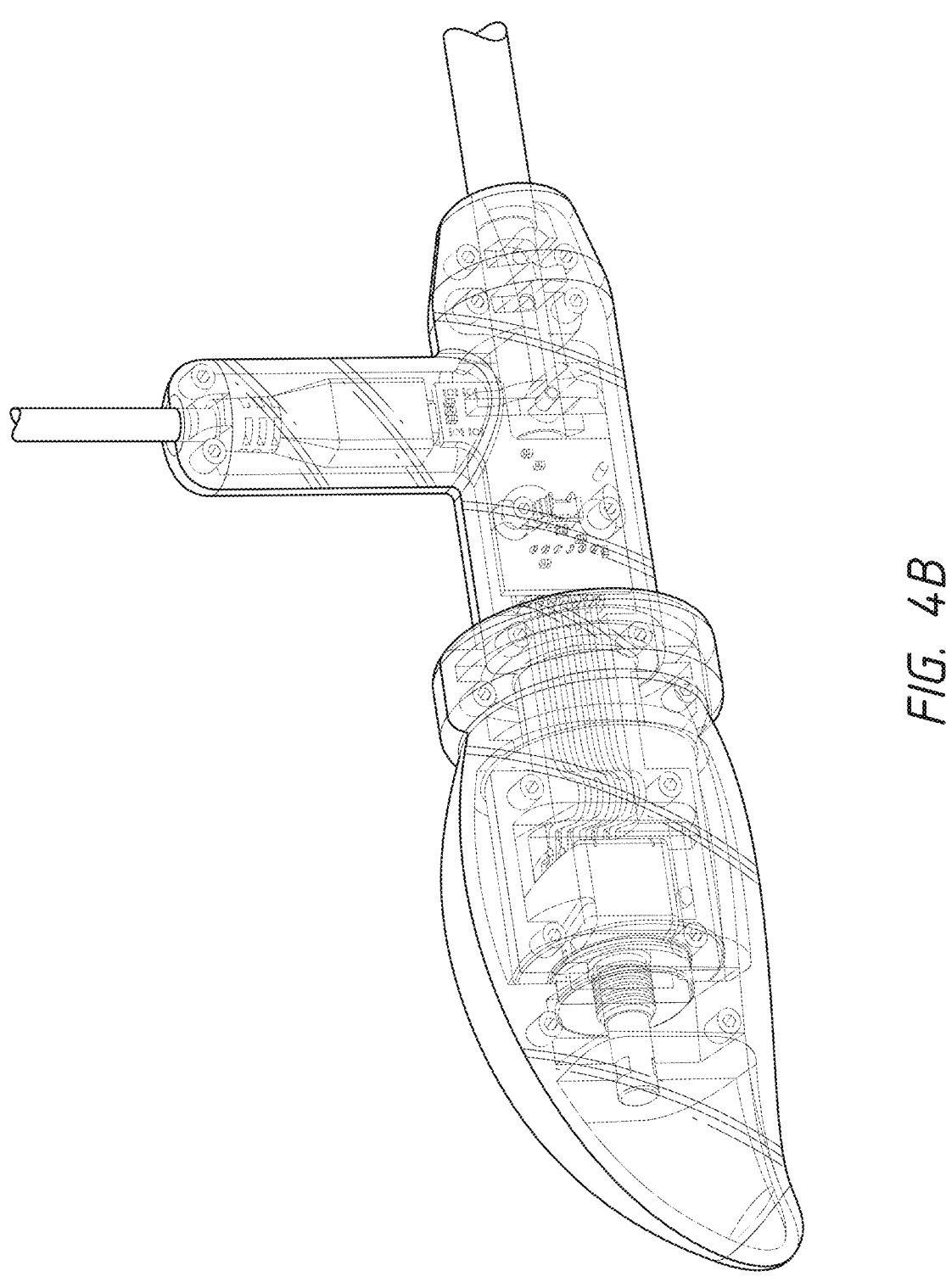
Figure 5:
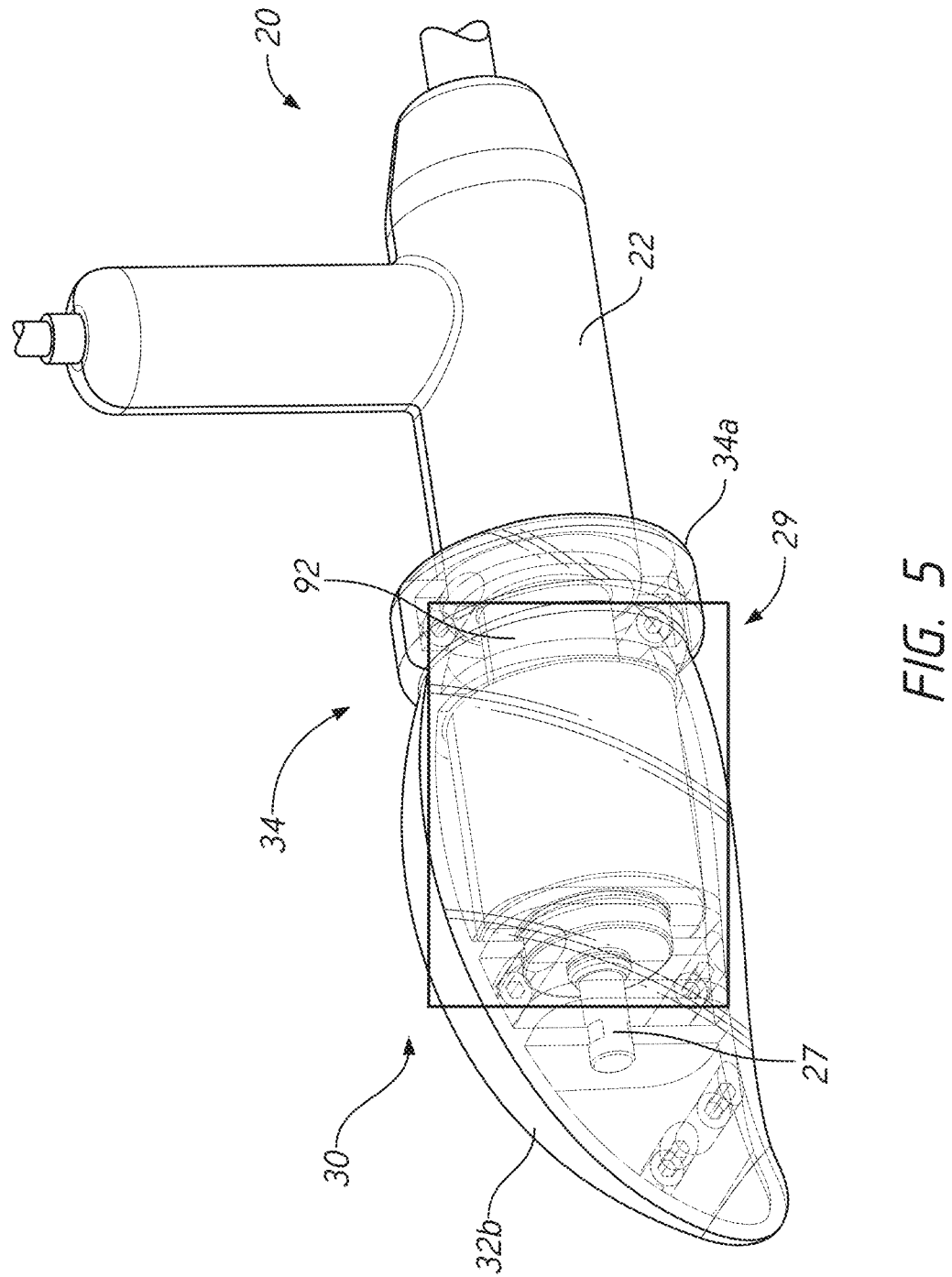
FIG. 5 is a perspective view of portions of a surgical simulation scope in accordance with various embodiments of the present invention.
Figure 6:
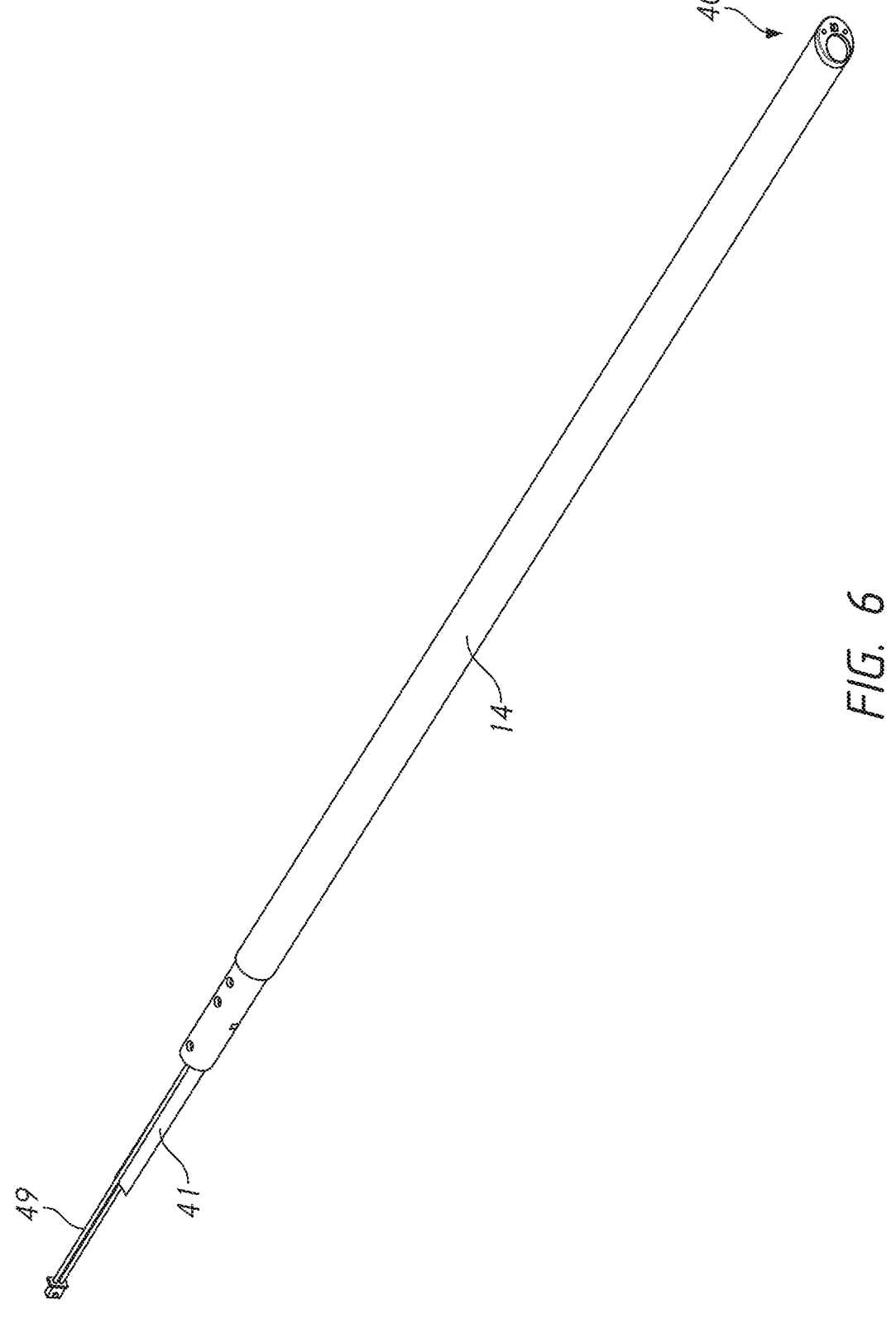
FIG. 6 is a perspective view of portions of a surgical simulation scope in accordance with various embodiments of the present invention.
Figure 7:
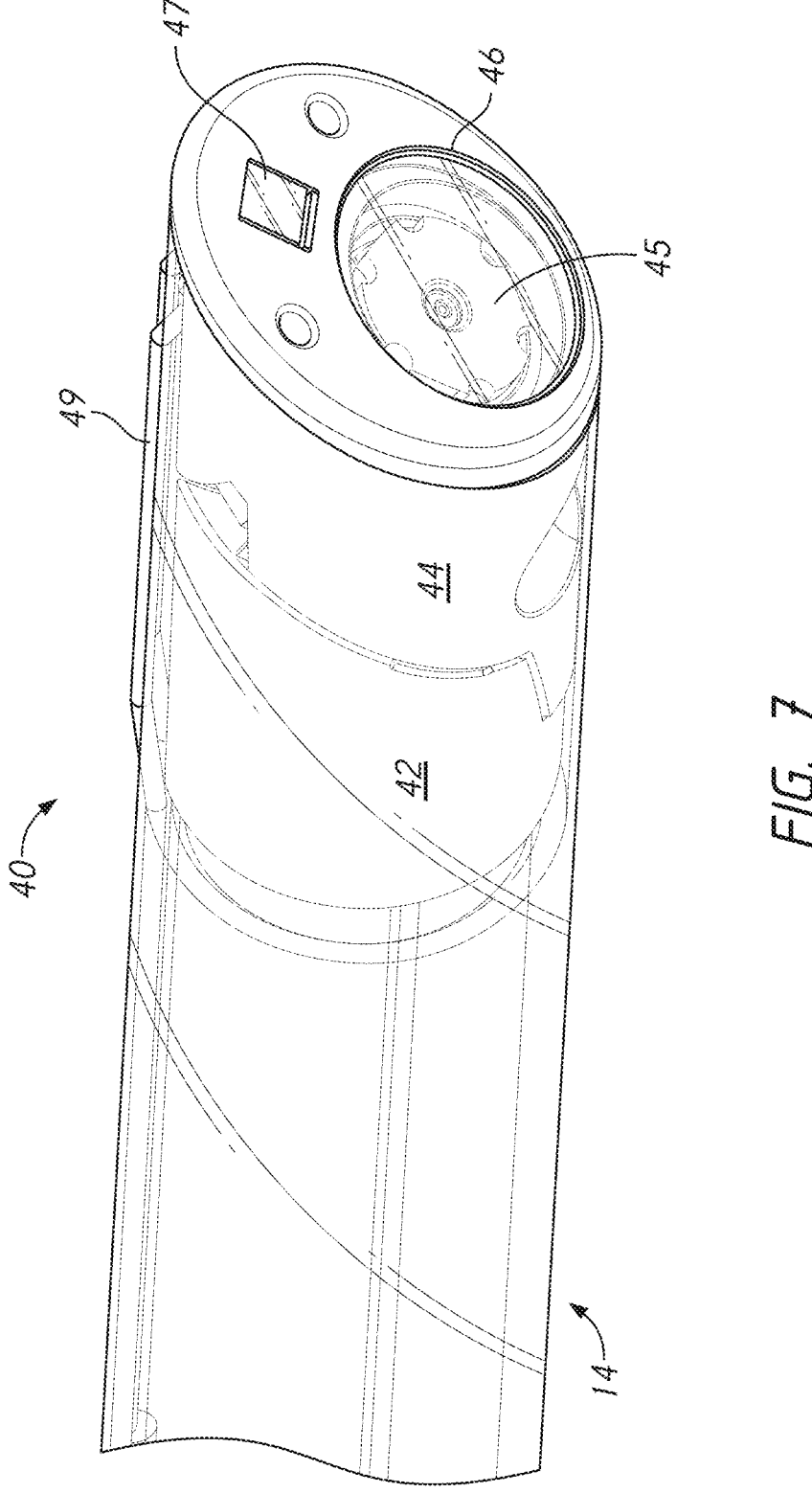
FIG. 7 is a perspective view of portions of a surgical simulation scope in accordance with various embodiments of the present invention.
Figure 8A:
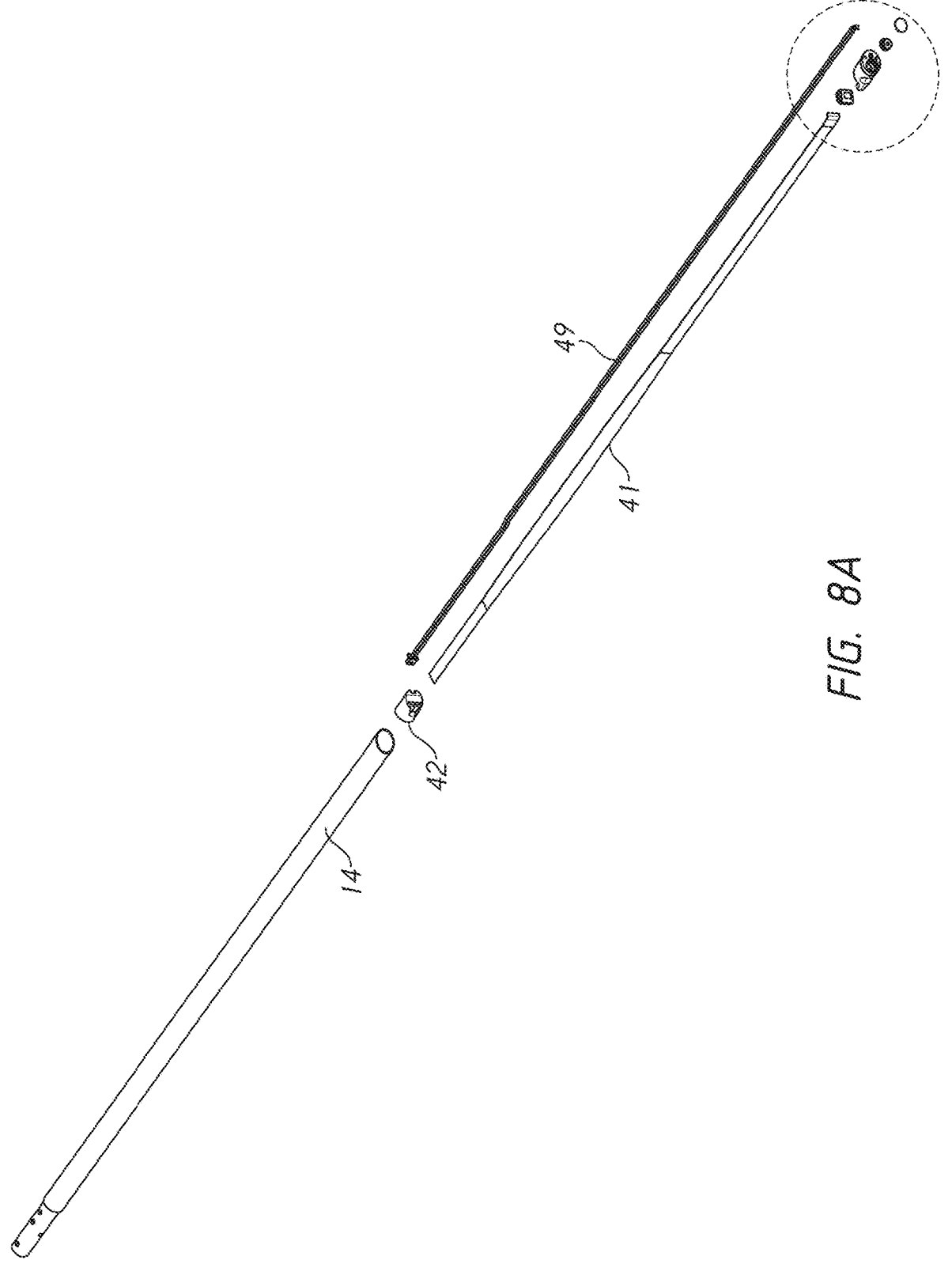
FIG. 8A is an exploded view of portions of a surgical simulation scope in accordance with various embodiments of the present invention.
Figure 8B:
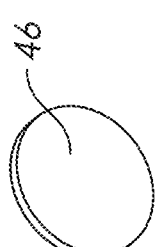
FIG. 8B is an exploded view of portions of a surgical simulation scope in accordance with various embodiments of the present invention.
Figure 8B:
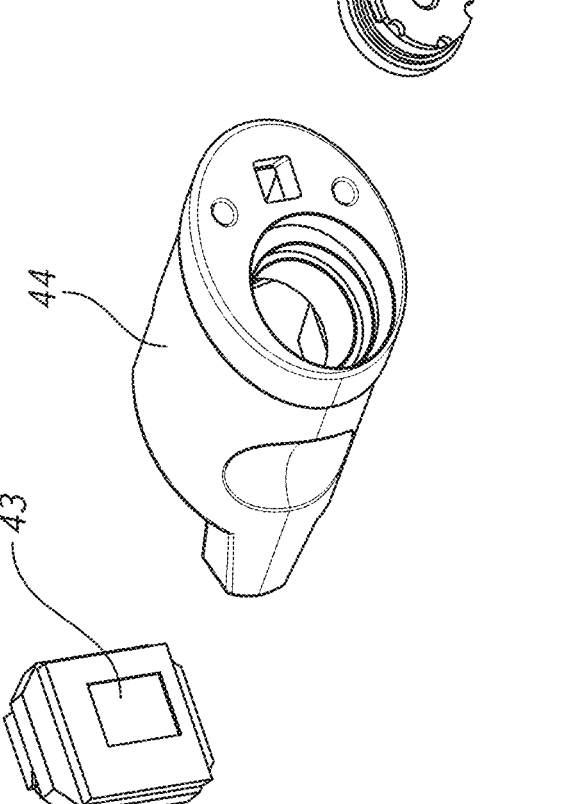
Figure 8B:
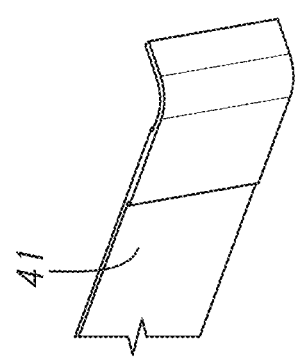
Figure 8C:
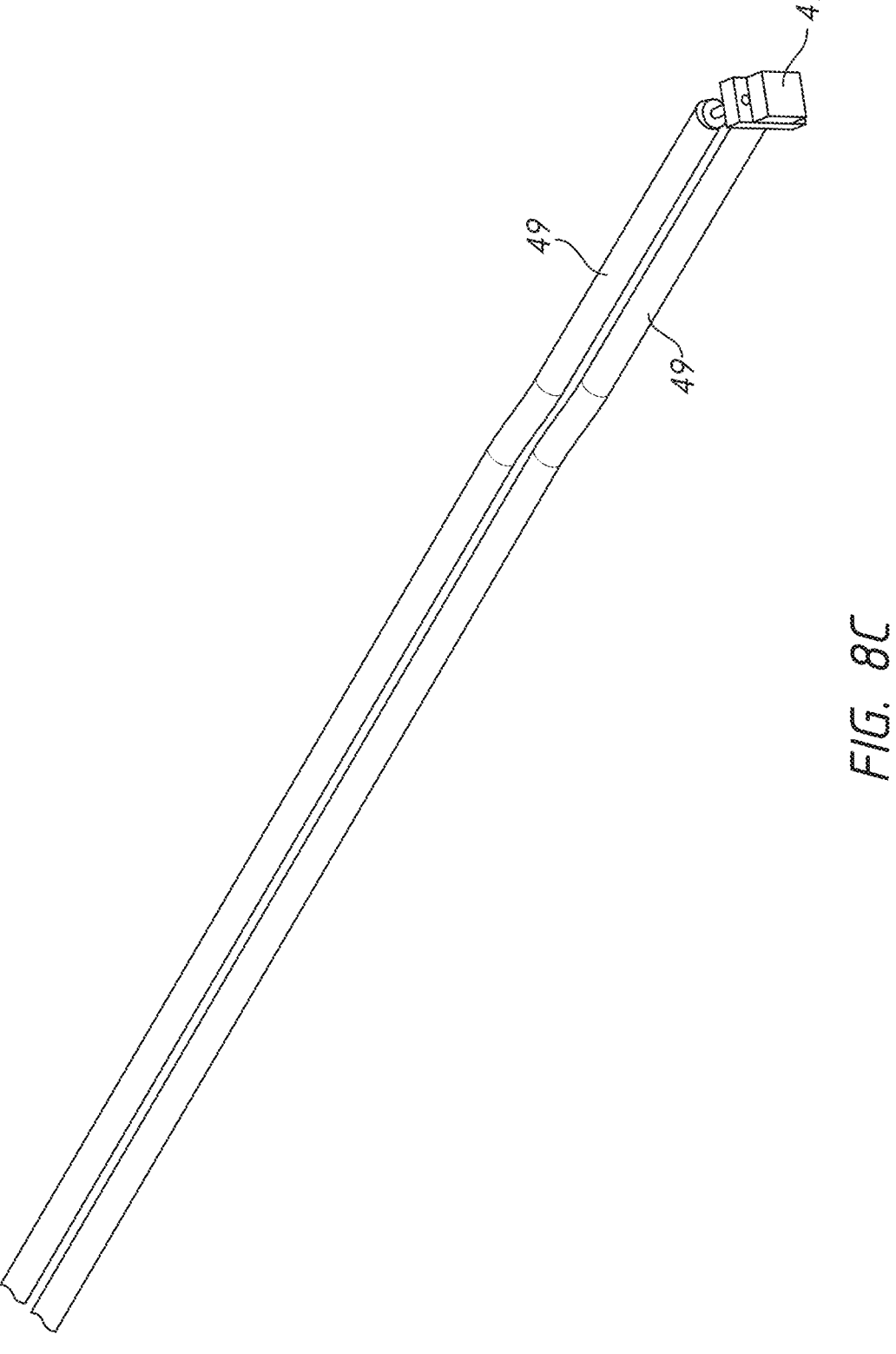
FIG. 8C is a perspective view of portions of a surgical simulation scope in accordance with various embodiments of the present invention.
Figures 9A, 9B:
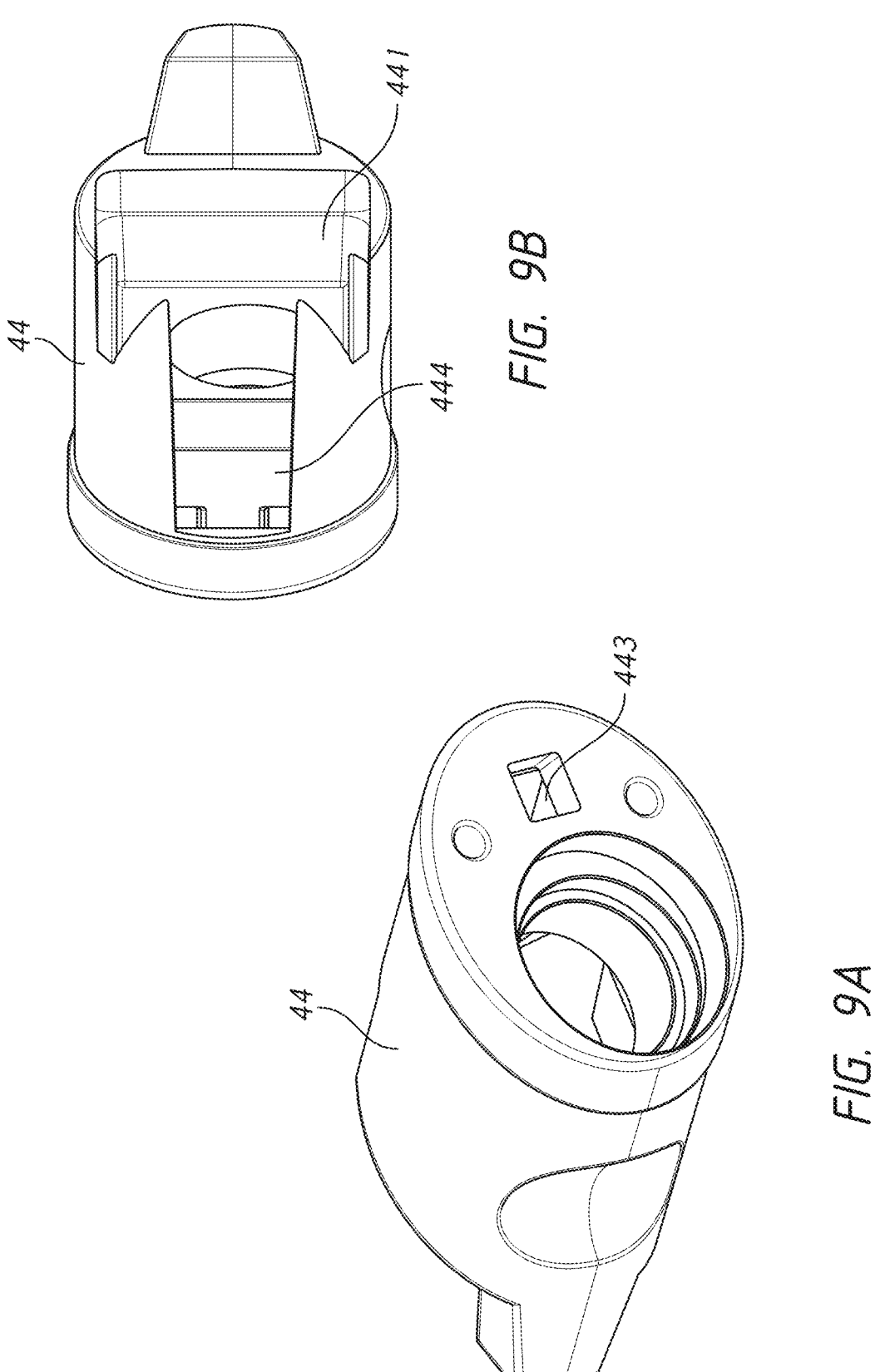
FIG. 9A is a perspective view of an optical mount in accordance with various embodiments of the present invention.
FIG. 9B is a bottom view of an optical mount in accordance with various embodiments of the present invention.
Figure 9D:
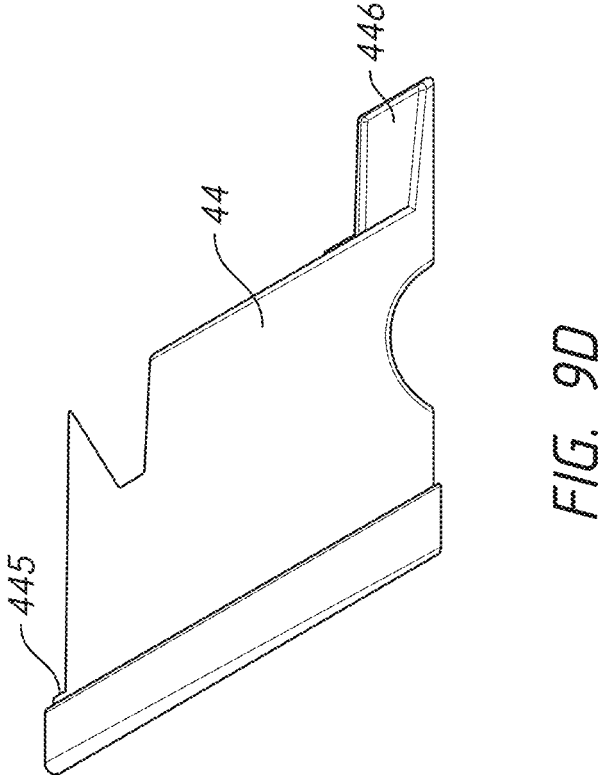
FIG. 9D is a side view of an optical mount in accordance with various embodiments of the present invention.
Figure 9C:
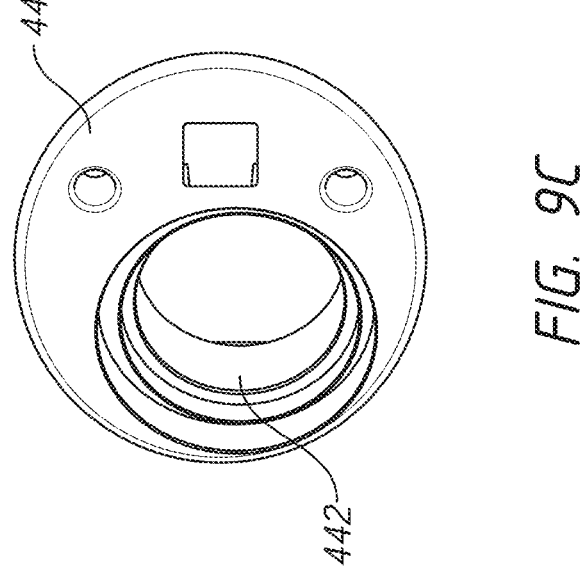
FIG. 9C is a front view of an optical mount in accordance with various embodiments of the present invention.
Figure 10B:
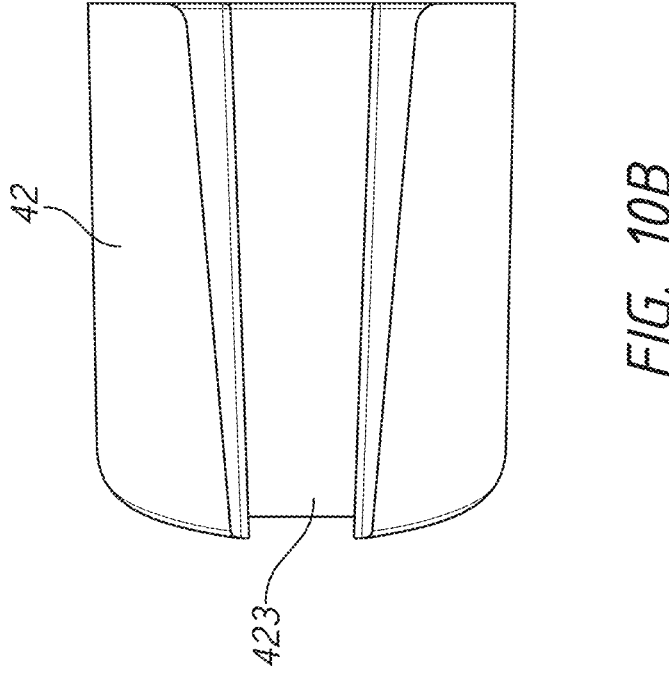
FIG. 10B is a bottom view of an optical floor in accordance with various embodiments of the present invention.
Figure 10A:
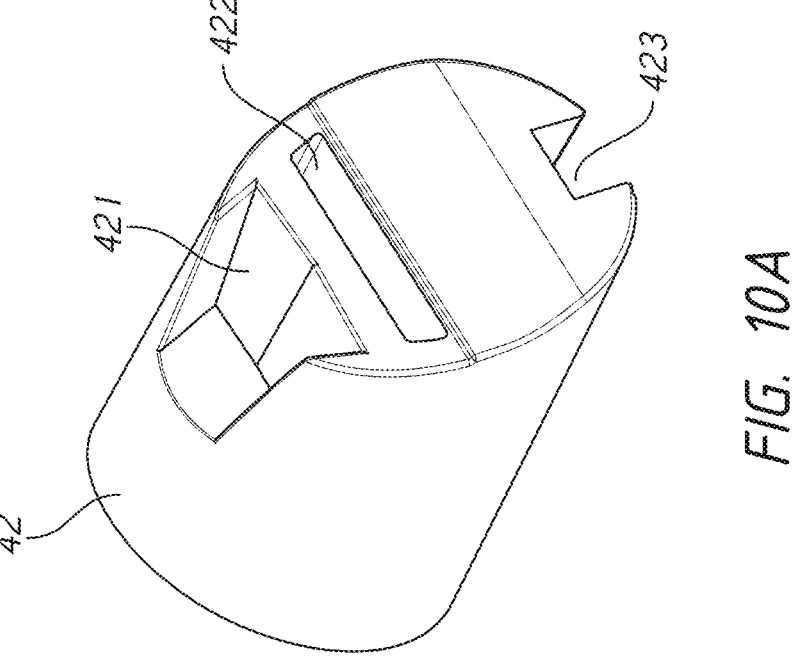
FIG. 10A is a perspective view of an optical floor in accordance with various embodiments of the present invention.
Figure 10D:
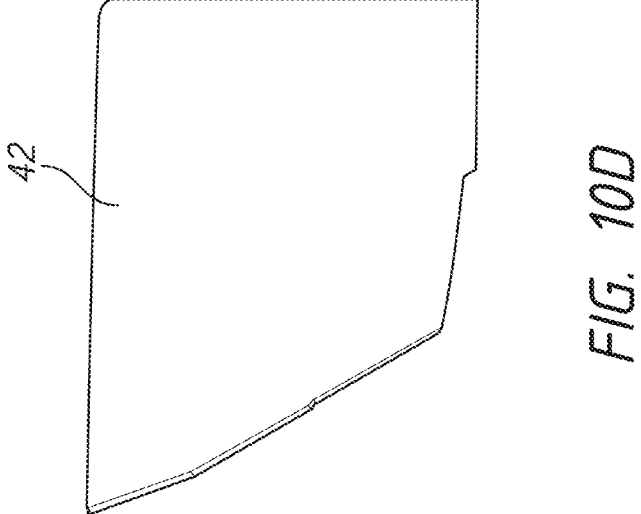
FIG. 10D is a side view of an optical floor in accordance with various embodiments of the present invention.
Figure 10C:
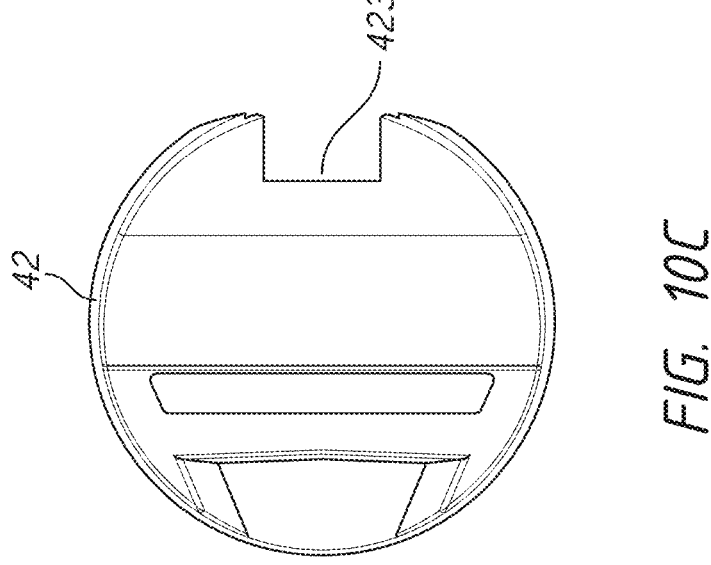
FIG. 10C is a front view of an optical floor in accordance with various embodiments of the present invention.

A video display monitor 216 is hinged to the top cover 202 (shown in a closed orientation in FIG. 4). The video display monitor 216 is connectable to a variety of visual systems for delivering an image to the monitor. In accordance with various embodiments, a surgical simulation scope 10 is inserted through one of the pre-established apertures 212 and used to observe the simulated procedure can be connected to the video display monitor 216 and/or a mobile computing device to provide an image to the user. In various embodiments, the data cable 51 is removably connected to the surgical trainer 60. In various embodiments, the data cable 51 provides the image sensor and/or the encoder data to a controller or processor of the surgical trainer to process and display an image on the monitor 216. In various embodiments, audio recording or delivery systems may also be provided and integrated with the surgical trainer 60 to provide audio and visual capabilities. Access to connect a portable memory storage device such as a flash drive, smart phone, digital audio or video player, or other digital mobile device is also provided, to record training procedures and/or play back pre-recorded videos on the monitor for demonstration purposes. In various embodiments, connections to provide an audio and/or visual output to a screen larger than the monitor is provided. In various embodiments, the top cover 202 does not include a video display monitor but includes means for connecting with a laptop computer, a mobile digital device or tablet and connecting it by wire or wirelessly to the trainer.

Figure 24:
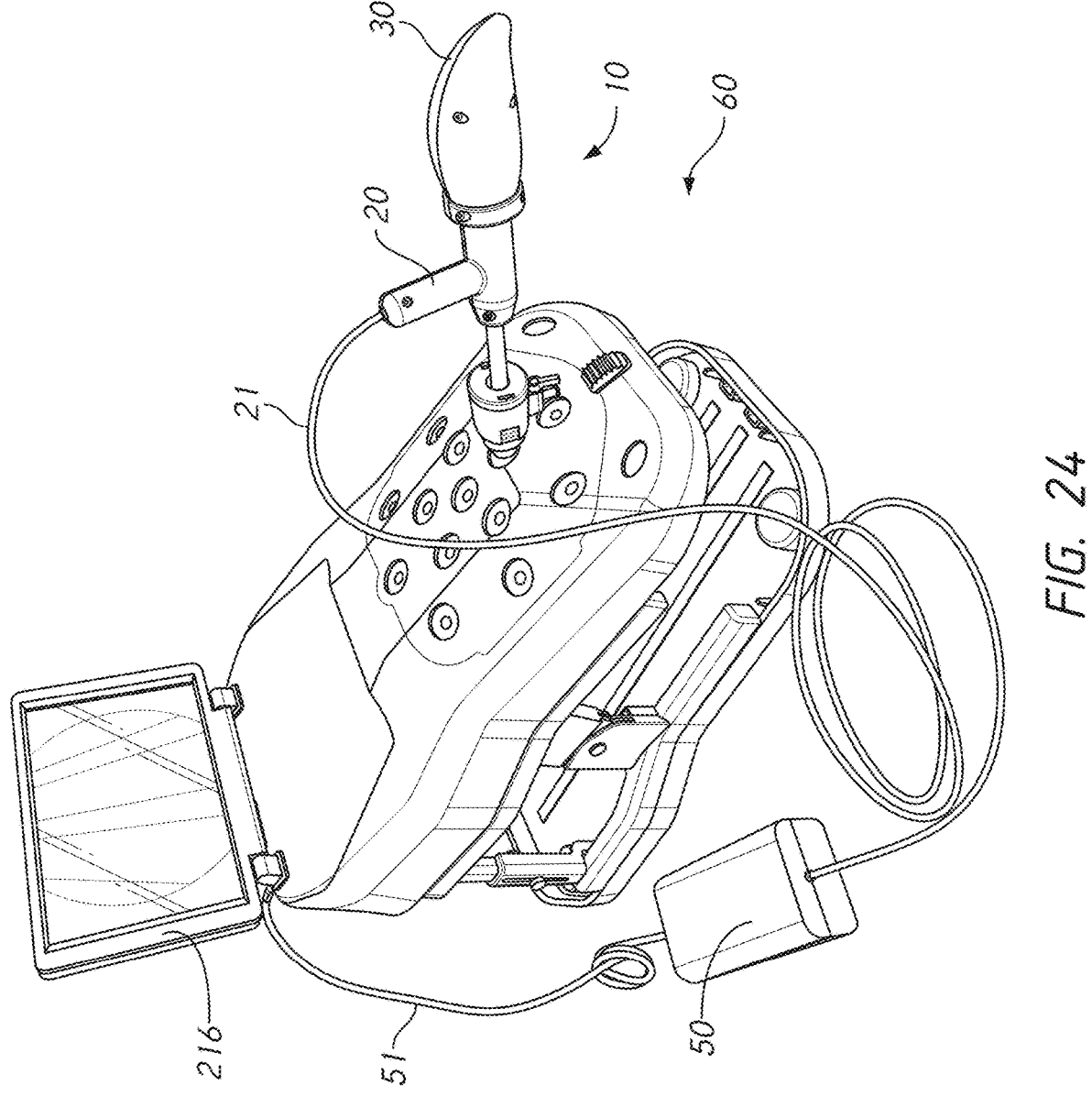
Figure 25:
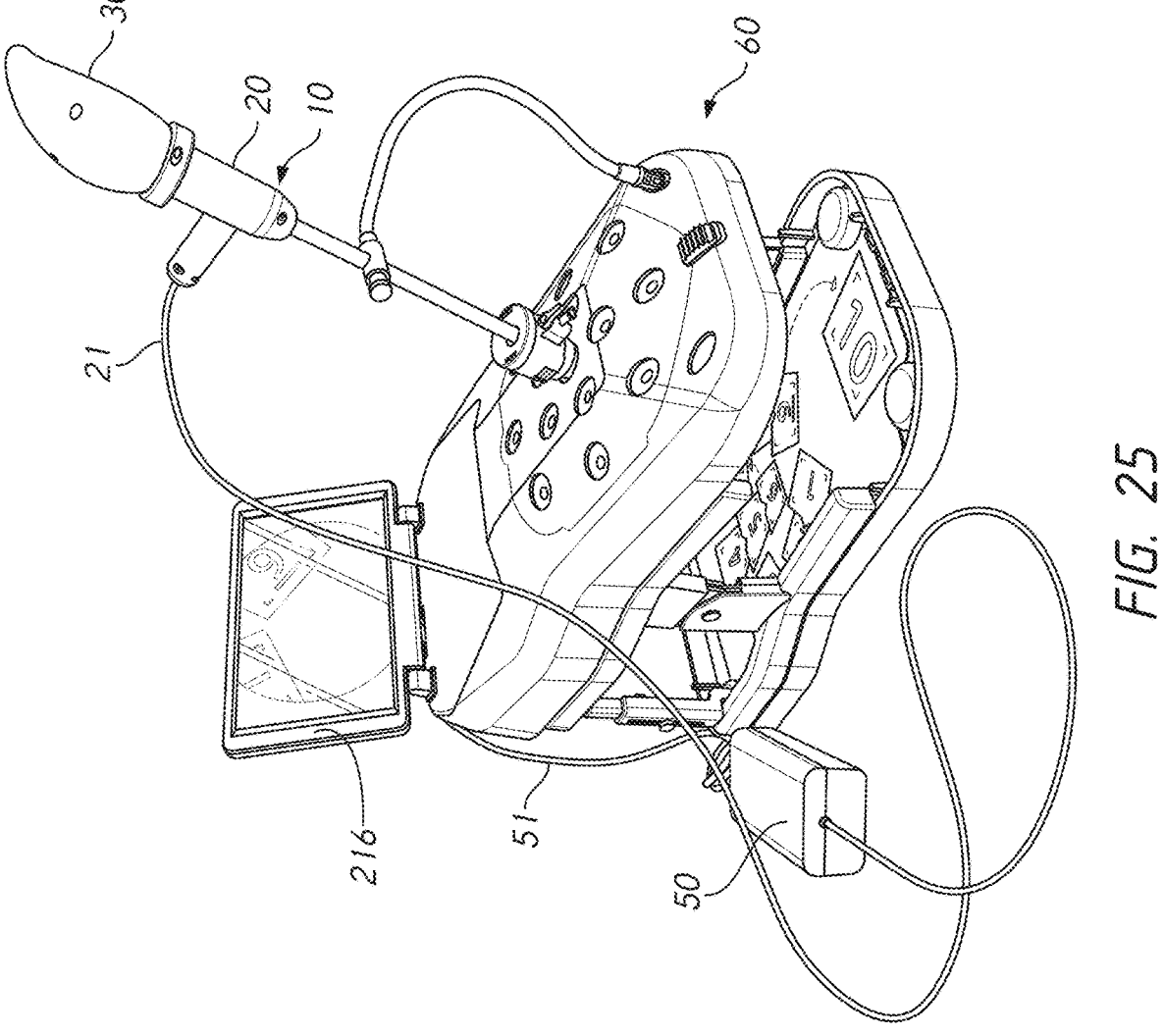
Figure 26:
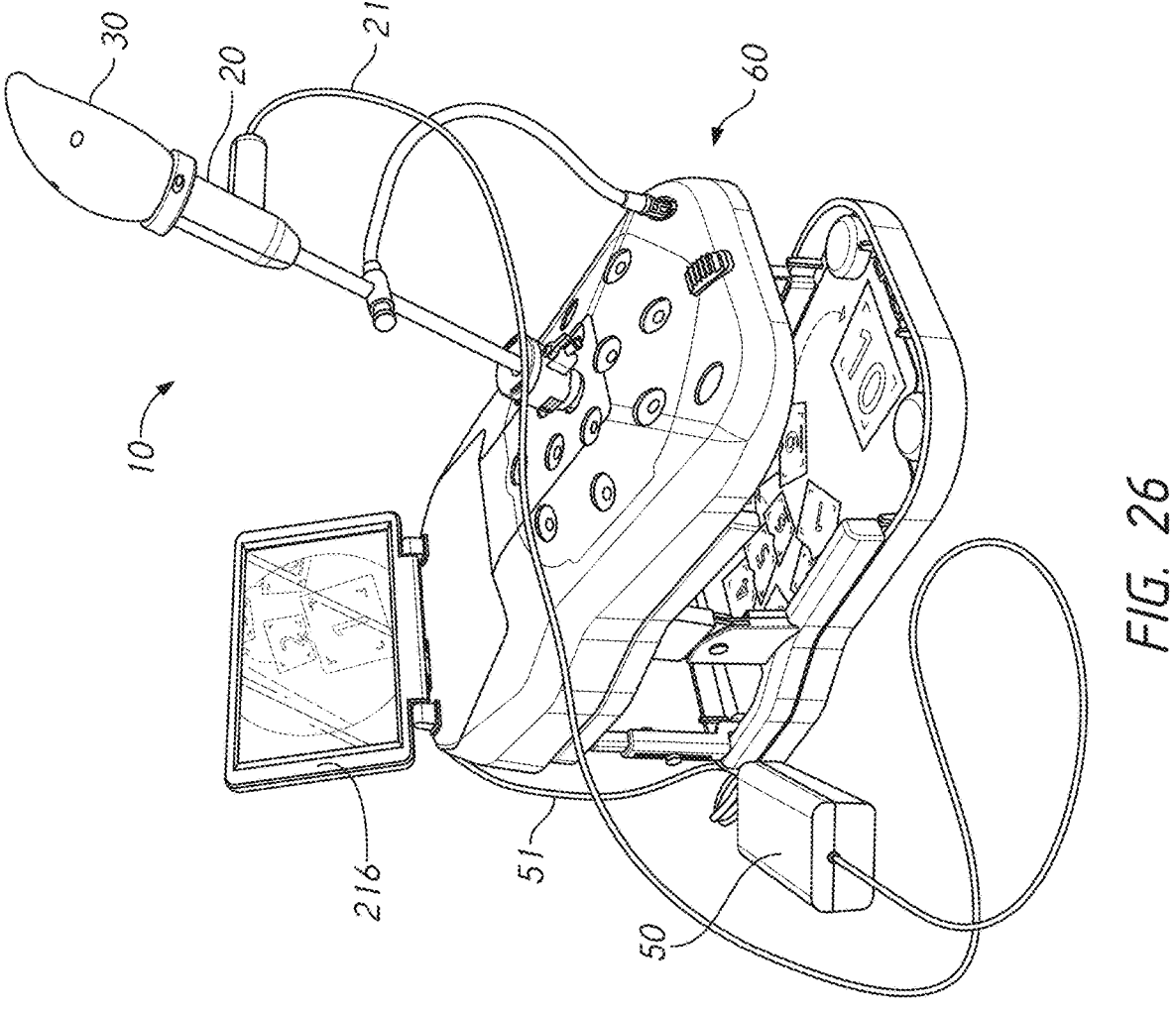
Figure 27:
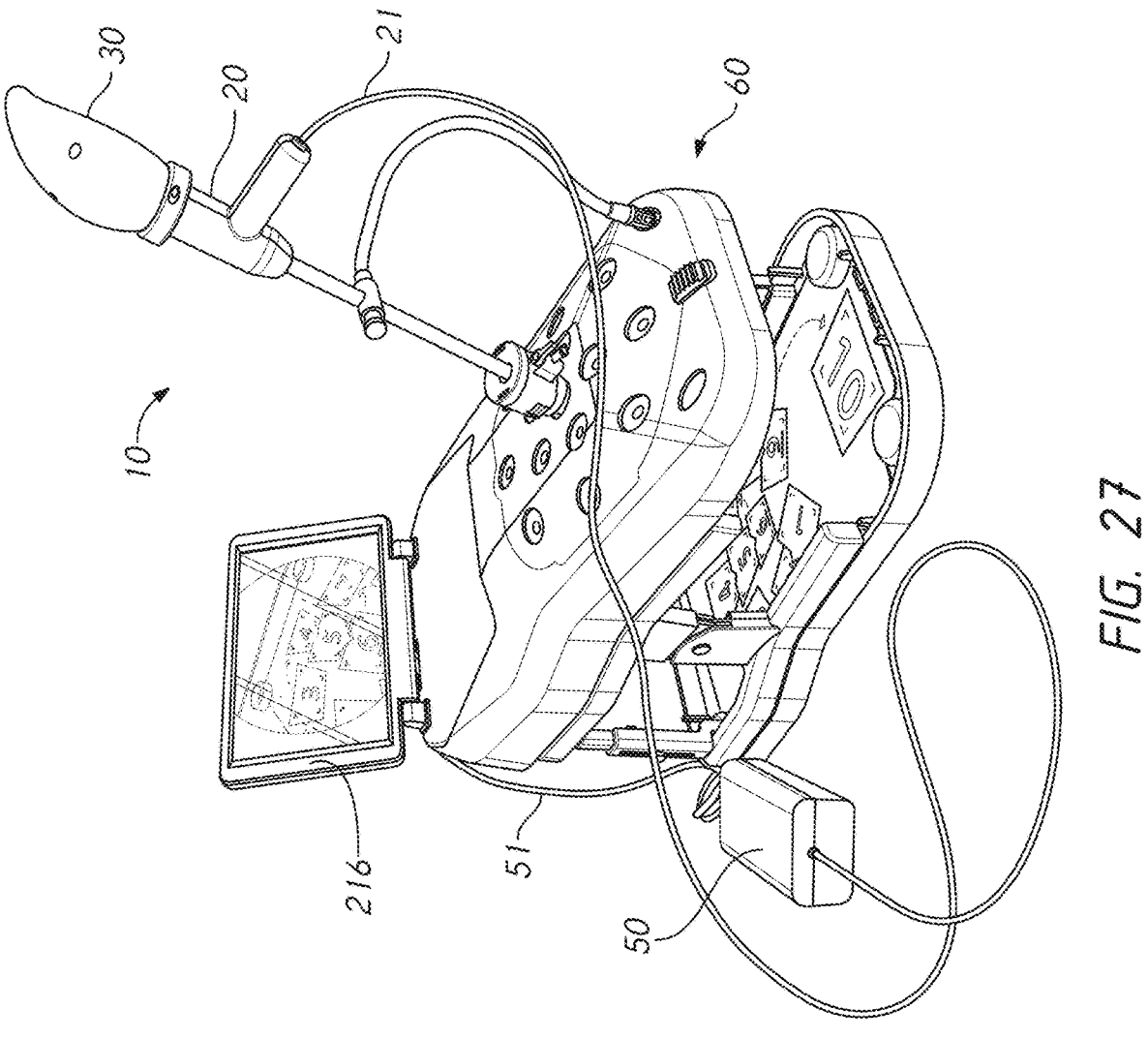
Figure 28:
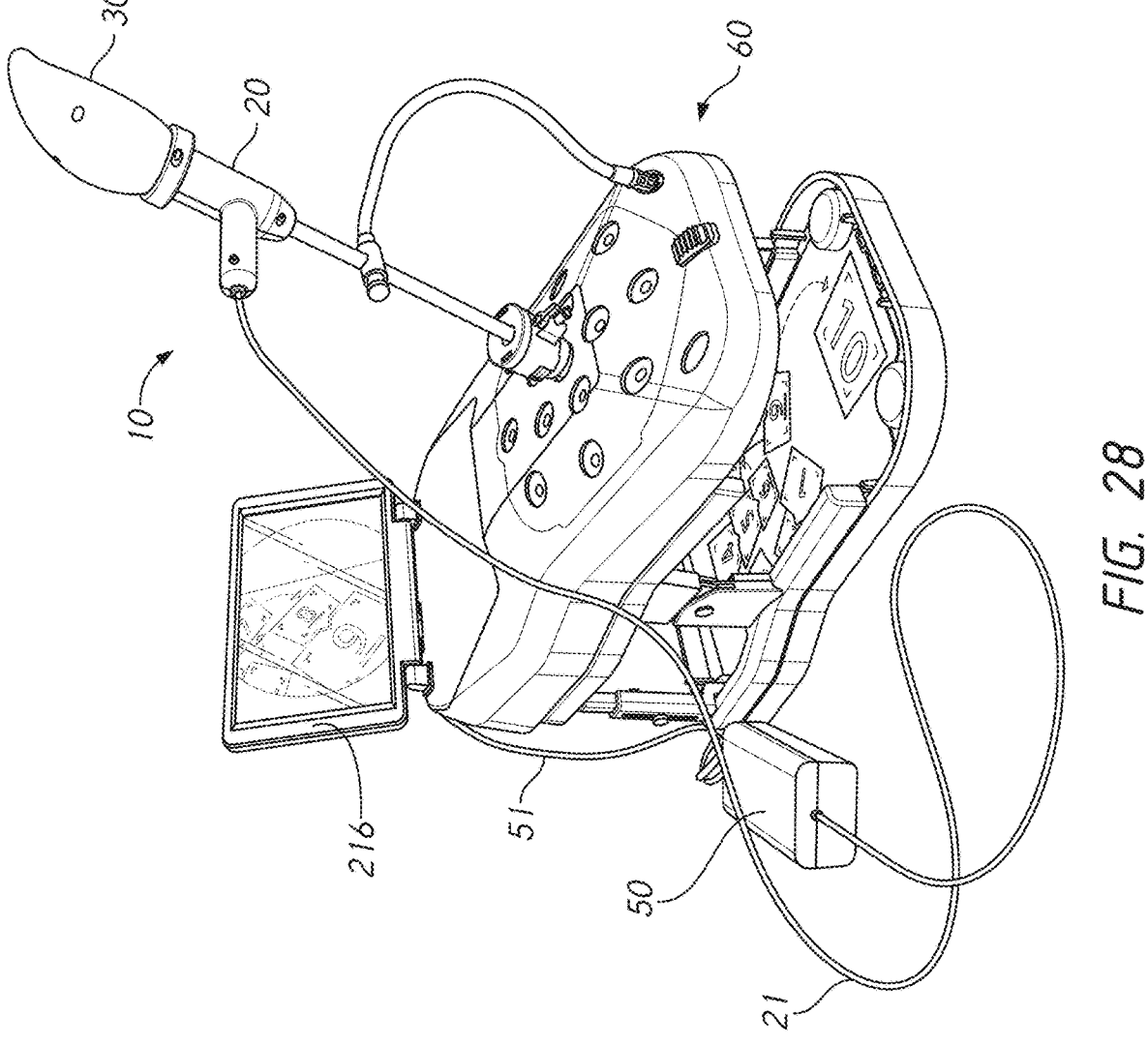

When assembled, the top cover 202 is positioned directly above the base 204 with the plurality of legs 206 located substantially around the periphery and interconnected between the top cover 202 and base 204. The top cover 202 and base 204 are substantially the same shape and size and have substantially the same peripheral outline. The internal cavity 208 is partially or entirely obscured from view. The plurality of legs 206 include openings to allow ambient light to illuminate the internal cavity as much as possible and to provide as much weight reduction as possible for convenient portability. The top cover 202 is removable from the plurality of legs 206 which in turn are removable or collapsible via hinges or the like with respect to the base 204. Therefore, the unassembled surgical trainer 60 has a reduced height that makes for easier portability. The surgical trainer, in accordance with various embodiments, provides a simulated body cavity or internal cavity 208 that is obscured from the user. The internal cavity 208 is configured to receive at least one surgical model accessible via at least one tissue simulation region 210 and/or pre-formed apertures 212 in the top cover 202 through which the user may access the models to practice laparoscopic or endoscopic minimally invasive surgical techniques. In FIGS. 24-25, a surgical simulation scope system is shown with the surgical simulation scope 10, in accordance with various embodiments, in a zero degree and/or initial position with exemplary images displayed on the screen of the surgical trainer 60. In FIGS. 26-28, a surgical simulation scope system is shown with the surgical simulation scope 10 in accordance with various embodiments in respective 90 degrees, 180 degrees and 270 degrees positions with corresponding exemplary images displayed on the screen of the surgical trainer 60.

With reference to FIGS. 29-56, in accordance with various embodiments, a surgical simulation scope 10' comprises a handle 12' connected to an elongate shaft 14'. The handle 12' is a two-piece, clamshell housing, e.g., handle half 12a' and handle half 12b', that defines an interior and houses a controller PCBA 20'. The handle 12' has an angled or curved body relative to a longitudinal axis of the elongate shaft 14'. The handle 12' and the elongate shaft 14' are fixed or non-rotatable relative to each other. A data cable 22' connects the handle 12' and the controller PCBA 20' to a surgical trainer 60' and, in various embodiments, a computer, microcontroller and/or processor and/or a video display or monitor integrated or attached to the surgical trainer 60' to display images captured by an image sensor assembly of contents within a cavity defined by the surgical trainer. The controller PCBA, in various embodiments, is connected to a sensor assembly and to the data cable 22' that is in turn connected to a computer or video monitor to display a video image captured by an image sensor 43' and processed by a microcontroller on the controller PCBA 20'. The scope 10' has a scope view that is in-line or aligned with a longitudinal axis of the elongate shaft. A lens 45' and the image sensor 43' are placed at the distal end of the scope perpendicularly or orthogonally positioned with respect to a centerline or longitudinal axis of the elongate shaft. The handle 12', in various embodiments, is curved or contoured to fit ergonomically in the hand of a user, e.g., a trainer or practicing surgeon. In operation, a user holds the handle 12' steady when navigating the surgical simulation scope and in particular, the elongate shaft 14' connected thereto. Any rotation of the handle 12' rotates the elongate shaft 14' and/or the entire surgical simulation scope 10'.

The elongate shaft 14' is connected to the distal end of the handle 12' and includes a sidewall having a cylindrical shape defining a lumen. The shaft 14' includes a proximal end and a distal end with the lumen extending therebetween. The distal end of the elongate shaft 14' includes a distal opening and is arranged to receive and house an optics housing 40'. The proximal end of the shaft 14' is connected to the handle 12' and includes a proximal opening such that the lumen of the shaft 14' opens to an interior or cavity of the handle 12'.

The proximal end of the elongate shaft 14', in various embodiments, is connected to the handle 12' via machined holes that interface with molded pins on the handle 12'. The elongate shaft 14' has a machined keyway arranged to interface with a molded rib in the handle 12'. A dual-purpose clamp 23' is provided to secure the elongate shaft 14' to the handle 12'. The dual-purpose clamp 23' is a metallic clamp secured around the proximal end of the elongate shaft 14' to ground the elongate shaft 14' to the controller PCBA 20'. The diameter of the elongate shaft 14' is approximately between 3 mm to 15 mm. The outside diameter is sized to fit inside a correspondingly sized trocar. The elongate shaft is made of stainless steel and/or is formed as a monolithic structure. In various embodiments, the elongate shaft 14' has a fixed or non-adjustable length and/or not bendable. In various embodiments, the elongate shaft 14' is straight extending along a longitudinal axis and/or is aligned with the handle 12'.

In various embodiments, an optics assembly or housing 40' is located inside the scope 10' and connected to the elongate shaft 14'. The optics housing 40' is attached to the distal end of the elongate shaft 14' and ensures that an active area of the image sensor 43' is aligned with the lens 45', thereby avoiding unintended image cropping or shadowing. The optics housing 40' comprises an optics mount 44' and/or an optics floor 42', connected and aligned to each other. The optics mount 44' and/or floor 42' are disposed orthogonally relative to a longitudinal axis of the elongate shaft 14'. A dowel or core pin 501', in various embodiments, extends between and connects the optics floor 42' to the elongate shaft 14'. In various embodiments, the optics floor 42' includes a thru-hole arranged to receive the dowel, core, or cross pin 501' interfacing with the elongate shaft 14' to retain and/or secure the optics floor, mount and/or housing within the elongate shaft and clock the optics floor, mount and/or housing to a proper or predefined orientation of the elongate shaft. In various embodiments, as shown for example in FIG. 28, the optics floor 42' interfaces with the elongate shaft 14' without use of a dowel, core, or cross pin to retain and/or secure the optics floor, mount and/or housing within the elongate shaft. In various embodiments, alternatively or in addition to, the optics floor, mount and/or housing is adhered to the elongate shaft 14'. In various embodiments, as shown for example in FIGS. 27A-B, the optics mount has one or more projections or keys 58' arranged to interface with one or more corresponding slots or notches in the elongate shaft 14' to clock the optics mount to the elongate shaft. In various embodiments, the optics housing, mount and/or floor are clocked and secured within the elongate shaft such that the optics are aligned with the same upward orientation as the handle. In various embodiments, the elongate shaft is clocked to the handle via a slot in the elongate shaft arranged to interface with a rib in the handle.

The optics mount 44' is sized and shaped to fit within the lumen of the elongate shaft 14'. The optics mount 44' is generally cylindrical or partially cylindrical with a proximal and/or a distal surface or wall, both orthogonal relative to the longitudinal axis of the elongate shaft 14' and connected to each other by a generally cylindrical or partially cylindrical sidewall. The proximal and distal walls are thus parallel to each other. The optics mount 44' houses and secures image sensor 43', light emitting diode (LED) 47', lens 45', and optics cover 46'. The optics mount has pocket within the proximal wall to receive and secure the image sensor 43'. The image sensor 43', in various embodiments, is mounted on a printed circuit board assembly (PCBA) and, in various embodiments, the pocket or cavity of the optics mount is sized and shaped to receive and secure the image sensor PCBA as well as the image sensor 43'. The image sensor PCBA, in various embodiments, is hexagonal to minimize the space occupied in the optics housing and, in various embodiments, the pocket within the optics mount is hexagonal. The pocket also has an aperture extending through the pocket and out through the distal wall. This aperture is arranged to receive and secure the lens 45' and the optics cover 46'. Through this arrangement, the image sensor 43' and, in particular, an active area of the image sensor 43', is securely aligned with the lens 45' and/or optics cover 46' to optimally capture images. In various embodiment, the aperture is threaded, and the lens has corresponding threads such that the threading between the two allows for the tuning of the lens for an effective working distance. In various embodiments, the optics mount 44' has a counterbore 56' at the aperture or distal end of the aperture and, in various embodiments, the counterbore eases assembly and assists in locating the lens to the threaded aperture, making it easier to start the lens on a very fine or small thread.

In various embodiments, the lens 45' is circular in shape and/or has a wide field of view and a wide depth of field. In various embodiments, the lens has a 91.5 degree viewing angle and a depth of field of 1" to 4" (and, in various embodiments, 1" to 7") from the front or distal end of the optics housing and/or the distance from the lens 45' to the image sensor 43'.

In various embodiments, the optics cover 46' is optically clear and arranged to protect the lens and is arranged to filter near-IR wavelengths that give the image a red color, e.g., near-IR wavelengths around and/or over 700 nm. In various embodiments, the optics cover comprises near-IR-cutoff filters around 700 nm. In various embodiments, a near-IR-cutoff filter is placed between the lens 45' and image sensor 43' and/or the optics cover 46' is devoid of a filter, remaining optically clear and protective of the lens. In various embodiments, the optics cover 46' is scratch resistance and durable. In various embodiments, the optics cover 46' is made of borosilicate glass, providing a durable material to avoid scratches and/or potential damage. In various embodiments, the optics cover 46' includes or is coated with an IR blocking material or coating which prevents transmission of IR light that may cause a red hazy image, e.g., due to proximity to a window or sunlight.

In various embodiments, the optics cover 46' is located in a counterbore 56' in front of the lens 45' and/or is secured using adhesive. In various embodiments, UV curable adhesive is used which cures clear to prevent affecting the lens and/or the optics cover and light or images viewed therethrough. In various embodiments, the counterbore 56' is deeper than the optics cover is thick, such that the optics cover is recessed within the optics mount thereby enhancing protection of the cover, e.g., during drops, and minimizes potential scratches. In various embodiments, the optics mount has the counterbore 56' and/or a countersunk or chamfer 57' at the entry or distal end of the aperture of the optics mount.

A pocket or cavity in the optics mount 44' is also provided in the distal wall to receive and secure the LED 47'. In various embodiments, the LED 47' is inset from the face or distal wall of the optics mount thereby enhancing protection of the LED 47' and potentially reducing or avoiding contact and/or snagging of trocars, access devices and/or simulated tissue during use. The optics mount, in various embodiments, has pocket within the proximal wall to receive and secure the LED 47'. The LED 47', in various embodiments, is mounted on a printed circuit board assembly (PCBA) and, in various embodiments, the pocket or cavity of the optics mount is sized and shaped to receive and secure the LED PCBA as well as the LED 47'. The optics mount 44' also has a channel or opening connected to the pocket to receive, secure and route wires 49' extending from the LED and/or the LED PCBA. The optics floor 42', in various embodiments, also has a channel, slot or is specifically shaped and aligned with the optics mount channel to receive, secure, and route the wires 49' extending from the LED 47'. The wires 49' extend through the elongate shaft 14' and into the handle 12'. The wires 49' connect to the controller PCBA 20' disposed in the handle 12'. In various embodiments, other apertures or cavities are provided in the assist in manufacturing and assembling the optics mount and/or the optics housing to the elongate shaft 14' and/or the optics floor 42'.

In various embodiments, the optics mount 44' has a projection or step 48' facing distally and arranged to interface with the surface at the distal end of the elongate shaft 14' and clocks the optics mount to the elongate shaft. The step 48' also absorbs impacts and protects the elongate shaft in the event of an accidental drop. As such, in various embodiments, the step 48' which locates on the edge or distal end of the elongate shaft enhances protection of the elongate shaft, e.g., during potential drops, reducing or avoiding bends and/or formation of sharp edges. In various embodiments, the optics mount sits or is positioned on top of the elongate shaft and in various embodiments, the optics mount is the distal most end of the scope. In various embodiments, the step 48' of the optics mount and/or the positioning of the optics mount ahead of or on top of the distal end of the elongate shaft, reducing deformation, denting and/or shearing of the elongate shaft, e.g., due to undesired drops or impacts. In various embodiment, the step 48' has a thickness of about 1 mm to 2 mm, and, in various embodiments, is 1.5 mm.

The optics mount 44' has one or more projections or legs, e.g., in the illustrated embodiment three legs, facing distally and arranged to interface with one or more channels within or walls on the optics floor 42' to ensure the optics mount 44' and the optics floor are concentric and fit within the lumen of the elongate shaft and assist in securing and aligning the optics mount 44' with the optics floor 42'. In various embodiments, the optics mount 44' and the optics floor 42' are secured together with adhesive.

The optics floor 42' is sized and shaped to fit within the lumen of the elongate shaft 14'. The optics floor 42' is generally hemispherical or partially cylindrical with a proximal and a distal surface or wall, both orthogonally positioned relative to the longitudinal axis of the elongate shaft 14' and connected to each other by a generally hemispherical or partially cylindrical sidewall. The proximal and distal walls are thus parallel to each other. Similarly, the proximal and distal walls of the optics floor and the proximal and distal walls of the optics mount are parallel with each other. The optics floor 42' is sized and configured to provide a backing and support for the image sensor 43' and/or the image sensor PCBA. In various embodiments, a compressive material or component, e.g., a gasket 53, is positioned between the optics mount 44' and the optics floor 42' to add back pressure to the image sensor positioned on the optics mount. In various embodiments, the image sensor is adhered to the optics mount. The optics floor 42' also has channel or slot sized and shaped to receive, secure and route wires and/or a ribbon cable 41 extending from the image sensor 43'. The ribbon cable 41 extends through the elongate shaft 14' and into the handle 12'. The ribbon cable 41 connects to the controller PCBA 20' disposed in the handle 12'. The ribbon cable 41 transmits the image sensor's image feed or raw image data from the image sensor 43' to the controller PCBA 20'. In various embodiments, the controller PCBA 20' comprises one or more connectors arranged to connect to the wires 49' and/or the ribbon cable 41 transmit/receive data and/or power therethrough. In accordance with various embodiments, an image sensor microcontroller and a power supply are all part of, e.g., integrated and/or attached to, the controller PCBA 20'. In various embodiments, the optics floor 42' is optional and thus the connections or features of the optics mount 44' utilized to interface with the optics floor may be omitted.

An LED 47' is placed on a PCB with two through holes. Wires or leads are soldered to the through holes and passed down the elongate shaft 14' to transmit power to the LED. In various embodiments, the wires or lead wires are soldered directly to the LED and/or the LED PCBA the wires or lead wires extends through the elongate shaft 14' to the controller PCBA which is housed in the handle. The wires or leads, in various embodiments, are attached perpendicularly to the LED and/or the LED PCBA through thru-holes, reducing any bending and/or potential break points. The LED 47' is placed near an outer diameter at an outer or distal surface or wall of the optics mount 44' and away from the lens 45' maximizing the distance between the two and the wall thickness of the optics mount, as highlighted by circle 55, therebetween to prevent or avoid any noticeable lens flare. In various embodiments, spacing behind the LED is blocked with glue, wax, or other similar opaque substances and/or the lumen of the elongate shaft entirely or near and/or around the optics housing includes or is coated with a non-reflective material to further assist in preventing any noticeable lens flare or halos. In various embodiments, a black or opaque adhesive material adheres the LED to the optics mount and, in various embodiments, placed along the edges on the back or proximal end of the LED, preventing light from the LED from shining back into the elongate shaft and the image sensor. In various embodiments, the optics cover is also isolated from the LED 47' via the optics mount and/or the placement or positioning thereto such that the LED is prevented from illuminating the optics cover, for example, creating unwanted reflections or image distortions. In various embodiments, a light blocking wall, e.g., a plastic and/or opaque wall, is positioned on the optics mount 44' between the LED, and the lens and/or the optics cover to reinforce light blocking between the LED and the lens and/or the optics cover.

The image sensor 43' is a CMOS (complementary metal oxide semiconductor). The image sensor 43' converts light into electrical signals which can be processed to produce an image. An image sensor microcontroller is attached to the controller PCBA 20', processes the raw image sensor data and outputs the image via USB communication. In various embodiments, the data cable 51' is a USB cable or a USB to micro-USB cable.

Any portion of the organ or training models in accordance with various embodiments can be made of one or more organic base polymer including but not limited to hydrogel, single-polymer hydrogel, multi-polymer hydrogel, rubber, latex, nitrile, protein, gelatin, collagen, soy, non-organic base polymer such as thermo plastic elastomer, KRATON polymer, silicone, foam, silicone-based foam, urethane-based foam and ethylene vinyl acetate foam and the like. Into any base polymer one or more filler may be employed such as a fabric, woven or non-woven fiber, polyester, nylon, cotton and silk, conductive filler material such as graphite, platinum, silver, gold, copper, miscellaneous additives, gels, oil, cornstarch, glass, dolomite, carbonate mineral, alcohol, deadener, silicone oil, pigment, foam, poloxamer, collagen, gelatin, and the like. The adhesives employed may include but are not limited to cyanoacrylate, silicone, epoxy, spray adhesive, rubber adhesive and the like.

In order for the surgical simulation scope or angled scope in accordance with various embodiments of the present invention to be suitable or effective for training or simulation purposes, the scopes should meet one or more certain criteria. For example, the ergonomics of the scope, in various embodiments, is similar to surgical-grade scopes. The size and shape of the handle, the length of the shaft as well as the weight of the scope, in various embodiments, approximate a surgical-grade scope. Also, the surgical simulation angled scope or scope, in various embodiments, is capable of being manipulated by one hand. The scope, in various embodiments, is also be able to withstand accidental bumps and drops without breaking or losing functionality. Also, in order for users to learn and get comfortable with medical device trocars and the like, the surgical simulation scope, in various embodiments, is sized and configured to be compatible with and fit inside medical device trocars that are used in surgery. Typically, there are two sizes of trocars, 10 mm and 5 mm, that are used as a port for passing a scope to the surgical site. Therefore, a surgical simulation scope, in accordance with various embodiments, is at least compatible with either a 10 mm and/or 5 mm trocar.

The surgical simulation scope in accordance with various embodiments does not need to be made to withstand repeated sterilization, cleaning, and autoclave cycles. As such, the scope can be less expensive. While lighting on the scope can be required for certain procedure simulations, the light source at the tip of the scope in some instances can be supplemented by other light sources installed inside the cavity of the box trainer. Therefore, the lighting demands for a surgical simulation scope is reduced which may further lower manufacturing costs of the scope. Also, with respect to the optical performance, the surgical simulation scope in accordance with various embodiments may sacrifice some image quality and include some distortion at the edges of the image by using less expensive components and a simpler lens assembly design. Overall, the image quality should be sufficient enough to provide an appropriate amount of detail in order to distinguish the subtle differences in simulated anatomy. Since the requirements for image quality and lighting at the tip for a surgical simulation scope are not as stringent as that for a surgical-grade scope and there is no requirement for sterility, it is possible to keep the cost lower than that of surgical-grade scopes. A surgical simulation scope, in accordance with various embodiments, has the balance of a quality image, working distance and depth-of-field, low cost, and/or robustness to last for a multitude of uses. These desired attributes can be connected and optimally designing a scope for one of these attributes may make meeting another attribute more difficult.

The surgical simulation scope in accordance with various embodiments is suitable for use with laparoscopic trainers to educate and train medical professionals and medical students. The surgical simulation scope in accordance with various embodiments provides significant improvements that may also be employed in surgical-grade scopes.

In various embodiments, a surgical simulation scope is provided comprising at least one of an optics mount and/or an optics floor and in accordance with various embodiments, other embodiments, portions of such embodiments and/or any combination thereof described throughout the description can be combined with such a surgical simulation scope. In various embodiments, the surgical simulation scope further comprises at least one of a handle, an elongate shaft, an image sensor, an adapter PCBA and a lens. In various embodiments, the surgical simulation scope comprises an optics housing, a handle, an elongate shaft, an image sensor, a lens, an adapter PCBA or any combination thereof.

In various embodiments, the scope has an elongate shaft 14, 14' that is connected to a handle 12, 12' at the proximal end. The shaft is long enough so that the distal end of the scope, which is the image acquisition end, is disposed inside the body cavity while the handle resides outside the patient. A scope includes an image sensor located behind a lens. The image sensor is connected to a controller printed circuit board assembly (PCBA) that includes a microcontroller configured to process data acquired by the image sensor. The PCBA may be connected to the monitor or other device wirelessly or with a wire, cable, or the like. In various embodiments, a first data cable extends from the simulated camera head and transmits encoder data from the encoder 26 and a second data cables extends for the simulated scope housing and transmits image data from the image sensor 43. The data cables connect the controller PCBA directly or through a USB hub. Lights, such as LEDs or a fiber optic light source that transmits light through one or more fiber optic cables to the distal end of the scope, are included and connected to the scope to illuminate the surgical field. One or more lenses are included in the optical assembly to focus the light reflected off the surgical site.

In various embodiments, the handle 12 is defines an interior or cavity arranged to house an adapter PCBA and an encoder. The adapter PCBA is connected to an image sensor PCBA and to a simulated light cable 21. The simulated light cable is connected to the controller box. The controller box is connected to a surgical trainer and in various embodiments, a computer or processor and/or a video display or monitor integrated or attached to the surgical trainer. The elongate shaft 14, 14' is connected to the distal end of the handle 12, 12'. The lumen of the elongate shaft 14, 14' opens to the interior of the handle 12, 12' in order to connect the image sensor to the adapter PCBA 20, 20'. In various embodiments, the horizon of the simulated camera head 30 is maintained while the simulated scope housing 20 is rotated. In various embodiments, a main or overall outer diameter or cross-sectional area of the simulated scope housing 20 is smaller than an overall outer diameter or cross-sectional area of the simulated camera head 30, distinguishing the simulated scope housing 20 from the simulated camera head 30. In various embodiments, the simulated scope housing 20 is rotatable with respect to the simulated camera head 30 via the simulated light cable being adjusted or rotated relative to the simulated camera head. In various embodiments, the elongate shaft 14 rotates with the simulated scope housing 20. In various embodiments, the simulated scope housing has no rotational limit relative to the simulated camera head, having no mechanical stops therebetween.

In accordance with various embodiments, the pocket of the optics mount 44, 44' has a known depth and when the image sensor 43, 43' is placed in the pocket, it is located radially with respect to the elongate shaft 14, 14'. Also, the depth of the pocket within the optics mount 44, 44' has a predetermined distance to the front of the optics mount. This distance effectively meets all magnification, working distance and depth-of-field requirements. Any tolerances found in the image sensor or its electronics are accommodated by the varying distance between the optics mount 44, 44' and/or optics floor 42, 42' as they sandwich the image sensor 43, 43' and electronics. This simplifies assembly as the components fit with respect to each other in only one way with the image sensor 43 always at a known distance from the end of the optics mount 44, 44'. Because of this, the adjustment of the optics housing 40 to optically tune the system is made easier. Otherwise, the need to tune the optics can vary from assembly to assembly because individual components have associated tolerances. When placed in relation to other components these tolerances can stack-up making tuning more difficult and leading to out-of-focus images. Tuning is also necessary as the distance from the backside of the lens to the image sensor affects magnification, working distance and the depth-of-field. The scope 10, 10', in accordance with various embodiments, mitigates the tolerance stack-up issue. In accordance with various embodiments, the optics housing is configured to ensure the location of the image sensor is within the depth of focus of the lens is maintained while not damaging the image sensor.

In various embodiments, the optics floor and/or mount comprises one or more apertures, slots or holes arranged to route and/or secure the wires or connections extending from the LED to the handle. In various embodiments, the optics floor and/or mount comprises one or more apertures, slots, or holes arranged to route and/or secure the wires, ribbon cable, or connections extending from the image sensor to the handle. In various embodiments, the optics floor and/or mount comprises corresponding dovetails to facilitate and secure connection to each other.

In various embodiments, a slight indent at distal end of the elongate shaft is provided and is arranged to be pressed inwardly to secure the optics housing in place using the deformed material, indent, or distal portion of the elongate shaft. In various embodiment, an elongate lasso is provided to secure the optics housing within the elongate tube. In various embodiment, the lasso comprises a cable, thread, rope, string, wire, or the like to tether or wrap around a portion or periphery of an optics housing and apply an axial preload down the length of the tube by connecting the lasso or tether to the simulated scope housing and/or distal end of the elongate tube. In various embodiments, the optics mount comprises a channel or slot to around the outer periphery, outer circumference, or portions thereof of the optics mount with a distal end, ring, loop, hoop or the like of the lasso or tether disposed or attached therein. The lasso or tether, e.g., the line, cord, or the like extends back through a channel or slot in the optics mount that may include the LED leads or wires and extends down the length of the tube to the handle.

In various embodiments, the optics floor is omitted or not used and as such, the optics mount is used to locate the lens, image sensor, and LED longitudinally and laterally. By using only the optics mount, in various embodiments, the assembly may be simplified without compromising the functionality. In various embodiments the optics mount thus becomes the optics housing and is used to locate all the distal end components of the scope longitudinally and laterally within the elongate shaft.

In various embodiments, an optics housing, an optics mount and/or an optics floor are disposed within a lumen of an extension tube with a length being shorter than the elongate shaft and in various embodiments, the extension tube is connected to the elongate shaft via threads, adhesive, and/or ultrasonic welding to ease manufacturing. In various embodiments, a stepped or rolled front or distal end is provided at a distalmost end of the elongate shaft and load the optics housing, mount and/or floor is loaded from the back or proximal end of the elongate shaft to keep the optics housing, mount and/or floor secure and protected. In various embodiments, the optics housing, mount and/or floor is arranged to sit or be positioned within the elongate shaft and the elongate shaft is rolled or stepped after the optics housing, mount and/or floor is loaded from the front or distal end of the elongate shaft. In various embodiments, the elongate shaft comprises or is made of a non-metallic material to facilitate or ease bonding or securing of the optics housing, mount and/or floor to the elongate shaft. In various embodiments, the optics housing, mount and/or floor includes threads configured to mate with corresponding threads within the elongate shaft.

In various embodiments, a light source is placed or attached to the handle and a light tube extends from the handle through the elongate tube to the distal end of the elongate shaft to transmit light through the elongate shaft tube to the distal end of elongate shaft. In various embodiments, the light tube is insulated, coated and/or covered with an opaque material. In various embodiments, the light tube replaces the light emitting diode and the associated wires and reduces the amount of light being able to transmit back down the elongate shaft and/or to the image sensor.

In various embodiments, the controller printed circuit board assembly (PCBA) 20 is located inside a controller box 50 connectable to the handle 12 of the scope 10. The controller box 50 is connectable to a computer and/or video monitor attached to or integrated into a surgical trainer 60, wirelessly or via a data cable 51, such as a USB cable, and configured to process and display the captured video image. In various embodiments, the controller PCBA and/or a controller or processor within or attached to the surgical trainer using the rotational data determines an amount of rotation needed to rotate the raw image to display a rotated image on a screen or monitor, e.g., a screen attached to or incorporated with a surgical trainer.

The optical performance of a surgical simulation scope is be similar to surgical-grade scopes with respect to certain characteristics. These characteristics include, but are not limited to, working distance, depth-of-field, field-of-view, image color and/or image quality. Image quality can include the sharpness of the video images in terms of pixel count resolution and the corresponding frames per second (fps) of the video feed. The surgical simulation scope in accordance with various embodiments provides an image quality that is approximately 640×480 to 720×1024 at approximately 24-60 fps. With respect to image color, the surgical simulation scope in accordance with various embodiments provides an approximate to the actual colors of an object when observed with the naked eye. Hence, the lighting employed at the tip of the scope should not distort the colors of the organ models so that the realism of the simulation is not compromised. The working distance, which is the distance from the lens to the optimal focal plane is the plane of best focus. The depth-of-field is defined as the distance away from the optimal focal plane in both directions in which the image is still in focus. The depth-of-field should be as wide as possible. The field-of-view is defined as the area in the displayed image at the working distance. These and other characteristics work together to make for an image that is suitable for a surgical simulation scope in accordance with various embodiments of the present invention. Also, these parameters can provide the image, size, magnification, and/or other similar characteristics that correspond to a surgical-grade scope so that the trainee is not surprised when switching from the surgical simulation scope to using a surgical-grade angled scope or scope.

The above description is provided to enable any person skilled in the art to make and use the surgical simulation scopes and perform the methods described herein and sets forth the best modes contemplated by the inventors of carrying out their inventions. Various modifications, however, will remain apparent to those skilled in the art. It is contemplated that these modifications are within the scope of the present disclosure. Different embodiments or aspects of such embodiments may be shown in various figures and described throughout the specification. However, it should be noted that although shown or described separately each embodiment and aspects thereof may be combined with one or more of the other embodiments and aspects thereof unless expressly stated otherwise. It is merely for easing readability of the specification that each combination is not expressly set forth.

Although the present invention has been described in certain specific aspects, many additional modifications and variations would be apparent to those skilled in the art. It is therefore to be understood that the present invention may be practiced otherwise than specifically described, including various changes in the size, shape and materials, without departing from the scope and spirit of the present invention. Thus, embodiments of the present invention should be considered in all respects as illustrative and not restrictive.

The invention claimed is:

1. A surgical simulation scope comprising:
   a handle comprising:
      a scope housing comprising a proximal portion comprising a rotary barrel and a distal portion comprising an adapter housing, and a camera head comprising a proximal portion comprising a simulated camera head housing and a distal portion comprising a simulated coupler, the camera head having a different shape than the scope housing and encasing the rotatory barrel;

an elongate shaft having a proximal end, a distal end and a longitudinal axis extending between the proximal end and the distal end, the proximal end being fixedly attached to the scope housing and the distal end comprising an optics mount, the scope housing being rotatably attached to the camera head;

a simulated light cable fixedly attached to and extending from the scope housing, the simulated light cable being arranged to not be able to be connected to a light source and the simulated coupler being disposed between the simulated light cable and a proximal end of the camera head;

a lens disposed within the optics mount and angled at a predetermined angle relative to the longitudinal axis, the predetermined angle being less than ninety degrees; and an image sensor disposed within the optics mount, the image sensor having a distal face facing the distal end of the elongate shaft and angled at the predetermined angle relative to the longitudinal axis.

2. The scope of claim 1 further comprising a data cable; and a controller box connected to the simulated light cable and the data cable, the controller box encasing a controller connected to the simulated light cable and the data cable.

3. The scope of claim 2 further comprising a surgical trainer comprising a processor connected to the data cable.

4. The scope of claim 3 wherein the simulated camera head housing is curved and comprises one or more flat surfaces arranged to facilitate gripping and maintaining the simulated camera head housing stationary with the scope housing being rotated and the simulated camera head housing further comprises a tapered tail terminating below a horizontal midline and the simulated coupler comprises an enlarged circumferential ridge arranged to differentiate the camera head from the scope housing.

5. The scope of claim 1 further comprising an adapter circuit fixedly connected to the simulated light cable and enclosed within the adapter housing, the simulated light cable extending along a portion of the scope housing in a direction perpendicular to the longitudinal axis, the simulated light cable being a USB cable.

6. The scope of claim 1 wherein the simulated camera head housing comprises one or more internal ribs providing one or more bearing surfaces for the rotatory barrel to contact and rotate against within the simulated camera head housing.

7. A surgical simulation scope comprising:

a handle comprising a scope housing and a camera head, the scope housing comprising a proximal portion comprising a rotatory barrel and a distal portion comprising an adapter housing, the rotatory barrel defining a cavity;

an elongate shaft having a proximal end, a distal end and a longitudinal axis extending between the proximal end and the distal end, the proximal end being fixedly attached to the scope housing and the distal end comprising an optics mount, the scope housing being rotatably attached to the camera head;

an encoder disposed within the cavity of the rotatory barrel, the encoder comprising an encoder shaft extending out and through an aperture in a proximal end of the rotatory barrel and fixedly secured to the camera head;

a simulated light cable fixedly attached to and extending from the scope housing in a direction perpendicular to the longitudinal axis;

a lens disposed within the optics mount and angled at 30 degrees relative to the longitudinal axis; and an image sensor disposed within the optics mount, the image sensor having a distal face facing the distal end of the elongate shaft and angled at 30 degrees relative to the longitudinal axis.

8. The scope of claim 7 wherein the encoder is an absolute encoder and is connected to an adapter circuit in the adapter housing via wires extending through a connector housing disposed between the rotatory barrel and the adapter housing.

9. The scope of claim 8 further comprising a controller connected to the simulated light cable and wherein the absolute encoder provides rotational data to the adapter circuit and the adapter circuit provides the rotational data to the controller through the simulated light cable.

10. The scope of claim 7 further comprising a controller connected to the simulated light cable, the controller being configured to receive a camera image from the image sensor and to receive rotational data from the encoder.

11. The scope of claim 10 further comprising a processor connected to the controller via a data cable, the processor configured to rotate the camera image utilizing the rotational data and to transmit a rotated camera image to a display screen.

12. The scope of claim 11 wherein the processor is configured to crop the rotated camera image into a predetermined shape prior to transmitting the rotated camera image to the display screen, the predetermined shape having a diameter equal to a height of the camera image received from the image sensor.

13. The scope of claim 11 wherein the processor is configured to crop the rotated camera image into a predetermined shape prior to transmitting the rotated camera image to the display screen, the predetermined shape having curved sides between a flat top edge and a flat bottom edge.

14. The scope of claim 13 wherein the flat top edge matches a flat top edge of the display screen and the flat bottom edge matches a flat bottom edge of the display screen.

15. The scope of claim 14 wherein the controller comprises an image sensor microcontroller, an encoder microcontroller, a power supply, and a USB hub.

16. A surgical simulation scope comprising:

a handle comprising a scope housing, a camera head, and a frictional interface disposed between the scope housing and the camera head and configured to prevent inadvertent rotational movement between the scope housing and the camera head;

an elongate shaft having a proximal end, a distal end and a longitudinal axis extending between the proximal end and the distal end, the proximal end being fixedly attached to the scope housing and the distal end comprising an optics mount, the scope housing being rotatably attached to the camera head;

a simulated light cable fixedly attached to and extending from the scope housing in a direction angled relative to the longitudinal axis;

a lens disposed within the optics mount and angled an angle between 15 to 45 degrees relative to the longitudinal axis; and an image sensor disposed within the optics mount, the image sensor having a distal face facing the distal end of the elongate shaft and angled at an angle between 15 to 45 degrees relative to the longitudinal axis;

wherein the optics mount has a distal face facing the distal end of the elongate shaft and angled at an angle between 15 to 45 degrees relative to the longitudinal axis and the optics mount has a proximal face facing the proximal end of the elongate shaft and angled at an angle between 15 to 45 degrees relative to the longitudinal axis; and further comprising an optics cover disposed next to the lens and arranged to protect the lens, the optics cover is optically clear and is configured to filter out near-infrared wavelengths, the optics cover is further arranged to fit within an aperture in the optics mount in which the lens is disposed and is located in a counterbore in front of the lens, the counterbore being deeper than the optics cover is thick.

17. The scope of claim 16 further comprising an optics floor disposed within the distal end of the elongate shaft and positioned next to the optics mount, the optics floor having a distal face facing the distal end of the elongate shaft and angled at an angle between 15 to 45 degrees relative to the longitudinal axis, the optics floor having a proximal face facing the proximal end of the elongate shaft and angled at an angle between 15 to 45 degrees relative to the longitudinal axis, the optics mount having a dovetail facing proximally and arranged to interface with a slot within the optics floor, and the optics mount having a projection facing proximally and arranged to interface with an angled surface at the distal end of the elongate shaft.

18. The scope of claim 16 further comprising a light emitting diode disposed within a square cavity within the optics mount near the lens and an outer edge of the optics mount with the optics mount having a wall disposed between the light emitting diode and the lens, the light emitting diode having a flat distal surface facing the distal end of the elongate shaft and angled at an angle between 15 to 45 degrees relative to the longitudinal axis, the light emitting diode connected to a printed circuit board and one or more wires extending proximally and terminating in the handle, the one or more wires disposed within a channel within the optics mount, the channel being connected to the square cavity within the optics mount.

19. The scope of claim 18 further comprising a ribbon cable connected to the image sensor and extending to the handle, the ribbon cable is configured to provide power to the image sensor and to supply data from the image sensor to circuitry within the handle, the circuitry comprising an image sensor microcontroller and a power supply are integrated into a controller; and the handle having a curved body relative to the longitudinal axis of the elongate shaft and defining an interior arranged to house the controller; and further comprises a data cable connecting the handle and the controller to a processor disposed outside of the handle.

* * * * *